United States Patent
Bartholomew et al.

(10) Patent No.: US 11,997,018 B2
(45) Date of Patent: May 28, 2024

(54) SYSTEMS, METHODS, COMPUTING PLATFORMS, AND STORAGE MEDIA FOR ADMINISTERING A DISTRIBUTED EDGE COMPUTING SYSTEM UTILIZING AN ADAPTIVE EDGE ENGINE

(71) Applicant: Section.io Incorporated, Boulder, CO (US)

(72) Inventors: Daniel Bartholomew, Louisville, CO (US); Kurt Rinehart, Boulder, CO (US); Matthew Wickman, Arvada, CO (US); Gary Ritzer, Longmont, CO (US); Lucas Caballero, Broomfield, CO (US); Glenn Slaven, Berridale (AU); Jason Stangroome, Wamberal (AU); Pavel Nikolov, Homebush West (AU); Ivan Hamilton, Cumberland Reach (AU); Calvin John Brewer, Centennial, CO (US)

(73) Assignee: Section.io Incorporated, Boulder, CO (US)

( * ) Notice: Subject to any disclaimer, the term of this patent is extended or adjusted under 35 U.S.C. 154(b) by 0 days.

(21) Appl. No.: 17/675,016

(22) Filed: Feb. 18, 2022

(65) Prior Publication Data
US 2022/0278932 A1    Sep. 1, 2022

Related U.S. Application Data

(63) Continuation of application No. 17/206,608, filed on Mar. 19, 2021, now Pat. No. 11,277,344.
(Continued)

(51) Int. Cl.
*H04L 47/125*     (2022.01)
*H04L 47/10*      (2022.01)
(Continued)

(52) U.S. Cl.
CPC ............ *H04L 47/125* (2013.01); *H04L 47/15* (2013.01); *H04L 47/22* (2013.01); *H04L 47/2416* (2013.01); *H04L 67/1004* (2013.01)

(58) Field of Classification Search
None
See application file for complete search history.

(56) References Cited

U.S. PATENT DOCUMENTS

2006/0072593 A1*  4/2006  Grippo ................... H04L 45/22
                                                          370/409
2016/0142338 A1*  5/2016  Steinder .............. H04L 67/1023
                                                          709/226
(Continued)

*Primary Examiner* — Andre Tacdiran
(74) *Attorney, Agent, or Firm* — Neugeboren O'Dowd PC

(57) ABSTRACT

Systems, methods, computing platforms, and storage media for administering a distributed edge computing system utilizing an adaptive edge engine based on a finite state machine behavioral model are disclosed. Exemplary implementations may: select a first workload from one or more workloads; access, for the selected workload, one or more location optimization strategies from a plurality of location optimization strategies; and optimize an objective function across a portion of the one or more endpoints; select one or more endpoints; deploy the workload on at least one selected endpoint; monitor the health of the endpoint-workload deployment; and direct network traffic to the appropriate endpoint.

19 Claims, 27 Drawing Sheets

Related U.S. Application Data

(60) Provisional application No. 62/992,787, filed on Mar. 20, 2020.

(51) Int. Cl.
*H04L 47/22* (2022.01)
*H04L 47/2416* (2022.01)
*H04L 67/1004* (2022.01)

(56) References Cited

U.S. PATENT DOCUMENTS

| | | | |
|---|---|---|---|
| 2018/0173812 A1* | 6/2018 | Agarwal | G06F 16/254 |
| 2018/0321979 A1* | 11/2018 | Bahramshahry | H04L 41/5003 |
| 2019/0208009 A1 | 7/2019 | Prabhakaran et al. | |
| 2020/0014609 A1* | 1/2020 | Hockett | H04L 43/08 |
| 2020/0159638 A1* | 5/2020 | Gupta | H04L 63/1408 |
| 2020/0403853 A1* | 12/2020 | Garipally | H04L 67/567 |
| 2022/0272041 A1* | 8/2022 | Blakey | H04L 69/40 |

* cited by examiner

NEXT STATE INDEX

| INITAL STATE INDEX | INPUT INDEX | | | | | |
|---|---|---|---|---|---|---|
| | 0 | 1 | 2 | 3 | 4 | 5 |
| 0 | 0 | 1 | 0 | 2 | 0 | 3 |
| 1 | 0 | 1 | 1 | 4 | 1 | 6 |
| 2 | 2 | 4 | 0 | 2 | 2 | 5 |
| 3 | 3 | 6 | 3 | 5 | 0 | 3 |
| 4 | 2 | 4 | 1 | 4 | 4 | 7 |
| 5 | 5 | 7 | 3 | 5 | 2 | 5 |
| 6 | 3 | 6 | 6 | 7 | 1 | 6 |
| 7 | 5 | 7 | 6 | 7 | 4 | 7 |

| Input Index 202 | FSM Var 204 | State store equivalent 206 |
|---|---|---|
| 0 | D = 0 | Traffic_direction_desired = 0 |
| 1 | D = 1 | Traffic_direction_desired = 1 |
| 2 | H = 0 | Is_healthy = 0 |
| 3 | H = 1 | Is_healthy = 1 |
| 4 | T = 0 | Traffic_directed = 0 |
| 5 | T = 1 | Traffic_directed = 1 |

*FIG. 2A*

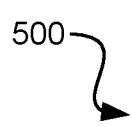

| ID | WL | EP | State Var 1 | State Var 2 | State Var 3 |
|---|---|---|---|---|---|
| 1 | a | x | 1 | 1 | 1 |
| 2 | b | x | 1 | 0 | 0 |
| 3 | b | y | 0 | 1 | 0 |
| 4 | c | z | 0 | 0 | 0 |

Legend

ID = Identifier

WL = Workload

EP = Endpoint

*FIG. 5A*

```
{
"workload": a,
"endpoint": x,
"state": {
"traffic_direction_desired": 1,
"is_healthy": 1,
"is_traffic_directed": 1
}
}, {
"workload: b,
"endpoint: x,
"state": {
"traffic_direction_desired: 1,
"is_healthy: 0,
"is_traffic_directed: 0
}
}, {
"workload": b,
"endpoint": y,
"state": {
"traffic_direction_desired": 0,
"is_healthy": 1,
"is_traffic_directed": 0
}
},
...
```

*FIG. 5B*

SYSTEMS, METHODS, COMPUTING PLATFORMS, AND STORAGE MEDIA FOR ADMINISTERING A DISTRIBUTED EDGE COMPUTING SYSTEM UTILIZING AN ADAPTIVE EDGE ENGINE

CLAIM OF PRIORITY UNDER 35 U.S.C. § 119

The present application for patent is a Continuation of U.S. patent application Ser. No. 17/206,608 entitled "SYSTEMS, METHODS, COMPUTING PLATFORMS, AND STORAGE MEDIA FOR ADMINISTERING A DISTRIBUTED EDGE COMPUTING SYSTEM UTILIZING AN ADAPTIVE EDGE ENGINE" filed Mar. 19, 2021, which claims priority to U.S. Provisional Application No. 62/992,787 entitled "SYSTEMS, METHODS, COMPUTING PLATFORMS, AND STORAGE MEDIA FOR ADMINISTERING A DISTRIBUTED EDGE COMPUTING SYSTEM UTILIZING AN ADAPTIVE EDGE ENGINE" filed Mar. 20, 2020, and assigned to the assignee hereof, which is hereby expressly incorporated by reference herein.

FIELD OF THE DISCLOSURE

The present disclosure relates to systems, methods, computing platforms, and storage media for administering a distributed edge computing system utilizing an adaptive edge engine for delivery of data using computer networks. More specifically, but without limitation, the present disclosure relates to techniques to optimize and expedite services and delivery of content using distributed computing resources and networks.

BACKGROUND

The recent era of computing has been referred to as cloud computing. Cloud computing refers to the use of commercial data centers to host applications. The commercial "cloud" data centers largely replaced on-premises data centers as previously built and maintained by larger companies. Cloud computing offers greater efficiency through specialization and economies of scale, and presents application owners, large and small, with a variety of economical options for hosting applications. Owners of applications can focus on the development, functioning, and deployment of their applications and defer operational aspects of the data center to specialists by purchasing the hosting services from cloud computing providers.

Content Delivery Networks (CDN) are geographically distributed networks of proxy servers, which were an early adaptation to the limitations of data center architecture and cloud computing. While CDNs enhance application performance, for instance, by storing copies of frequently-requested information (e.g., via caching) at nodes close to replicas of the application, they are simply a form of static deployment in the same manner as a typical cloud-hosted application.

Current trends in application hosting reflect a continued progression from cloud computing to edge computing. Edge computing is so named because the locations for hosting include many locations at the network "edge", close to end users. Edge locations include traditional "hyper-scale" cloud facilities, small "micro" data facilities, which might be attached to telecommunications transceivers, and everything in-between. Distributing applications across a dynamic and diverse set of network nodes introduces new issues and complexities to application management. Current systems and methods for distributed edge computing systems lack scalability and flexibility in allowing developers to run workloads anywhere along the edge. Thus, there is a need for a refined distributed edge computing system that alleviates some of the challenges faced with legacy edge or CDN solutions.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

As described above, Content Delivery Networks (CDN) are geographically distributed networks of proxy servers, which were an early adaptation to the limitations of data center architecture and cloud computing. In some cases, CDNs enhance application performance by storing copies of frequently-requested information (e.g., via caching) at nodes close to replicas of the application. This network of caches reduces transmission time by servicing end user requests from caches near them in the network. However, CDNs are simply a form of static deployment in the same manner as a typical cloud-hosted application, since a CDN replicates parts of the application and places them in strategic locations, but all deployments are essentially pre-determined and fixed. Furthermore, CDNs provide locked down and limited feature sets and provide limited delivery location options.

In some cases, edge computing relates to enabling and managing the increasingly complex deployment environment to optimize application performance. Current trends in application hosting reflect a continued progression from cloud computing to edge computing. However, the state of edge computing is challenged since CDNs integrate poorly with modern application development workflows. For instance, edge computing requires different methods of application development and operations. In some circumstances, edge applications also often emphasize more modular and distributed design patterns.

Existing techniques for deployments present a number of challenges. One means of maximizing responsiveness of an application is to run a maximum number of copies in a maximum number of facilities, which is not cost effective. An alternative option is to run the application in an optimal set of locations subject to objectives and constraints such as cost, performance, and others. A number of diverse hosting locations are emerging to meet these needs, creating opportunities for the application landscape of the future, but the tools for operationalizing them are lacking.

A simple example of dynamic edge computing is a large public sporting event, where a particular related application (e.g., social media application, video sharing application, etc.) may best serve users by running in micro-servers installed in the arena, e.g., 5G telecommunications arrays, radically reducing transmission times for attendees. However, such facilities usually have very high costs of use. After the event is over and the audience has dispersed, the arena locations may no longer be beneficial nor cost-effective. In many cases, the instances of the applications are removed from the arena locations and deployed at another data facility that offers appropriate cost and performance for the event level of user traffic. Similar dynamic deployments can occur elsewhere for the same application based on local conditions by creating and managing multiple instances of the application. It is also possible that some critical functions of the application can be hosted in a more secure commercial data center, while other parts of the application can be hosted at the edge.

The following publications are useful in understanding the present disclosure and its embodiments, and are incorporated herein by reference in their entireties:

Soucha, M. and Bogdanov, K. (2018) SPYH-method: An Improvement in Testing of Finite-State Machines. In: 2018 IEEE International Conference on Software Testing, Verification and Validation Workshops (ICSTW). Advances in Model Based Testing (A-MOST) 2018, 13 Apr. 2018, Vasteras, Sweden. IEEE, pp. 194-203. ISBN 1978-1-5386-6352-3.

Soucha, Michal (2019) Testing and Active Learning of Resettable Finite-State Machines. PhD thesis, University of Sheffield.

In some cases, the Adaptive Edge Engine (AEE) of the present disclosure may serve to optimize the deployment of workloads at the edge. In particular, the AEE may facilitate reduced latency, enhanced scalability, as well as reduced network costs by moving processing closer to end users. In some cases, workloads, such as web applications, may be run on endpoints. Endpoints may be hosted in datacenters and may be viewed as an application edge. In some cases, the AEE comprises or works in conjunction with a modular, Application Programming Interface (API) driven reverse-proxy layer for delivery of web applications. A reverse proxy is a type of proxy server that retrieves resources on behalf of a client (e.g., end-user of a mobile device) from one or more servers. In some cases, the AEE aggregates the actions of a plurality of automated components, such as, but not limited to, a location optimizer, a workload-endpoint state store, a workload controller, an endpoint controller, a traffic director, and a health checker. Further, these components may be configured to work without any direct, mutual dependency. In other words, no component requires any other component to function, and each component may be designed, built, and configured to operate independently to deliver collaborative outcomes for customer (or user) workloads.

The basic unit of work for the AEE may be a workload and an endpoint for running the workload. In some cases, a workload may be a tightly-coupled stack of software applications (or modules). In some aspects, a workload may be a basic unit of deployment. Further, an endpoint may be a point of application layer ingress into the module stack, with specific protocols and protocol options available to the connecting customer or client. For simplicity, the stack may be HTTP ingress, a Web Application Firewall, and/or HTTP egress modules. In some aspects, an endpoint may be a server node in a cluster. For the purposes of this disclosure, the term "workload" may also be used to refer to a workload-endpoint pair, with the pairing with an endpoint left implicit.

In some cases, the AEE may comprise a workload-endpoint state store, also referred to as a state store, for coordinating the various components of the AEE. In some cases, the state store may passively coordinate the AEE components, and may comprise a table in a relational database system. Each row in the state store may correspond to a workload or a workload-endpoint pair. Further, the table may comprise one or more columns or data fields, such as, but not limited to, "traffic_direction_desired", "is_traffic_directed", "is_healthy". In some examples, the data fields may take Boolean values, with 1 as affirmative or Yes, and 0 as negative or No. In some cases, the data field "traffic_direction_desired" may also be referred to as "traffic_direction_selected", and the two may be used interchangeably throughout the application.

In one aspect, the AEE of the present disclosure optimizes deployment of workloads at the network edge. In particular, the AEE facilitates reduced latency and enhanced scalability, reliability, and availability, as well as reduced network costs.

In some embodiments, aspects of the disclosure relate to a method for administering a distributed edge computing system utilizing an adaptive edge engine, comprising: creating one or more data stores, wherein the one or more data stores comprise data pertaining to one or more of workloads, endpoints, and endpoint-hosting facilities or data centers; accessing, from a strategy store, one or more operational and functional strategies, wherein the one or more operational and functional strategies are based at least in part on one or more of default strategies, operational preferences, customer preference data, and related data describing workloads and endpoints; identifying, from the one or more data stores, one or more workloads and a plurality of endpoints based in part on the operational strategies; selecting a first workload from the one or more workloads; executing, for the first workload, at least one functional strategy of the one or more functional strategies, wherein the one or more functional strategies pertain to one or more workload control actions, wherein the one or more workload control actions comprise one or more of deploying and undeploying workloads, garbage collection, and scaling; identifying, from the plurality of endpoints, an optimal set of endpoints for deploying the first workload based in part on the executing the at least one functional strategy; and updating a state store, the state store comprising one or more states of workload-endpoint pairs, the workload-endpoint pairs associated with the one or more workloads and the plurality of endpoints.

In another embodiment, aspects of the disclosure relate to a system configured for administering a distributed edge computing system utilizing an adaptive edge engine, the system comprising: one or more hardware processors configured by machine-readable instructions to: create one or more data stores, wherein the one or more data stores comprise data pertaining to one or more of workloads, endpoints, and endpoint-hosting facilities or data centers; access, from a strategy store, one or more operational and functional strategies, wherein the one or more operational and functional strategies are based at least in part on one or more of default strategies, operational preferences, customer preference data, and related data describing workloads and endpoints; identify, from the one or more data stores, one or more workloads and a plurality of endpoints based in part on the operational strategies; select a first workload from the one or more workloads; execute, for the first workload, at least one functional strategy of the one or more functional strategies; identify, from the set of endpoints, an optimal set of endpoints for deploying the first workload based in part on the executing the at least one functional strategy; and update a state store, the state store comprising one or more states of workload-endpoint pairs, the workload-endpoint pairs associated with the one or more workloads and the plurality of endpoints. In some cases, the one or more functional strategies pertain to one or more workload control actions, wherein the one or more workload control actions comprise one or more of deploying and undeploying workloads, garbage collection, and scaling.

In yet another embodiment, aspects of the disclosure relate to a non-transient computer-readable storage medium having instructions embodied thereon, the instructions being executable by one or more processors to perform a method for administering a distributed edge computing system utilizing an adaptive edge engine, the method comprising: creating one or more data stores, wherein the one or more data stores comprise data pertaining to one or more of workloads, endpoints, and endpoint-hosting facilities or data centers; accessing, from a strategy store, one or more operational and functional strategies, wherein the one or more operational and functional strategies are based at least in part on one or more of default strategies, operational preferences, customer preference data, and related data describing workloads and endpoints; identifying, from the one or more data stores, one or more workloads and a plurality of endpoints based in part on the operational strategies; selecting a first workload from the one or more workloads; executing, for the first workload, at least one functional strategy of the one or more functional strategies; identifying, from the set of endpoints, an optimal set of endpoints for deploying the first workload based in part on the executing the at least one functional strategy; and updating a state store, the state store comprising one or more states of workload-endpoint pairs, the workload-endpoint pairs associated with the one or more workloads and the plurality of endpoints. In some cases, the one or more functional strategies pertain to one or more workload control actions, wherein the one or more workload control actions comprise one or more of deploying and undeploying workloads, garbage collection, and scaling.

In some embodiments of the method, system, and non-transient computer-readable storage medium, the optimal set of endpoints comprises two or more endpoints, and wherein each of the two or more endpoints is hosted within a different datacenter.

In some embodiments of the method, system, and non-transient computer-readable storage medium, the adaptive edge engine further comprises a location optimizer, wherein the location optimizer is configured to access data from one or more of the one or more data stores, the strategy store, and the state store; and wherein the location optimizer is configured to identify the optimal set of endpoints for deploying the first workload based in part on the executing.

In some embodiments of the method, system, and non-transient computer-readable storage medium, the customer preference data comprises one or more of latency objectives, budget constraints, location constraints, and goals. Additionally or alternatively, the customer preference data comprises one or more of latency preferences, budget preferences, location preferences, and goals, to name a few non-limiting examples. In some embodiments, the customer preference data may be used to indicate that endpoints and/or workload performance meet a set of criteria, where the set of criteria may be defined by the latency preferences, budget preferences, location preferences, and goals. As used herein, the term "preferences" refers to one or more of objectives and goals (e.g., what the customer wants, such as latency<3 ms, or a particular datacenter), as well as constraints (e.g., what the customer does not want, such as workload being deployed on a data center in a different country).

In some embodiments, prior to executing the at least one functional strategy, the method further comprises: accessing, from the strategy store, data for evaluating at least a portion of the one or more operational preferences, customer preference data, or a combination thereof.

In some embodiments of the method, system, and non-transient computer-readable storage medium, identifying the optimal set of endpoints further comprises: applying an endpoint filter function to the plurality of endpoints based in part on the accessed data; determining a set of acceptable endpoints for the first workload, wherein the set of acceptable endpoints comprises at least two endpoints hosted within at least two datacenters; identifying a set of acceptable data centers, the set of acceptable data centers including the at least two datacenters, wherein each datacenter of the set of acceptable data centers hosts at least one endpoint of the set of acceptable endpoints.

In some embodiments, the method further comprises applying one or more selection functions to the set of acceptable endpoints, wherein the one or more selection functions comprise endpoint isolation and endpoint selection; wherein the endpoint isolation comprises: isolating one endpoint from each data center of the set of acceptable data centers; and wherein the endpoint selection comprises: applying one or more endpoint selection functions to each data center of the acceptable set of data centers; and identifying an optimal set of data centers based at least in part on applying the one or more endpoint selection functions, wherein each data center of the optimal set of data centers hosts one endpoint of the optimal set of endpoints.

In some embodiments of the method, system, and non-transient computer-readable storage medium, each of the one or more states of the workload-endpoint pairs is associated with one or more of a tuple of Finite State Machine (FSM) variables or state values, a state index, a state alias, and one or more data fields.

In some embodiments of the method, system, and non-transient computer-readable storage medium, updating the state store comprises: identifying an initial state for a first workload-endpoint pair, the first workload-endpoint pair associated with the first workload; receiving from at least one logical component of the adaptive edge engine at least one input state value, wherein the at least one logical component is selected from a group consisting of a location optimizer, a health checker, and a traffic director; and identifying a new state for the first workload-endpoint pair based at least in part on the initial state and the at least one input state value. It should be noted that, updating the state store may comprise iterating through all or a portion of the workload-endpoint pairs, including workload-endpoint pairs associated with endpoints that are not in the optimal set of endpoints. In some cases, workload-endpoint pairs with non-optimal endpoints may be associated with a NULL state.

In some embodiments, the method further comprises: accessing, by a workload controller, at least a portion of the one or more operational and functional strategies, wherein the at least the portion of the one or more operational and functional strategies are associated with workload controller behavior; accessing, by the workload controller, one or more states of workload-endpoint pairs associated with the first workload and the optimal set of endpoints based at least in part on the at least the portion of the one or more operational strategies; executing, for the first workload, the at least the portion of the one or more functional strategies; and deploying the first workload on at least a portion of endpoints of the optimal set of endpoints based in part on the executing.

In some embodiments, the method further comprises: accessing, by an endpoint controller, at least a portion of the one or more operational and functional strategies, wherein the at least the portion of the one or more operational and functional strategies are associated with endpoint controller behavior; monitoring, by the endpoint controller, the state store; wherein the endpoint controller is configured to, based in part on the accessing and the monitoring: query and update the one or more data stores, perform one or more endpoint control actions, wherein the one or more endpoint control actions comprise one or more create, bring into service, or remove from service one or more endpoints of the plurality of endpoints or one or more endpoint-hosting facilities, manage endpoints, or a combination thereof.

In some embodiments, the method further comprises: accessing, by a health checker, at least a portion of the one or more operational and functional strategies, wherein the at least the portion of the one or more operational and functional strategies are associated with health checker behavior; accessing, by the health checker, one or more states of workload-endpoint pairs associated with the first workload and the optimal set of endpoints from the state store based at least in part on the at least the portion of the one or more operational strategies; executing, for the first workload, the at least the portion of the one or more functional strategies; and updating a health status for the first workload based in part on the executing, wherein updating the health status comprises updating the one or more states of workload-endpoint pairs associated with the first workload and the optimal set of endpoints.

In some embodiments, the method further comprises: accessing, by a traffic director, at least a portion of the one or more operational and functional strategies, wherein the at least the portion of the one or more operational and functional strategies are associated with traffic director behavior; accessing, by the traffic director, one or more states of workload-endpoint pairs associated with the first workload and the optimal set of endpoints from the state store; enabling or disabling network access to the first workload deployed on at least one endpoint of the optimal set of endpoints based in part on the accessing.

In some embodiments of the method, system, and non-transient computer readable, storage medium, the one or more data stores further comprise one or more of: a current status of workloads, endpoints, and metrics stores comprising forecasts, estimates, and recorded values of one or more of cost, performance, and operational metrics.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

FIG. 1C shows a transition matrix table for the FSM model in FIG. 1A, according to an embodiment of the disclosure;

FIG. 2A and FIG. 2B illustrate examples of formally complete test suites according to an embodiment of the disclosure;

FIGS. 5A and 5B depict representations of elements implementing a state store according to an embodiment of the disclosure;

DETAILED DESCRIPTION

Figure 1A:
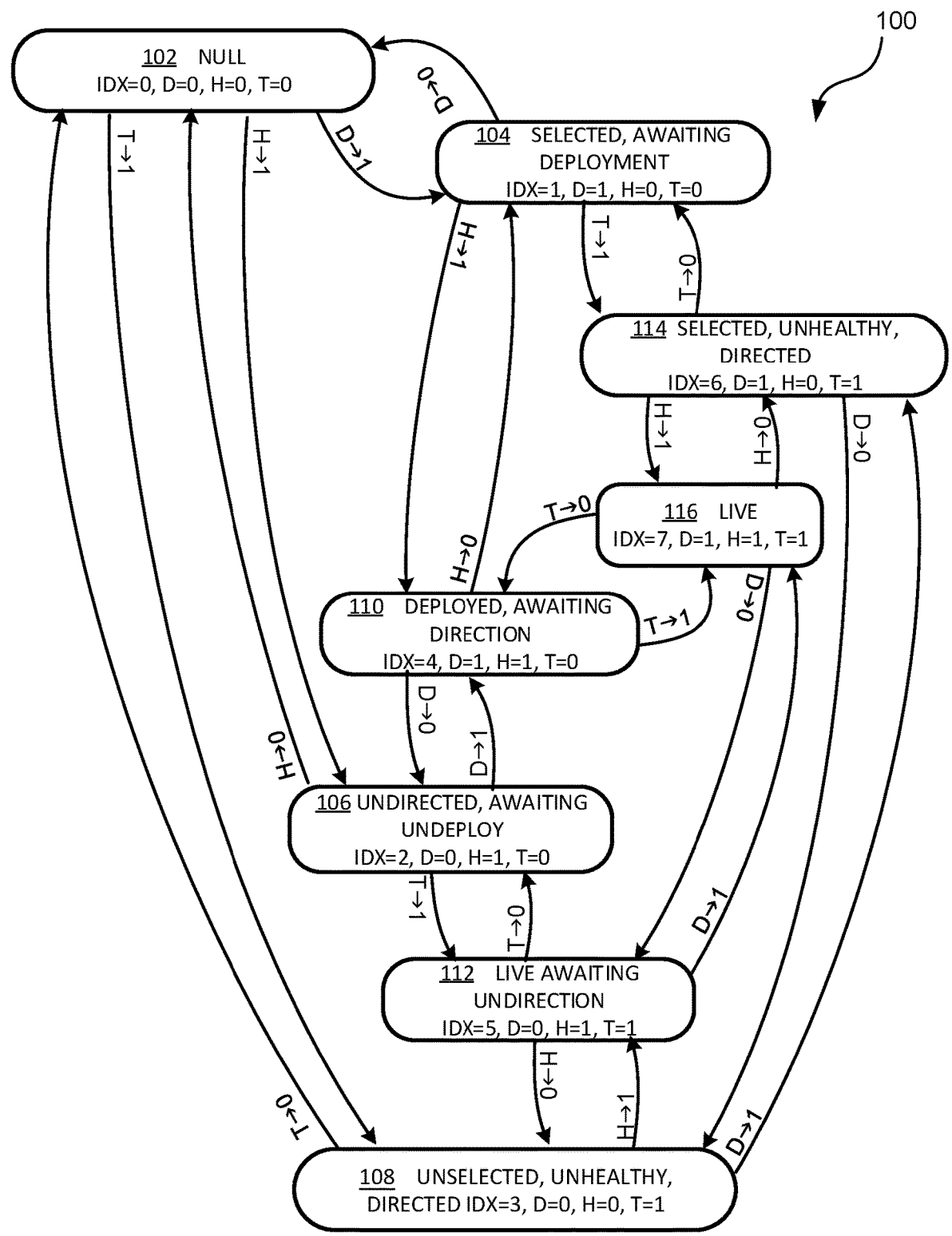
FIG. 1A shows a finite state machine (FSM) model according to an embodiment of the disclosure.

The embodiments described below are not intended to limit the invention to the precise form disclosed, nor are they intended to be exhaustive. Rather, the embodiment is presented to provide a description so that others skilled in the art may utilize its teachings. Technology continues to develop, and elements of the described and disclosed embodiments may be replaced by improved and enhanced items, however the teaching of the present disclosure inherently discloses elements used in embodiments incorporating technology available at the time of this disclosure.

The detailed descriptions which follow are presented in part in terms of algorithms and symbolic representations of operations on data within a computer memory wherein such data often represents numerical quantities, alphanumeric characters or character strings, logical states, data structures, or the like. A computer generally includes one or more processing mechanisms for executing instructions, and memory for storing instructions and data.

When a general-purpose computer has a series of machine-specific encoded instructions stored in its memory, the computer executing such encoded instructions may become a specific type of machine, namely a computer particularly configured to perform the operations embodied by the series of instructions. Some of the instructions may be adapted to produce signals that control operation of other machines and thus may operate through those control signals to transform materials or influence operations far removed from the computer itself. These descriptions and representations are the means used by those skilled in the data processing arts to convey the substance of their work most effectively to others skilled in the art.

The term algorithm as used herein, and generally in the art, refers to a self-consistent sequence of ordered steps that culminate in a desired result. These steps are those requiring manipulations of physical quantities. Usually, though not necessarily, these quantities take the form of electrical or magnetic pulses or signals capable of being stored, transferred, transformed, combined, compared, and otherwise manipulated. It is often convenient for reasons of abstraction or common usage to refer to these signals as bits, values, symbols, characters, display data, terms, numbers, or the like, as signifiers of the physical items or manifestations of such signals. It should be borne in mind, however, that all of these and similar terms are to be associated with the appropriate physical quantities and are merely used here as convenient labels applied to these quantities.

Some algorithms may use data structures for both inputting information and producing the desired result. Data structures facilitate data management by data processing systems and are not accessible except through sophisticated software systems. Data structures are not the information content of a memory, rather they represent specific electronic structural elements which impart or manifest a physical organization on the information stored in memory. More than mere abstraction, the data structures are specific electrical or magnetic structural elements in memory which simultaneously represent complex data accurately, often data modeling physical characteristics of related items, and provide increased efficiency in computer operation. By changing the organization and operation of data structures and the algorithms for manipulating data in such structures, the fundamental operation of the computing system may be changed and improved.

In the descriptions herein, operations and manipulations are often described in terms, such as comparing, sorting, selecting, or adding, which are commonly associated with mental operations performed by a human operator. It should be understood that these terms are employed to provide a clear description of an embodiment of the present invention, and no such human operator is necessary, nor desirable in most cases.

This requirement for machine implementation for the practical application of the algorithms is understood by those persons of skill in this art as not a duplication of human thought, rather as significantly more than such human capability. Useful machines for performing the operations of one or more embodiments of the present invention include general purpose digital computers or other similar devices. In all cases the distinction between the method operations in operating a computer and the method of computation itself should be recognized. One or more embodiments of present invention relate to methods and apparatus for operating a computer in processing electrical or other (e.g., mechanical, chemical) physical signals to generate other desired physical manifestations or signals. The computer operates on software modules, which are collections of signals stored on a media that represents a series of machine instructions that enable the computer processor to perform the machine instructions that implement the algorithmic steps. Such machine instructions may be the actual computer code the processor interprets to implement the instructions, or alternatively may be a higher level coding of the instructions that is interpreted to obtain the actual computer code. The software module may also include a hardware component, wherein some aspects of the algorithm are performed by the circuitry itself rather as a result of an instruction.

Some embodiments of the present invention rely on an apparatus for performing disclosed operations. This apparatus may be specifically constructed for the required purposes, or it may comprise a general purpose or configurable device, such as a computer selectively activated or reconfigured by a program comprising instructions stored to be accessible by the computer. The algorithms presented herein are not inherently related to any particular computer or other apparatus unless explicitly indicated as requiring particular hardware. In some cases, the computer programs may communicate or interact with other programs or equipment through signals configured to particular protocols which may or may not require specific hardware or programming to accomplish. In particular, various general-purpose machines may be used with programs written in accordance with the teachings herein, or it may prove more convenient to construct more specialized apparatus to perform the required method steps. The required structure for a variety of these machines will be apparent from the description below.

In the following description, several terms which are used frequently have specialized meanings in the present context.

In the description of embodiments herein, frequent use is made of the terms server, client, and client/server architecture. In this context, a server and client are each instantiations of a set of functions and capabilities intended to support distributed computing. These terms are often used to refer to a computer or computing machinery, yet it should be appreciated that the server or client function is provided by machine execution of program instructions, threads, modules, processes, or applications. The client computer and server computer are often, but not necessarily, geographically separated, although the salient aspect is that client and server each perform distinct, but complementary functions to accomplish a task or provide a service. The client and server accomplish this by exchanging data, messages, and often state information using a computer network, or multiple networks. It should be appreciated that in a client/server architecture for distributed computing, there are typically multiple servers and multiple clients, and they do not map to each other and further there may be more servers than clients or more clients than servers. A server is typically designed to interact with multiple clients.

As used herein, a proxy server is a functional equivalent of a server providing similar interface and interaction to a client in a network, but generally located or configured to provide enhanced performance to clients. In some cases, a server can be associated with a number of distributed proxy servers to provide functions such as load balancing and providing content in geographical locations proximate to clients. CDNs make use of proxy servers, or alternatively, reverse proxy servers, to serve static content from caches, reducing the load on the origin server. From a client computer perspective, a proxy server interacts in a manner identical to the corresponding server. In some cases, multiple proxy servers may be deployed as a proxy for a single server, which may enhance performance and facilitate reduced latencies. A reverse proxy is functionally equivalent to a proxy server, except that a proxy server is typically operated by or on the behalf of a client and a reverse proxy is operated by or on behalf of a web service (e.g., application). In some examples, reverse proxy servers may provide a standard interface to clients (e.g., browser applications, mobile devices), as well as other applications and services.

In networks, bi-directional data communication (i.e., traffic) occurs through the transmission of encoded light, electrical, or radio signals over wire, fiber, analog, digital cellular, Wi-Fi, or personal communications service (PCS) media, or through multiple networks and media connected by gateways or routing devices. Signals may be transmitted through a physical medium such as wire or fiber, or via wireless technology using encoded radio waves. Much wireless data communication takes place across cellular systems using second generation technology such as code-division multiple access (CDMA), time division multiple access (TDMA), the Global System for Mobile Communications (GSM), Third Generation (wideband or 3G), Fourth Generation (broadband or 4G), Fifth Generation (5G), personal digital cellular (PDC), or through packet-data technology over analog systems such as cellular digital packet data (CDPD).

A Data Center as used herein refers to a collection of co-located servers or proxy servers, that is servers that are all physically hosted on computer hardware at a single geographical location (e.g., within a single complex, building, or room). A data center typically comprises a large number of general purpose computers, which may be reconfigured to serve CDN functions. In some instances, a data center is dedicated to a specific company or service. A data center also provides support functions for the installed server computing hardware, including power, back-up power, air conditioning, physical security, and monitoring. It should be noted that data centers may differ in a number of characteristics, and therefore certain data centers may be more suited or optimal for providing a specific service or executing a certain workload. For example, data centers may differ in geographical location, computing capability, data storage, physical and data security, carbon footprint, reliability, and/or network connectivity, to name a few non-limiting examples. In any given workload deployment, any or all of these (or other data center aspects not listed) may be evaluated prior to selecting a data center for deploying a workload. Data center selection criteria may be based on any characteristic of interest. Some non-limiting examples of data center selection criteria may include geographical location, performance, security, or customer preferences.

A content delivery network (CDN), also referred to as content distribution network, is a geographically distributed network of data centers, and optionally, proxy servers. In some examples, CDNs are designed to reduce both the geographical distance, and network latencies and bottlenecks, between content servers and client devices or users. In some aspects, the goal is to provide high availability and performance by distributing the service spatially relative to end users and moving services closer to users. CDNs now serve much internet content, including web objects (e.g., text, graphics and scripts), downloadable objects (e.g., media files, software, and documents), applications (e.g., e-commerce, portals), live streaming media, on-demand streaming media, and social media sites, to name a few non-limiting examples. A variety of content can be provided by a CDN, for example media streams, software downloads, or accelerators for client applications on web or mobile devices.

The present disclosure and its embodiments are based on the concept of an AEE, which is a system for operating a distributed edge computing platform. As such, the fundament of the disclosure described herein is its behavior. Aspects of the disclosure are designed to facilitate flexibility and consistency of operation in the face of changing computer systems, networks, and architectures.

FIG. 1A shows a finite state machine (FSM) model 100 according to an embodiment of the disclosure. In some cases, an FSM model may be used to model the behavior of a system through predefining a set of states, transitions between the states, and the inputs that trigger the state transitions, to name a few non-limiting examples. To articulate the behavior of the system and ensure its obtainment, an embodiment of an AEE is modeled as a deterministic finite state machine in FIG. 1A. In some aspects, this modeling supports verifiable behavior guarantees through rigorous identification of test suites and emphasizes behavior over structure. Structural considerations in software engineering are mutable as supporting hardware and software evolve, while the behavior of a system should ideally be consistent. New features and capabilities can be added, but for existing features and capabilities, consistency of behavior demands that similar inputs continue to obtain similar results.

An AEE, in various embodiments, can be modeled as an FSM. It is a characteristic of some FSMs that all transitions are deterministic, lacking uncertainty or stochasticity. An AEE and the FSM 100 depicted in FIG. 1A is also "minimal" in that states have been exhaustively specified and it is "complete" by virtue of a transition matrix that articulates transitions from all states for all inputs. In some embodiments, this FSM may be used to specify the behavior of an AEE, regardless of the structure or architecture of its implementations or embodiments.

Figure 1B:
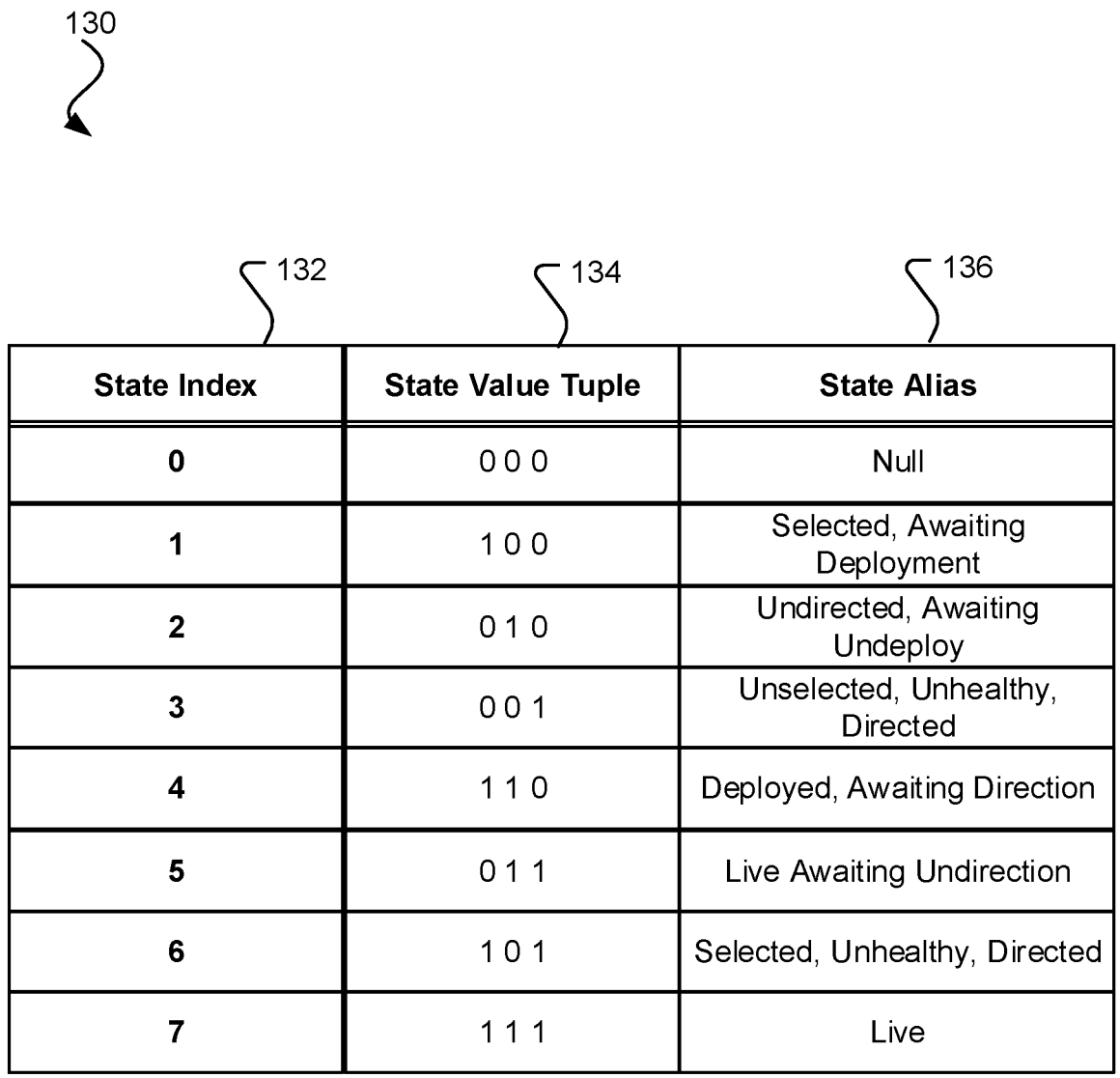
FIG. 1B depicts an enumeration of the states of the FSM model in FIG. 1A, according to an embodiment of the disclosure.

In the example depicted in FIG. 1A, eight states are defined in the FSM 100. It should be noted that the number of states are not intended to be limiting. More or less than eight states (e.g., 3 states, 4 states, 9 states, etc.) may be defined for the FSM in different embodiments. FIG. 1B enumerates and elaborates these states defined in FIG. 1A. Further, FIG. 1C enumerates the transitions between these states. Referring to FIG. 1B, in some cases, each state may be characterized in one or more ways. For instance, each state may be defined by tuple 134 formed from three binary-valued state variables, and each possible unique combination of these variables may define one of the eight example states. In some cases, each state may be further described by state index 132. In the example shown, state index may range from 0 to 7, although different numbers of state indices are contemplated in different embodiments. Those familiar with the art and in particular binary number systems, will appreciate that 3 binary valued variables m collectively be set to 8 unique combinations (i.e., since $2^3=8$), and this is the basis for the 8 distinct states shown in FSM 100 in FIG. 1A and enumerated in FIG. 1B in state definition 130. It can further be appreciated that the state indices as used in FIGS. 1A, 1B, and 1C are a result of combining the three binary state variables into a 3-digit binary word in a particular order and converting the resulting binary word into an equivalent decimal (base 10) representation.

Referring to FIG. 1B, it can be seen that states are equivalently labelled by state index 132, state value tuple 134, or state alias 136. The states are salient characteristics of an edge entity and may be given a corresponding alias 136 for simplicity of reference. It should be understood that state is not a characteristic of an AEE. Rather, the entity with state is the unit of work of the AEE, such as a workload (e.g., application), or an endpoint (e.g., server or data center) where a workload may be deployed. In other words, in the depicted embodiment, an AEE may comprise one or more entities, where each entity has a corresponding state that maps to one of the 8 states depicted in FIG. 1A at any point in time. In some embodiments, the states may be defined by a tuple of state variables. In one non-limiting example, the state variables may be labelled as: "traffic_direction_desired", "is_healthy", and "traffic_is_directed" as shown in the column corresponding to state alias 136. These state variables are further defined and described in relation to the following figures, including at least FIG. 2A.

Referring to FIG. 1A, an embodiment of the present disclosure may be modelled as FSM model 100 implementing an AEE. In the example shown in FIG. 1A, eight states are shown, but a different number of states are contemplated in other embodiments. As seen, state 102 has index (IDX) value of 0, and tuple value [0 0 0], labelled NULL. Similarly, state 104 has index value of 1, and tuple value [1 0 0], labelled SELECTED, AWAITING DEPLOYMENT. Further, state 106 has index value of 2, and tuple value [0 1 0], labelled UNDIRECTED, AWAITING UNDEPLOY.

State 108 has index value of 3, and tuple value [0 0 1], labelled UNSELECTED, UNHEALTHY, DIRECTED. State 110 has index value of 4, and tuple value [1 1 0], labelled DEPLOYED, AWAITING DIRECTION. State 112 has index value of 5, and tuple value [0 1 1], labelled LIVE AWAITING UNDIRECTION. State 114 has index value of 6, and tuple value [1 0 1], labelled SELECTED, UNHEALTHY, DIRECTED. State 116 has index value of 7, and tuple value [1 1 1], labelled LIVE.

FSM 100 of FIG. 1A also shows transitions between states, which may be triggered by a change of a value of one or more of the three input variables. Note that there may be implied transitions for cases where the input variable values do not result in a state transition, for instance, a transition that ends in the same state as it began. These are not shown to simplify the illustration. In the embodiment of FIG. 1A, the AEE model has six inputs, corresponding to a subset of the range of possible values of the binary state variables. In some examples, input values may manifest as changes to a state or state variables in a state store. These may be updated by functional modules that respond to the current state. For instance, the functional modules may execute their functions, and then transmit outputs that further evolve the state as time progresses. In some embodiments, the input values may be obtained from the operations performed by one or more logical components of the AEE, as described further in relation to the following figures.

FIG. 1C illustrates a transition matrix table 150 for a FSM, such as FSM 100 in FIG. 1A. Transition matrix 150 depicts state transitions and elaborates on the FSM 100 in FIG. 1A. Referring to FIG. 1C, transition matrix table 150 comprises one or more columns, for instance, a first column (left most column) pertaining to an initial state index 152, and one or more additional columns showing a next state index 156 based on an input index 154 (topmost row). In some cases, transition matrix table 150 may be used to determine a new or next state based on the present or initial state (i.e., initial state index 152) and input index 154. Table 150 is a transition matrix for FSM model 100 (previously described in relation to FIG. 1A) of the AEE. Each cell in the transition matrix table 150 shows the resulting state when starting at initial state 152 (row) with input index 154 (column). In this example, input index '0' causes initial state index '7' to transition to next state index '5'. Similarly, input index '3' causes initial state index '0' to transition to next state index '2'. In some instances, the initial state may not transition to a different state when given an input, for example, initial state '7' with input index '1' shows the next state is the same as the initial state (i.e., next state index is '7').

In one embodiment, FSM 100 may be an example of a discrete time system that updates its state at time intervals. The intervals may be regularly spaced or irregular as determined by timing of operations occurring in the AEE. At each instant in time the state of each AEE unit of work may be exactly one of the defined states (e.g., eight defined states). Further, in the next interval the state may remain the same, or transition to another state according to the value of the input index. It should be appreciated that FSM 100 of FIG. 1A only shows transitions resulting from one of the three inputs changing. Although it is possible that one, two, or all three inputs can change in a time interval, any multiple variable change can be treated as a series of single variable changes that are processed consecutively, or according to a prioritization model.

It should be appreciated that although the FSM model 100 depicted in FIG. 1A has eight states and three state variables, the number of states and/or state variables are not intended to be limiting. In other words, more or fewer states and state variables are contemplated in other embodiments. In some embodiments, an AEE implementation may have any number of states and state variables, and inputs, and corresponding tuples. It should be further appreciated that the state variables in the illustrated embodiment are Boolean having a range of two possible values. However, in other embodiments, state variables may be multivalued having a range of, for example, selected integers, all integers, positive integers, real numbers, character strings, an enumerated type, or any variable type that can be represented and stored in a corresponding state store.

It should be noted that the behaviors of FSMs, and AEEs, may be state-dependent and therefore architecturally independent. Any collection of logical components of an implementation of an AEE that obtain the proper inputs and states may constitute an AEE, in accordance with embodiments of the present disclosure. Such components need not necessarily interact directly with each other or actively collaborate to execute their functions. Rather, a central store of state variables, which the components read from and/or write to, may constitute signals to trigger the specified actions. In this way, the structure and embodiment of an AEE can be flexible while also representing a rigorously-defined, discrete, identifiable system.

Figure 2B:

FIGS. 2A and 2B illustrate features of embodiments of the present disclosure, in which formally complete test suites are generated and applied. As noted above, FSMs may be utilized in the design and understanding of computing systems and in software and computation verification. An FSM model 100 as depicted in FIG. 1A may be used to define an AEE and specify its behavior. In some cases, the FSM model may also serve to support methods for testing the system implementation, including, but not limited to, techniques for generating test suites. In some examples, the generated test suites may be used to verify and validate the specification of an AEE implementation. For the purposes of this disclosure, an implementation is a functional software instance of an AEE. Further, a test suite may comprise a collection of test sequences, each of which is a one-dimensional, ordered collection of inputs that are applied to the initial state of the AEE FSM model. Each test sequence triggers a series of state transitions beginning with the initial state and ending in a terminal state (terminal only with regards to the sequence). A test passes when the terminal state of a test sequence is identical between a candidate implementation and the specification. If the terminal state of a sequence is not identical, then the test fails, and the candidate implementation does not conform to the specification. A comprehensive test suite may be deployed to guarantee that an implementation conforms to its specification.

A desirable feature in system testing and verification is complete coverage, and a feature of embodiments of the present invention is a model-based specification that is used to generate such test coverage. In some embodiments, an FSM model of an AEE may be verified by using an m-complete test suite, which may guarantee complete (or substantially complete) test coverage even if a given implementation has additional (latent) states not included in its specification. If the implementation does have latent states, the test suite generation methods may take this into account to optimize coverage. To verify an implementation of the AEE, an m-complete test suite may be generated, where m-completeness refers to generating an optimal test suite under the assumption that the implementation has up to m latent states. Test suites generated for the AEE in this manner may facilitate m-complete test coverage.

Referring to FIG. 2A, table 200 illustrates alternate and equivalent naming conventions for inputs to the FSM model depicted in FIG. 1A. Table 200 illustrates an example list of six possible inputs defined in the FSM model. It should be noted that more or less inputs are contemplated in different embodiments. Column 202 in table 200 shows each input as a numerical input index, one of a list of small consecutive integers. The input index as shown in column 202 may be used in the description of test suites and/or input stimulus sequences used in testing and verification. Further, column 204 in table 200 depicts equivalent inputs (e.g., FSM variables) in the form used in the state depictions in FIG. 1A. Lastly, column 206 depicts a variable name as it appears in a state store (e.g., a state store equivalent variable).

Test suites for an FSM model may be generated using one or more techniques. In one example technique, the SPYH algorithm for test suite generation (e.g., as described in Soucha et al noted in the Summary section) may be used to generate 0-complete and 1-complete test suites for a candidate implementation of an AEE. For sake of brevity, the 0-complete test suite in which the graph edges trace test sequences and the nodes represent inputs is not shown. In one example, the 0-complete test suite contains 26 test sequences.

FIG. 2B shows an array representation of 1-complete test suite 220. Specifically, but without limitation, FIG. 2B illustrates an array comprising input index stimulus values that may be used as a test suite (or validation suite). In some cases, for instance, in software development, a test suite, or validation suite, may refer to a collection of test cases that are intended to be used to test a software program to show that it has some specified set of behaviors. In some circumstances, a test suite may comprise instructions or goals for each collection of test cases and information on the system configuration to be used during testing, Further, a group of test cases may comprise prerequisite states or steps and/or descriptions of the following tests. It can be appreciated that as the number of states increases (i.e., specified and/or latent states), the size of a complete test suite may also increase geometrically with the number of states, latent or otherwise. As shown in FIG. 2B, the 1-complete test suite 220 comprises 136 test sequences (e.g., [2,5], [3,5] . . . [3, 3, 5] . . . [1, 2, 1, 5], etc.). In some examples, these test sequences may be applied to an implementation of AEE for testing if the AEE implementation meets its FSM specification.

To expound the present disclosure, the AEE may be illustrated as a logical architecture for performing a collection of tasks for operating a distributed edge computing platform, as detailed herein. The flowcharts and block diagrams in the following figures illustrate the architecture, functionality, and operation of possible implementations of devices, systems, methods, and computer program products according to various embodiments of the present disclosure. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

In some cases, the fundamental units of work for the AEE may comprise one or more of workloads, endpoints, and workload-endpoint pairs. The term workload as used herein may represent a collection of software, often comprising multiple, constituent applications, built to run on a server and provide services to client software, e.g., user agents. A user agent, per the World Wide Web Consortium's User Agent Accessibility Guidelines, may refer to any software that retrieves and presents Web content for end users. For example, a workload may comprise a web application. In some other cases, a workload may comprise a collection of mutually-dependent software applications (e.g., web browser applications) built to run on a remote server and connect to user agents through HTTP or other protocols. In some embodiments, the web application may be HTTP ingress, a Web Application Firewall, and/or HTTP egress modules.

In some examples, an endpoint, per the Transmission Control Protocol/Internet Protocol (TCP/IP) model, may refer to a point of application layer ingress into the workload with specific protocols and protocol options available to connecting clients, including user agents. An endpoint is typically an individual server operating singly or as part of a cluster. A computer cluster is a collection of connected, coordinated computers (cluster nodes) that function as a single server. Some non-limiting examples include a cluster of physical or virtual servers located within a data center.

For the purposes of this disclosure, the term "deploying" or "deployment" may refer to the process of scheduling and/or installing a workload on an endpoint. Further, a successful deployment is a deployment that results in a properly and completely functioning workload on the given endpoint. Contrastingly, the terms "undeploying" or "undeployment" may refer to the reverse of deploy actions. In one example, undeploying may comprise removing a workload from an endpoint by terminating the instance(s) of the application running on the endpoint, which may serve to free up resources (e.g., computing resources) previously allocated to the workload.

Scaling may refer to an action taken upon workloads and/or endpoints. While scaling is generally qualified as horizontal or vertical, other scaling qualifications (e.g., both horizontal and vertical) may be contemplated in different embodiments. In some cases, horizontal scaling may signify the modification of the number of instances (e.g., adding or removing replicas of a workload or nodes in a cluster). Further, vertical scaling may refer to the modification of the resources allocated to an instance of the entity being scaled. In the case of a workload, vertical scaling may comprise increasing or decreasing the quantity of processor(s), memory, or other resources allocated to that instance of the workload. In the case of endpoints as computer clusters, vertical scaling may comprise replacing an existing node (or nodes) with others comprising more or less resources.

With respect to the AEE, strategies are algorithms manifesting specific implementations of a generic method and/or behavior. In some aspects, the strategy pattern and/or behavioral software design pattern may enable flexibility and customization across one or more use cases. In some cases, a software implementation using a strategy pattern may comprise a "context" and one or more strategies, where the context may be defined by the resultant behavior. In some cases, the context may be ignorant of how the behavior is manifested, until runtime when the strategy is implemented. It should be noted that the logical components of the AEE may follow the strategy pattern so that component methods can be adapted to customer choice, system requirements, data types, and other considerations. For example, the AEE health checker component (HC) may utilize one or more strategies to implement varied health check algorithms. In this way, health checks may be suited to definitive and parsimonious evaluation of diverse workloads. In some embodiments, health checks may differ between different types of workloads (e.g., database workloads, Node.js e-commerce applications, and machine learning model-serving workloads may all be associated with different health checks). Alternatively, health checks for different types of workloads may be similar or substantially similar in nature. With the strategy pattern, the HC may be ignorant of the health check implementations until runtime. It should be noted that health checks may or may not need to be defined exhaustively within the HC to meet the demands of current and/or future workloads. For instance, in some embodiments, health check strategies may be defined and implemented as needed without significantly altering the structure or function of HC, AEE, and/or other AEE components.

Figure 3:
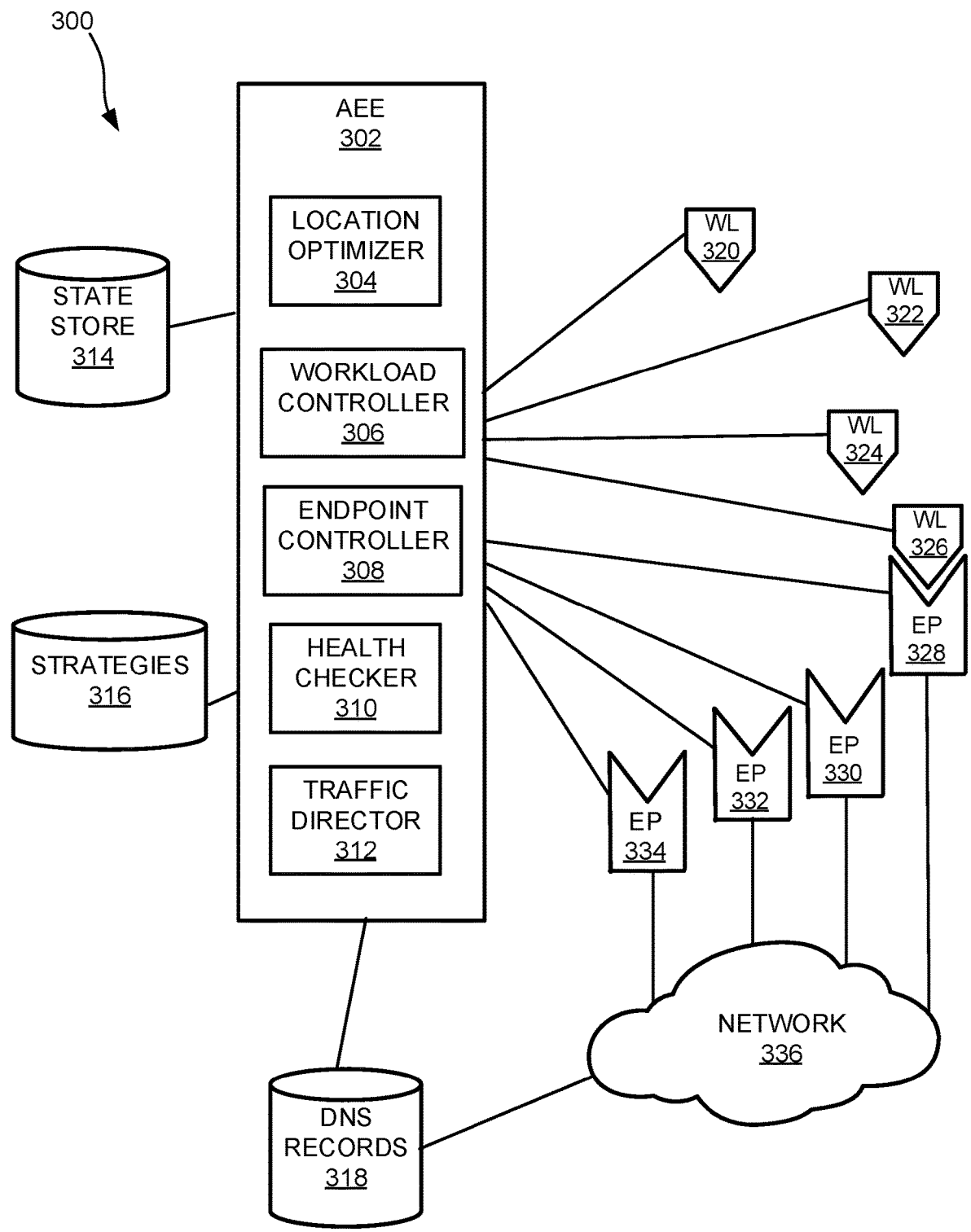
FIG. 3 illustrates a system configured for administering a distributed edge computing system incorporating an Adaptive Edge Engine (AEE), according to an embodiment of the disclosure.

FIG. 3 illustrates a system 300 configured for administering a distributed edge computing system incorporating an AEE (AEE), according to an embodiment of the disclosure. The depicted embodiment of system 300 includes network 336 and its associated data connections, a Domain Name System (DNS) record storage 318, an AEE (AEE) 302, where the AEE 302 comprises one or more logical components, including a workload-endpoint state store 314, a strategy store 316, a location optimizer 304, a workload controller 306, an endpoint controller 308, a health checker 310, and a traffic director 312. It should be noted that the logical components of the AEE 302 are not intended to be limiting, and other logical components are contemplated in different embodiments. Furthermore, it should be appreciated that although one AEE 302 and one instance of the logical components are shown, this is only to facilitate explanation. For instance, in some embodiments, the system 300 may comprise multiple instances of AEE 302, workload-endpoint state store 314, strategy store 316, location optimizer 304, workload controller 306, endpoint controller 308, health checker 310, and/or traffic director 312. Additionally or alternatively, the system 300 may support the use of other components not illustrated in FIG. 3. Furthermore, the system 300 may be configured to scale to large numbers of instances and users by replication of one, some, or all of these logical components. In some cases, these replications may include hundreds, thousands, or millions of instances.

It should also be appreciated that the components shown in FIG. 3 comprising AEE 302 are representative and in other embodiments of the present invention, AEE 302 may have fewer or more components than those illustrated in FIG. 3. In addition some embodiments of the present disclosure may not contain all of the components shown in AEE 302. Alternatively, in some embodiments, the system 300 may contain additional components not shown, or contain multiple instances of components.

As shown, FIG. 3 also illustrates workloads 320, 322, 324, and 326; and endpoints 328, 330, 332, and 334, which are some examples of elements or objects upon which AEE 302 operates. In some embodiments, system 300 may be configured to pair or deploy a workload to a suitable endpoint. In this example, workload 326 may be deployed at endpoint 328. In some embodiments, DNS records storage 318 may be used to direct incoming network traffic or requests from network 336 to an appropriate endpoint, so that the request may be routed to an appropriate workload to receive and process the request. It should be noted that other techniques of network traffic routing, not based on DNS record manipulation, are contemplated in different embodiments. It should be appreciated that the small number of endpoints and workloads shown in FIG. 3 is only to facilitate explanation and does not imply any limit to the capability of the disclosure or its embodiments.

In some embodiments, the logical components of AEE 302 may be configured to operate independently of each other to provide deliverables for customer or user workloads. In other words, the logical components of AEE 302 may be configured to work without any direct, mutual dependency. For instance, location optimizer 304, workload controller 306, endpoint controller 308, health checker 310, and/or or traffic director 312 may be designed to operate independently and may not require any other component to function. In some embodiments, one or more of location optimizer 304, workload controller 306, health checker 310, and/or traffic director 312 may be configured to interact with state store 314. Further, endpoint controller 308 may be configured to operate on endpoints and/or workloads independent of state store 314.

In some cases, the state store 314 is a repository of state pertaining to units of work, which are typically, but not always, workload-endpoint pairs. In some cases, the endpoint may be a computer cluster. The state store 314 may be configured to passively coordinate the operations of AEE 302 by providing a shared locus of information exchange between the various logical components of the AEE 302.

Figure 4:
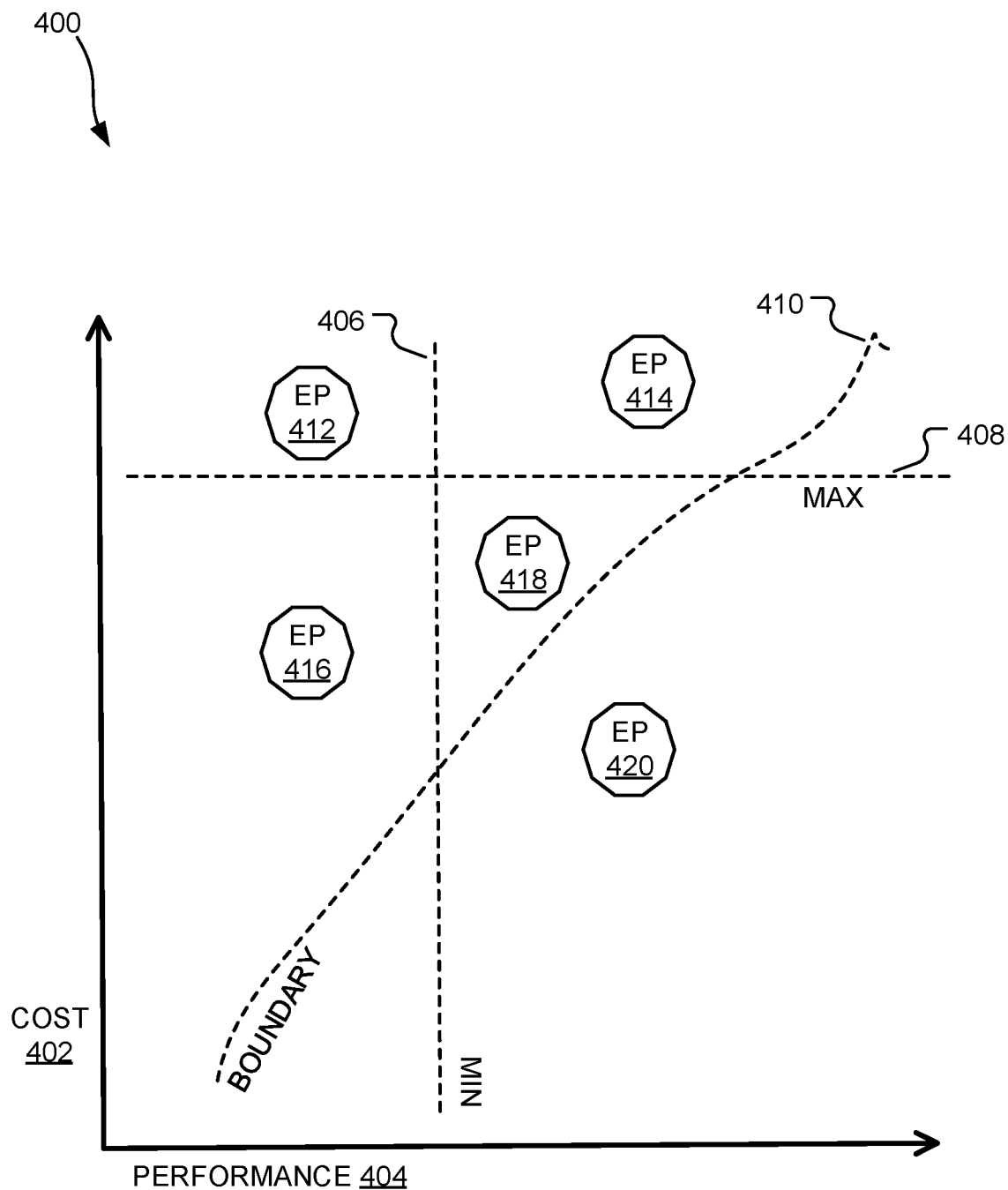
FIG. 4 illustrates a cost-performance graph for various endpoints, in accordance with one or more implementations.

FIG. 4 illustrates a graph 400, where graph 400 pertains to a model of endpoint selection strategy as could be implemented by a location optimization component of an AEE. The process of location optimization is a process of meeting one or more goals subject to one or more constraints. Location is meant to represent "where a workload is deployed", which is ultimately a set of endpoints. Location also carries more specific meaning in terms of the physical location where the endpoint is installed, the endpoint's location within a network, etc. The extent and relevance of these specific features of location are determined by the strategies employed. The outcome of the location optimization process as illustrated is a set of endpoints selected for deployment of one or more workloads. Location optimization strategies define a set of data and algorithms suitable for selecting deployment locations to meet the strategies goals subject to the strategy's constraints.

Specifically, but without limitation, FIG. 4 graphically depicts a model of a strategy for selection and/or filtration of endpoints using their characteristics, according to an embodiment of the present disclosure. As shown, graph 400 comprises a vertical axis 402 representing cost, and a horizontal axis 404 representing performance. Five endpoints 412, 414, 416, 418, and 420 are labeled on graph 400, where each endpoint is located according to its performance and cost characteristics. FIG. 4 also shows three different constraints, where constraint 406 defines a minimum acceptable performance limit, constraint 408 defines a maximum cost, and constraint 410 defines a cost/performance boundary. It should be appreciated that graph 400 shows only two characteristics, cost 402 and performance 404, for simplicity. Embodiments of the present disclosure may include multi-dimensional characterization of endpoints. For example, multi-dimensional weighted cost or objective optimization functions, or heuristic evaluation may be contemplated in different embodiments.

As shown in FIG. 4, one strategy may comprise simultaneously applying maximum cost constraint 408 and minimum performance constraint 406 to the one or more endpoints (e.g., endpoints 412, 416, etc.). In this case, endpoints 418 and 420 satisfy both constraints. In another strategy, cost/performance boundary constraint 410 may be applied to the one or more endpoints, with the result that only endpoint 420 satisfies constraint 410. In some cases, the constraints and characteristics applied may be defined by strategies and policies as described further herein.

In some examples, each of the one or more endpoints may comprise one or more 'notable' properties and/or characteristics. These properties and/or characteristics may be evaluated prior to deployment of workloads. Some non-limiting examples of properties and/or characteristics include location, performance, cost, security, network connectivity and latency, reliability, or carbon footprint. In some cases, workload deployment to endpoints may comprise considering one or more of these properties and/or characteristics. Further, some properties or characteristics may be associated with a higher weight (i.e., more important) than others. As noted above, the evaluation and selection of endpoints suited for a workload may be based in part on applying one or more policies and strategies, as described later in the disclosure.

One inherent characteristic of each endpoint is its location, which is determined by the geographic location of the data center in which it is installed, where it is situated within the internet and other computer networks, etc. A location may comprise a set of geographical coordinates (e.g., latitude and longitude), a zip code, a street address, etc. Further, the location of an endpoint may determine its physical distance from users. In some cases, the physical distance between the endpoint and a user may serve to reduce latency and/or optimize data rates, for instance. Said another way, it may be desirable to deploy a workload at an endpoint proximal to an end-user. In some other cases, the location can be conceived as a location within a network. In such cases, the distance may be considered in terms of network traffic characteristics such as latency and data rate in interconnecting network segments. In some circumstances, the location of a data center may subject it to various legal or regulatory constraints (e.g., GDPR in the EU) that would affect its suitability for a given workload based on national or regional boundaries.

In some cases, each data center may be associated with one or more characteristic properties that may also apply to the endpoints located in the data center (i.e., in addition to the endpoint location). Some non-limiting examples of data center properties may include reliability, maintenance, power and back-up power systems, cooling and air conditioning effectiveness, etc. Additionally or alternatively, deployment decisions may also consider the identity of the owner or operator, or nationality, of the data center for reasons such as competitive landscape, access, previous experience, affiliation, loyalty, protection of proprietary data, to name a few non-limiting examples.

State Store

FIGS. 5A and 5B depict representations of elements implementing a state store, according to an embodiment of the disclosure. For instance, FIG. 5A depicts a table 500 in a relational database, where the table 500 represents one example of a state store. Relational databases are known in the art and available as open source and/or commercial products. In one non-limiting example, the state store may be implemented using an ORACLE database, where the ORACLE database is stored on a server or computing platform, such as server 1802 described in relation to FIG. 18. In some other cases, the table 500 (i.e., the state store) may be one of a SQL Server, MySQL Server, SQLite Server, or an IBM DB2 Server, to name a few non-limiting examples. As shown in FIG. 5A, the state store may be implemented as table 500 comprising one or more table entries, where the table entries may be used to store one or more state variables in a relational database management system. In the example shown, table 500 comprises one or more rows and columns corresponding to aspects and variables of an AEE (e.g., shown as AEE 302 in FIG. 3) and its state. In some cases, the vector of state variable values (e.g., State Variable 1, State Variable 2, State Variable 3) may collectively define the state. Each row in table 500 (i.e., state store) may correspond to a record, for instance, a workload element (e.g., a workload, or a workload-endpoint pair). Furthermore, each column in table 500 represents an attribute, and stores values for a data field, such as Identifier (ID), Workload (WL), Endpoint (EP) and state variables State Var 1, State Var 2, and State Var 3. In some embodiments, state variables State Var 1, State Var 2, and State Var 3 correspond to the state variables "traffic_direction_desired", "is_healthy", and "is_traffic_directed", respectively. In some examples, the data fields may take Boolean values, with 1 as affirmative and 0 as negative.

FIG. 5B illustrates an alternative embodiment, where the state store is based on text block 520 containing name-value pairs. It should be appreciated that many different techniques can be applied to implement state storage, all in accordance with the present disclosure, which does not rely on any specific state storage scheme. For example, XML, formatted data, comma separated list, relational database, or binary representations are all possible techniques for implementing a state store. It should also be appreciated that state storage may be monolithic or distributed (i.e., redundant).

Figure 6:
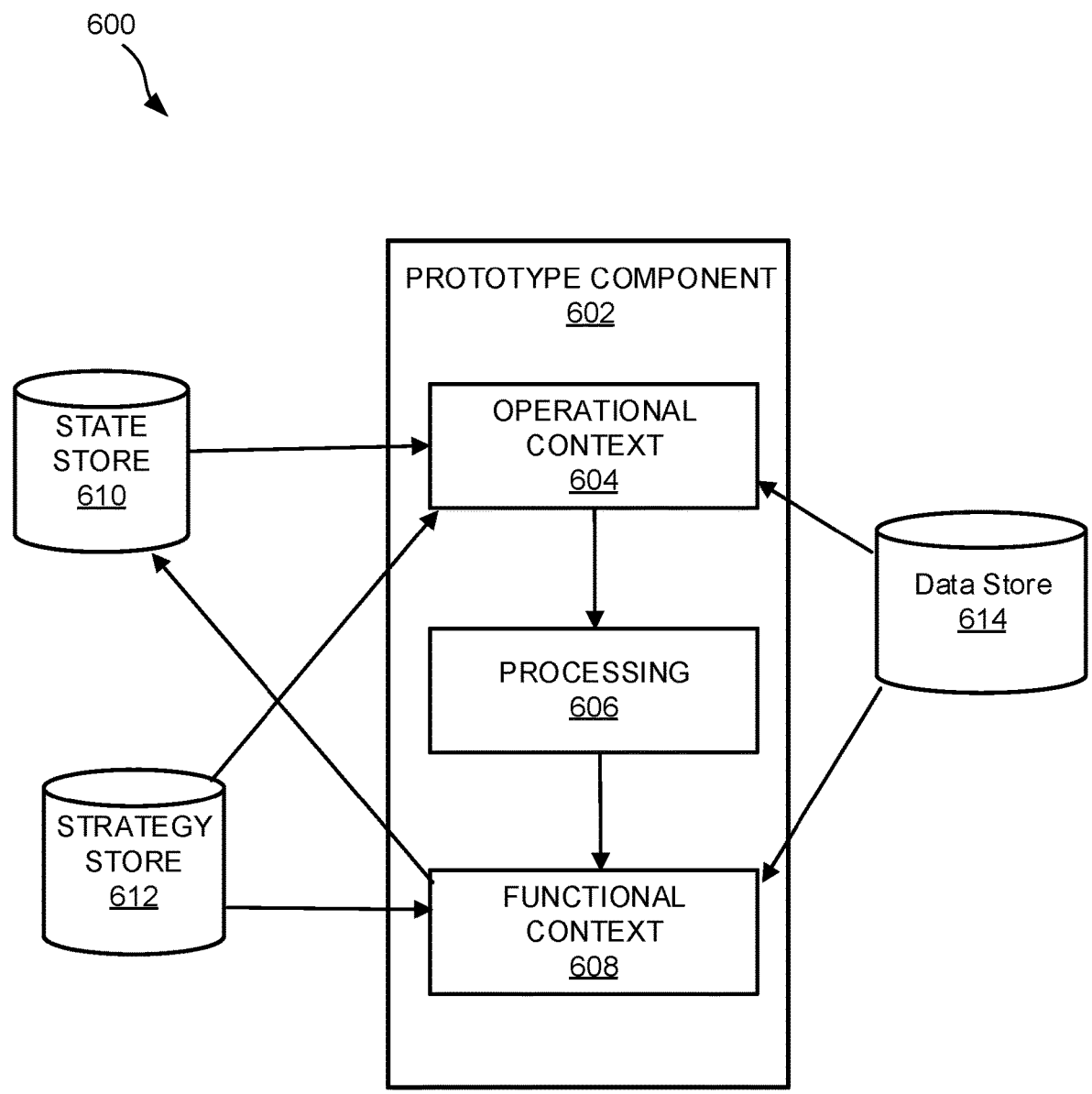
FIG. 6 illustrates an example logical architecture of a prototypical component of an AEE, according to an embodiment of the disclosure.

FIG. 6 illustrates an example logical architecture 600 of a prototypical component of an AEE, such as AEE 302 previously described in relation to FIG. 3. As used herein, the term component signifies a logical unit of behavior within an AEE. For the purposes of this disclosure, a logical component description should be understood to describe functions, data flows, and contexts that characterize a component and its interaction with other elements of the AEE (i.e., as contrasted with the physical hardware on which elements of the AEE are executed). In some examples, the logical architecture and the components are to be understood as including at least an executable software system, which may be used to configure computing systems as described herein. It should be noted, however, that a logical component depicted as singular and monolithic may, in physical implementations, have multiple instances that may be distributed for scaling or redundancy or other reasons. Thus, physical implementation details are not shown in the component diagrams.

In some cases, a logical component may comprise one or more strategy contexts and/or a collection of data manipulation functions and processes. In some cases, the data manipulation functions may serve to ensure that the inputs and outputs for component strategies are compatible with embodiments of the AEE, as well as the behavior of the component.

Referring to FIG. 6, the logical architecture 600 comprises a prototype component 602, a state store 610, a strategy store 612, and a data store 614. It should be noted that more than one data store 614 may be utilized, in some embodiments. In some cases, the prototype component 602 may operate in one or more of an operational context 604 and a functional context 608 through processing 606. In some cases, the operational context 604 of the prototype component 602 accepts strategies (e.g., operational strategies) from the strategy store 612 that define how the component operates and interacts with its fundamental units of work (e.g., a workload, a workload-endpoint pair, a datacenter or endpoint-hosting facility, etc.). An operational strategy, for example, may specify that the prototype component 602 runs as multiple parallel instances, taking work signals from one or more message queues. Another exemplary operational strategy may direct the component 602 to operate as a single instance iterating through a list of work items. Thus, operational strategies may define how the component gets its work (e.g., how the component is allocated its work, assigned its work, etc.).

In some cases, the functional context 608 of component 602 may accept one or more strategies (e.g., functional strategies) from the strategy store 612, where the strategies pertain to how the component performs the work (i.e., the strategies may govern how the component does its work). In some embodiments, functional strategies may satisfy the behavioral definition of the component but may implement any variety and combination of suitable algorithms, instructions, etc. In some cases, the instructions may be stored or embodied on a non-transient computer-readable storage medium, and the instructions may be executable by one or more processors to perform the functions of the component (e.g., obtaining a location optimization solution by a Location Optimizer (LO), further described in relation to FIGS. 7-9). In the case of a health checking component, exemplary functional strategies may correspond to health checks, or health verification tests, of a workload deployment to verify its proper behavior. In some or all cases, the strategy pattern facilitates implementation of a multitude of strategies in concert. Component 602 may, optionally, receive additional data feeds from data store 614, where the data feeds may be specific to each component and its needs. For instance, FIG. 8 illustrates a LO 856 receiving one or more data feeds (e.g., endpoint data feed 850), workload data feed 852, and/or strategies 854, where the strategies 854 may comprise operational and functional strategies.

It should be understood that although certain related elements are shown in conjunction with each component figure, they may be shared among one or more AEE components. For example, data store 614 and/or state store 610 may be accessible to all AEE components and instances rather than being separate storages for each component.

In some embodiments, strategies for components may be accessed from one or more sources, including commercial, open, and custom, internally-developed, proprietary software. Strategies as used herein are sometimes referred to as strategy patterns.

It should be noted that, the present disclosure does not generally rely or depend on any specific strategy or set of strategies for proper function of the AEE or its components in accomplishing its objectives, but rather provides a framework for employing one or more strategies.

Figure 7:
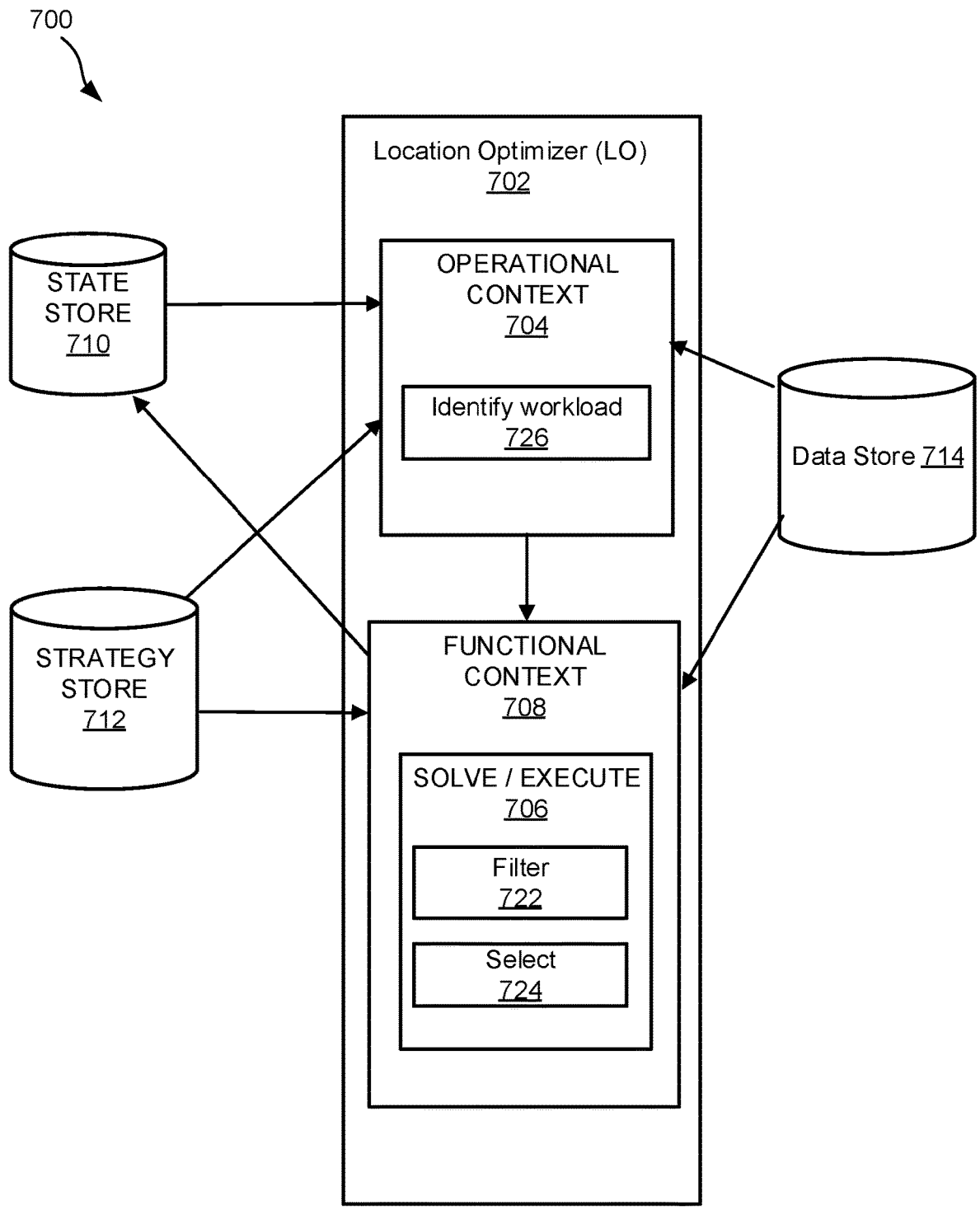
FIG. 7 illustrates a system diagram of a location optimizer according to an embodiment of the disclosure.
Figure 8:
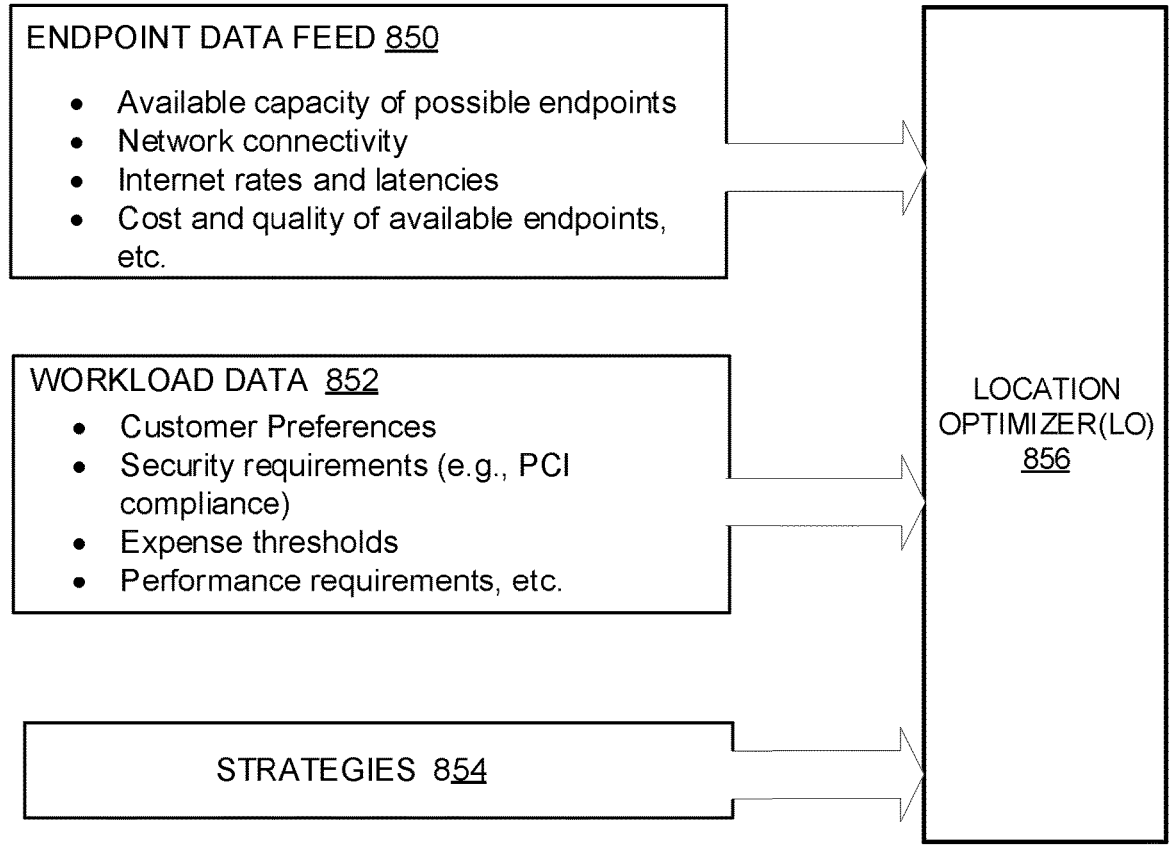
FIG. 8 illustrates examples of inputs to a location optimizer according to an embodiment of the disclosure.

FIG. 7 schematically depicts a system diagram 700 of a location optimizer (LO) logical component, according to an embodiment of the disclosure. As shown, the system diagram 700 comprises an LO component 702, a state store 710, a strategy store 712, and a data store 714, which may be similar or substantially similar to the state store 610, strategy store 612, and data store 614, respectively, previously described in relation to FIG. 6. In some embodiments, LO 702 may be configured to update or generate a state variable corresponding to "traffic_direction_desired" in state store 710. In some cases, the state variable corresponding to "traffic_direction_desired" may be one example of an input to an AEE FSM, previously described in relation to FIGS. 1A-C and 2A-B. The functional strategies of LO 702 may be obtained from strategy store 712. Further, the functional strategies may be applied in functional context 708 through solve/execute process 706 to identify an optimal set of endpoints associated with a given workload, where the given workload may have been identified 726 in operational context 704 (e.g., by applying one or more operational strategies in operational context 704, where the operational strategies were accessed from strategy store 712). In some cases, after identifying the optimal set of endpoints (i.e., following the solving/executing process 706), they may be stored in state store 710. In some cases, the functional context of the LO component 702 may accept one or more location optimization strategies from the strategy store 712, where the location optimization strategies may include a subset of the functional strategies from the strategy store 712 that are specific to LO behavior. Some non-limiting examples of strategies received from the strategy store 712 may include a filter strategy (shown as filter 722) and a select strategy (shown as select 724). Additionally or alternatively, examples of strategies may include mathematical methods of finding supremum of an objective function subject to constraints, or other logical or procedural algorithms that effectively identify a suitable endpoint or endpoints for each workload, from among a set of candidate endpoints. To help illustrate the flexibility and specificity of the strategy pattern in the illustrated embodiment of LO, some example classes of LO functional strategies are presented below.

As noted above, one class of strategies is a "filter." In some cases, filters may be implemented as binary vectors with a value for every endpoint denoting acceptable (1) or unacceptable (0). In the case of a binary vector, the values of the vector indicate the acceptability of every available endpoint. Any number of such filters may be combined element-wise such that the result is a single filter vector expressing a logical union of the set of combined filters. By example, a filter may prevent inclusion of endpoints in the selected set based on traits specific to the endpoints. For example, the owners of a given workload may want their workload to run on only physical (e.g., "bare metal") servers (cluster nodes) that meet or exceed some stated structural and/or performance specifications. In such cases, filters may be used to limit the set of possible endpoints to meet these criteria. In some cases, a bare-metal server may refer to a computer server that hosts one tenant or consumer only, as opposed to servers that can host multiple tenants utilizing virtualization and cloud hosting. In some other cases, the term bare machine (or bare metal) may refer to a computer executing instructions directly on logical hardware without an intervening operating system. In some cases, a bare machine or bare-metal implementation may be configured to run faster and/or use less memory than a computer or server running an operating system (i.e., since operating systems need some execution time and memory space to run, which may no longer be needed on bare-machines). In some cases, bare machines may exhibit higher power efficiency than computers with operating systems.

Another class of functional strategy is a selector strategy. In some examples, this strategy type uses active calculations to make a selection. Furthermore, this class of strategy may be used to return a selection of endpoints that optimize (e.g., minimize) an objective function subject to specified constraints, by any of a variety of suitable algorithms. Some non-limiting examples of LO selectors include optimization functions for maximizing performance (e.g., minimizing expected network latency) subject to budgetary constraints. In some cases, such LO selectors may be configured to operate over one or more sets of acceptable endpoints, where the sets may have been created by previous application of one or more other strategies, such as a filter strategy. In some cases, a set of acceptable endpoints may comprise at least two endpoints, each hosted on a different data center. Further, each endpoint may comprise one or more clusters within a data center (also referred to as an end-point hosting facility). With regards to workload deployment, the LO may be configured to refrain from allocating multiple endpoints or clusters within the same data center. In such cases, the LO may be configured to identity a set of acceptable data centers and then isolate at least one endpoint or cluster within each data center, which may serve to ensure fault-tolerance (e.g., failure of one data center may allow other instances of the workload on one or more other data centers to continue running).

Those familiar with the art will appreciate that selector functions can be implemented using a number of known techniques from the fields of linear programming, mathematical optimization, cost functions, clustering, and the like, and that such techniques can be generalized to consider multiple dimensions (i.e., endpoint properties) and each dimension may be given equal weight or a weighting coefficient according to its relative importance in the outcome.

In one example, the selector 724 defines one or more of an objective function and decision variables for various combinations of acceptable (post-filter) endpoints and user-agent locations (e.g., to some degree of geo-spatial or network resolution). In such cases, the objective function is the dot product of the matrix of decision variables and a matrix of coefficients corresponding to the product of the hypertext protocol (HTTP) request traffic volume and the network latency along the network arc implied by each combination of user-agent location and endpoint location. Additionally or alternatively, a cost constraint may be formulated as a dot product of the decision variable matrix and a matrix of costs for servicing the user-agent request volume at the endpoint for each network arc corresponding to each decision variable. Other constraints may be formulated in a similar manner. In some cases, the results of the selection (optimization) may allow the LO to pass input values corresponding to state variables to the state store 710, thus triggering state transitions for every endpoint for this workload, previously described in relation to FIG. 1A. Other workloads may be processed similarly, although their corresponding functional strategies may differ from those illustrated here.

In some embodiments, multiple strategies may be implemented in concert. For example, one or more default strategies may be included for one or more workloads, where the one or more default strategies may be associated with filtering out endpoints that are presently not available (e.g., due to being under maintenance or other operational conditions), ensuring fault tolerance of a selected endpoint set, to name a few non-limiting examples. Furthermore, one or more additional strategies that meet specific demands of a workload may be added to these defaults, creating custom solutions as composite strategies.

FIG. 8 depicts a data flow 800, showing some examples of data feeds and inputs to a Location Optimizer (LO) 856, according to an embodiment of the disclosure. In some cases, the LO 856 may be similar or substantially similar to the LO 304 and LO 702 previously described in relation to FIGS. 3 and 7, respectively. In some cases, data flow 800 comprises one or more data feeds, such as an endpoint data feed 850, a workload data feed 852, a strategies data feed 854, to name a few non-limiting examples. In some cases, the workload data feed 852 may comprise a metric pipeline of workload and/or endpoint performance requirements, as well as other workload related data, such as throughput, traffic, resource consumption, status, or any other metrics for the AEE. Additionally or alternatively, workload data feed 852 may also comprise a forecasted hosting cost per workload across the one or more endpoints. As shown, the configuration of inputs for a given workload to the LO 856 may be based in part on workload, endpoint, and/or data center specific requirements, customer preferences, network limitations, etc. In some cases, the LO 856 may be configured to access the workload data feed 852 from a strategy store and/or a data store, such as strategy store 712 and/or data store 714 previously described in relation to FIG. 7.

While shown as serial or sequential data feeds, it should be understood that, in some embodiments, the LO 856 in FIG. 8 may be configured to access multiple data feeds in parallel. Additionally or alternatively, LO 856 may access data items actively or passively. In some cases, the data may be historical data or forecasted data (e.g., data resulting from projection, forecast, prediction, extrapolation, or similar operations).

In some embodiments, the scope and structure of optimizations performed by LO 856 may be flexible and configurable in nature and may utilize a combination of network limitations and customer preferences. In some cases, the network limitations may be based at least in part on network performance (e.g., network connectivity and speeds across the internet) and/or network locations (e.g., current status of potential endpoints). Thus, in some aspects, the LO may serve as an optimization engine configured to process multiple data feeds and function inputs, based on which it may build and solve custom optimizations for each workload. It should be noted that the data feeds are not part of LO, but they point to the flexibility and scope of data that can be accepted and processed by the LO. Some non-limiting examples of data feeds may include: a snapshot of possible network locations, customer preferences or customer inputs of preferences (e.g., latency objectives, budget constraints, location constraints, etc.), network performance (e.g., network connectivity and speeds across the internet), and cost computations. It should be noted that this is not an exhaustive list, and other data feeds are possible, in different embodiments. In some examples, a data feed comprising a snapshot of all possible network locations may be influenced by the actions of the other components of the AEE, allowing the LO to access a comprehensive, current status of potential endpoints. Furthermore, the one or more customer inputs of preferences may be packaged into strategies that are passed to the LO and used to structure the optimization. In some examples, the cost computation data feed may comprise an online data feed via the AEE's metrics pipeline, a forecasted hosting cost per workload across all endpoints, or a combination. This may allow the LO to build and solve a custom optimization for a workload while meeting budget constraints set by the customer.

In some aspects, the LO 856 may, in the functional context, access data on workloads, endpoints, and any other applicable data (e.g., network performance data, including connectivity quality, internet speed, etc.) for executing its functional strategies. In some cases, the functional strategies may call for a particular set of data, include instructions for obtaining said data and evaluating it to obtain an LO solution. For instance, a functional strategy may instruct the LO 856 to obtain forecasted traffic data (e.g., to an endpoint or datacenter) and compare it to a threshold. In one non-limiting example, if the forecasted traffic>threshold for an endpoint, the LO 856 may refrain from including the endpoint in the optimal set of endpoints.

Figure 9:
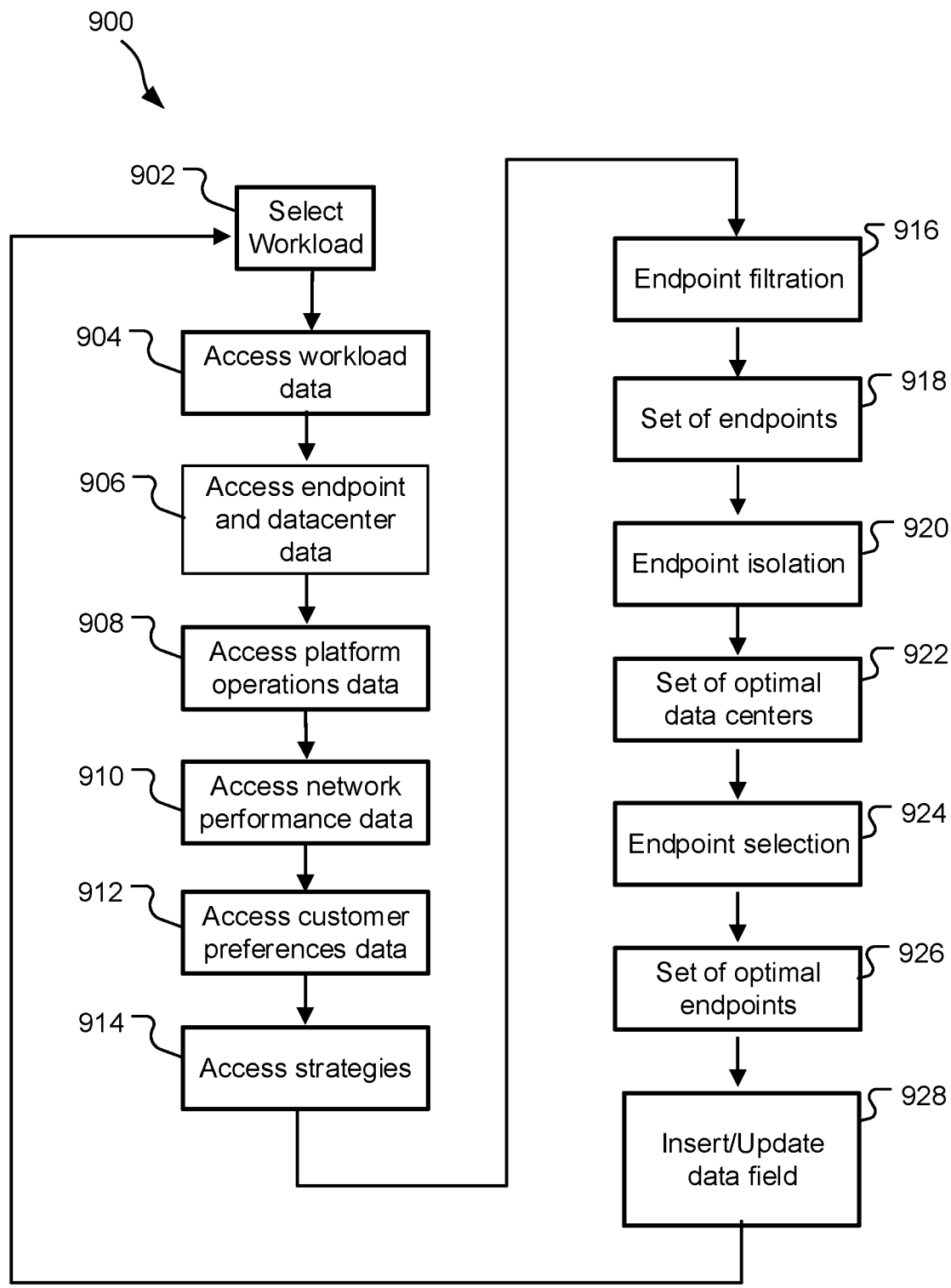
FIG. 9 illustrates a flowchart of a method for location optimization according to an embodiment of the disclosure.

FIG. 9 illustrates a flowchart 900 of a method for location optimization (e.g., by a location optimizer of the AEE) in accordance with one or more implementations. In some examples, the process flow in flowchart 900 may be implemented using one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations described in flowchart 900 in response to instructions stored electronically on an electronic storage medium. The one or more processing devices may include one or more devices configured through hardware, firmware, and/or software to be specifically designed for execution of one or more of the operations of flowchart 900.

At 902, a workload is selected for optimizing, where the selection may be based in part on accessing one or more operational strategies from a strategy store. In some cases, the operational strategies may be specific to LO behavior. In some cases, the location optimizer may select the workload for optimizing. In one embodiment, the location optimizer operates on one workload at a time. In another embodiment, the location optimizer may be configured to operate on or process multiple workloads in parallel. In yet another embodiment, the AEE has more than one location optimizer component and may be capable of optimizing the location of multiple workloads simultaneously.

After selecting the one or more workloads at 902, the location optimizer or the AEE may access one or more data feeds. For instance, the location optimizer may access workload data at 904, endpoint/data center data at 906, platform operations data at 908, network performance data at 910, and customer preferences data at 912. In some embodiments, one or more of these steps may be skipped (e.g., the location optimizer may skip accessing platform operations data at 908). While shown as serial or sequential data feeds, it should be appreciated that the location optimizer may be configured to access multiple data feeds in parallel, for instance, from a data store and/or a strategy store. In some cases, the location optimizer may access the data actively or passively. Further, the data may be historical data or data from forecast techniques, for example, prediction, interpolation, extrapolation, and the like. In some embodiments data forecast operations may be performed in an instance of a LO, while in other embodiments the forecast operations may be performed elsewhere in the data feed pipeline. In yet other cases, forecasted traffic data may be obtained from a third party data store associated with a data center company, cloud hosting company, etc.

After accessing the data, one or more location optimization strategies (i.e., functional strategies specific to LO behavior) for the selected workload are read at 914. In some examples, the location optimizer strategies may be used to encode the logic of the objective function and the constraints. A latency objective may be an example of an objective function, while budget or location constraints may be examples of constraints. In some cases, the LO may apply one or more default strategies to each workload. Further, additional strategies may be elicited from customers (or users) to meet their and their workload's specific needs and goals. For example, one or more customer inputs of preferences may be packaged into strategies and passed to the LO. Thus, in some aspects, the location optimizer strategies may be based at least in part on the customer preferences and one or more default strategies, where the customer preferences may include one or more of objectives, goals, constraints, and data for evaluating the same.

At 916, the LO may proceed to endpoint filtration (optional). If applied, 0 or more endpoint filter functions may be applied to the set of all available candidate endpoints for the selected workload. In some examples, the set of all available candidate endpoints may be based at least in part on a data feed comprising a snapshot of all possible network locations that comprises a current status of potential endpoints. Upon applying the endpoint filter functions, 0 or more endpoints, from the set of candidate endpoints, that fail the filter criteria for the selected workload may be removed from consideration. In some cases, the endpoints may be eliminated based in part on the customer preferences or AEE operational considerations.

At 918, the location optimization process continues with a set of candidate endpoints after any filters are applied. For instance, the LO may determine a possibly reduced set of acceptable endpoints (i.e., if at least one endpoint was eliminated) at 918. In some other cases, the LO may determine that the set of all available endpoints is the same as the set of the acceptable endpoints. In some embodiments, the workload location optimizer strategy includes zero or more selection functions. These selection functions provide optimization across the set of acceptable endpoints.

At 920, the location optimizer may proceed to endpoint isolation. Endpoint isolation may be one step of the selection described above. Endpoint isolation may be performed to ensure that the final endpoint results meet fault-tolerance requirements for the workload. For example, to ensure the robustness of each workload deployment when isolated failures occur within the internet, during or after deployment, a fault-tolerant deployment may avoid selection of all or substantial subsets of endpoints within a single datacenter. In some cases, endpoint isolation is based at least in part on the selection functions of the location optimizer strategy. Further, the location optimization may execute the selection functions across a set of data centers derived from the acceptable endpoints. In one embodiment, the location optimizer may identify a set of acceptable data centers as those that host the acceptable endpoints determined at 918. Further, the location optimizer may optimize the selection functions, which define the optimization objective and constraints, across the set of acceptable data centers. Following optimization, the location optimizer may then determine an optimal set of data centers at 922.

In some embodiments, the location optimization process may comprise selecting endpoints at 924. During endpoint selection, the location optimization process comprises applying endpoint selection functions to the set of optimal data centers, such that an endpoint may be selected from within each data center in the set. In other embodiments, the location optimization process comprises applying selection algorithms to the set of acceptable data centers.

The output result of applying the endpoint selection functions may comprise an optimal set of endpoints for the selected workload, determined at 926. If the selection functions are applied to data centers as illustrated above, then an additional step is applied to select an endpoint within each selected data center. In some aspects, the two step approach for selection may serve to apply fault-tolerance as a constraint to the endpoint selection. Further, the optimal set of endpoints for the workload may not only be subject to fault-tolerance constraints, but also any other constraints provided via the location optimizer strategy for the workload.

After determining the optimal set of endpoints for the workload, at 928, the location optimizer may insert/update one or more state variables in the state store. For example, the location optimizer may insert/update the "traffic_direction_desired" data field in the state store or workload-endpoint store for all workload-endpoint pairs or combinations associated with workload selected at 902. In one non-limiting example, the location optimizer may set a value of 1 for all selected endpoints (i.e., set of optimal or acceptable endpoints) for this workload, and a value of 0 for all endpoints not in the optimal set.

Figure 10:
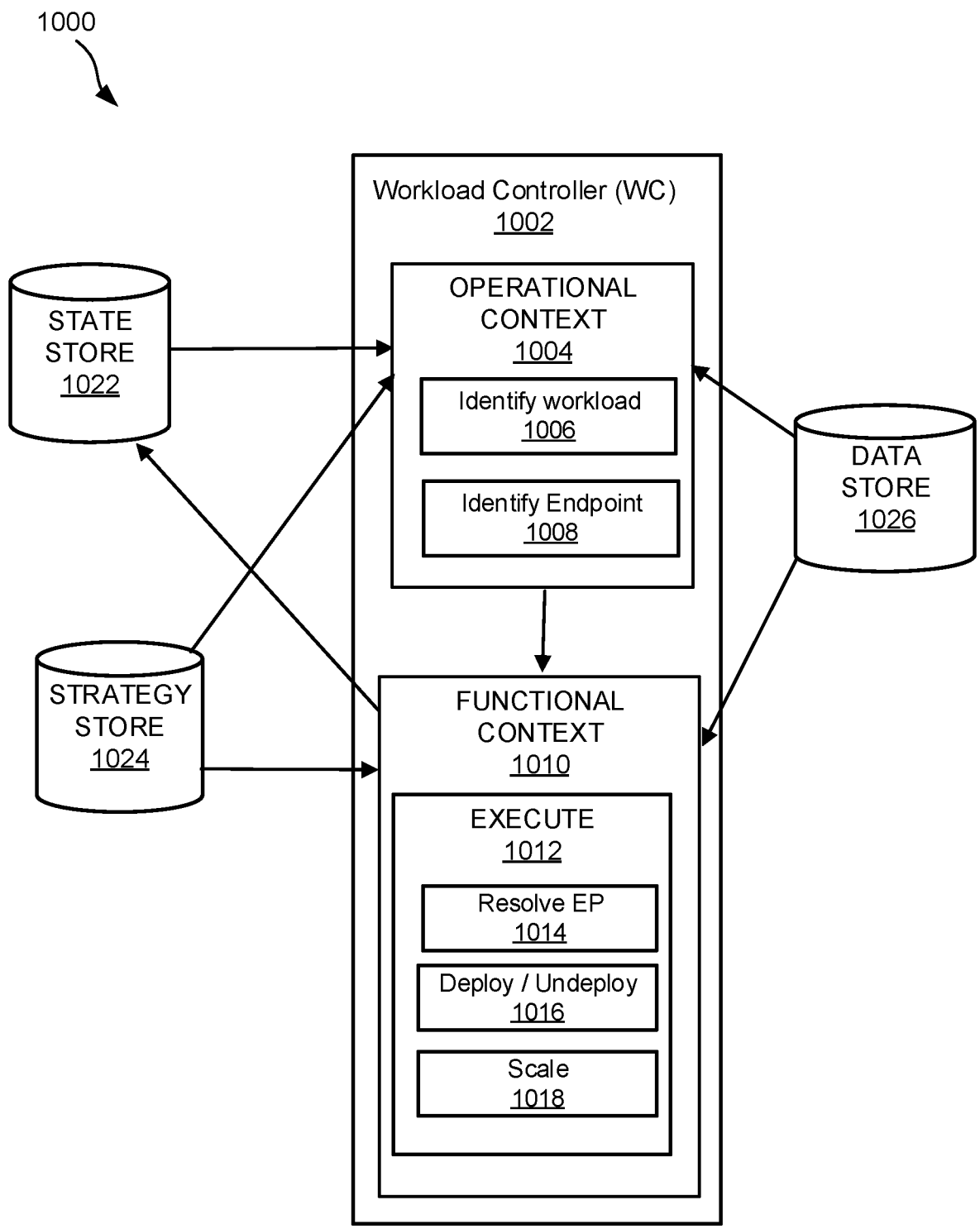
FIG. 10 illustrates a system diagram of a workload controller according to an embodiment of the disclosure.

FIG. 10 depicts a system diagram 1000 of a workload controller logical component, according to an embodiment of the disclosure. Workload controller (WC) 1002 is a logical component of an AEE that controls workloads through managing and coordinating deployments, workload scaling, and other aspects of workload operations. Every workload within the scope of an AEE uses functional strategies that define how it should be deployed, how it should scale, and any other necessary behaviors. In some embodiments, WC 1002 may be responsible for executing the appropriate strategies for each workload.

In some cases, the WC 1002 may be communicatively or electronically coupled to a state store 1022, a strategy store 1024, and/or a data store 1026. As shown, the WC 1002 may obtain one or more operational strategies from strategy store 1024, where the operational strategies define how the WC 1002 encounters, discovers, and selects workloads. In some cases, the WC 1002 may run as a single instance. Alternatively, multiple instances of the WC 1002 may be run in some embodiments. Accordingly, the WC 1002 may be configured to identify and operate on workloads in serial (i.e., if run as a single instance) or in parallel (i.e., if run as multiple instances). In some cases, the WC 1002 may be configured to evaluate and handle workloads according to one or more functional strategies. In some cases, the WC 1002 functions in one or more of an operational context 1004 and a functional context 1010. In some cases, one or more operations may be defined in the operational context 1004. Some non-limiting examples of defined operations in the operational context 1004 include workload identification 1006 and endpoint identification 1008, further described in relation to FIGS. 9 and 11.

In some cases, the functional strategies for the WC 1002 may be executed 1012 to perform the methods shown in functional context 1010, such as resolving endpoints 1014, deploying and undeploying workloads 1016, garbage collection (not shown), and scaling 1018, among others. In some cases, resolving endpoints 1014 may serve to ensure that the inputs to the WC 1002 are translated to the appropriate entity and process for deployment. For example, if the state store 1022 refers to data centers (or endpoint-hosting facilities), the WC 1002 may be configured to choose a cluster or endpoint within the data center as the deployment host. Similarly, if the state store 1022 refers to clusters or endpoints, then the WC 1002 may be configured to deploy nodes within the cluster or endpoint, or deploy the workload to an individual server within the cluster or endpoint. In some examples, garbage collection refers to a set of maintenance processes that free up resources on the endpoints after a workload has been removed (undeployed), including removing unneeded data from memory storage. Furthermore, scaling may refer to a set of processes that increase or decrease the capacity of a workload to do work. Vertical scaling means modifying (e.g., increasing) the endpoint resources such as processors or memory available to the workload. Horizontal scaling means deploying or undeploying one or more replicas of the workload to increase its work capacity.

In some cases, container orchestration software may be used to implement or achieve one or more of these behaviors. Several commercial and open source examples of container orchestration exist, such as Kubernetes and Docker Swarm. The WC 1002 may be configured to use one or more of such software products, in whole or in part, to obtain required behaviors. It is important to note that WC 1002 is not a container orchestration software, but a logical component of an AEE. In one example, the WC 1002 may employ a functional strategy using the Kubernetes open source container orchestration platform to manage some functions of workload control, such as managing deployment of the workload across nodes within a cluster and balancing the network or computational load on the workload, in conjunction with functional strategies that employ functions from other products and services (i.e., not Kubernetes), to scale the workload for example. Another possible function of WC 1002, as in a case where LO returns a set of data centers as an output, is to select endpoints within the data centers for the deployment of the workload. Similarly, functions implicit in WC functional strategies may select or identify nodes within clusters for deployment.

In some cases, the WC 1002 may be configured to read state variables or other applicable data from state store 1022 according to its operational strategies. In the simplest case, the WC 1002 may read the state of a workload-endpoint pair to determine if deployment or undeployment is warranted. The operational strategies define whether the WC 1002 runs as a single process or multiple, parallel processes or a combination of the two. In one possible example, the WC 1002 could operate a process that reads state variables from the state store 1022 and dispatches relevant messages to multiple, parallel instances of the WC 1002 operating in each endpoint. Each of these endpoint-located instances of the WC 1002 may use the information retrieved from the state store 1022 and other data to execute its functional strategies as indicated by workload state and other data. The state store information may indicate if the WC 1002 should deploy or undeploy the workload. Functional strategies may be used to define how these tasks are accomplished, depending, for example, on if a particular container orchestration platform is in use on the endpoint. Functional strategies for scaling may be used to define the data used to determine whether vertical or horizontal scaling should be employed and how such scaling is to be accomplished. Other functional strategies may be used to define how other WC 1002 tasks are accomplished for the workload and the endpoint in question.

In some cases, the WC 1002 may deploy the selected workload on at least one location or endpoint (e.g., based on information accessed from the state store, information received from an instance of the LO, etc.). In such cases, the HC component, further described in relation to FIGS. 12 and 13) may determine whether the workload has been successfully deployed and/or is healthy on that endpoint. The HC component may be configured to update the state store 1022 based on its assessment. In such cases, the WC 1002 may monitor the information in the state store 1022 to determine if the workload was successfully deployed. In other embodiments, WC 1002 may be configured to write directly to the state store 1022.

Figure 11:
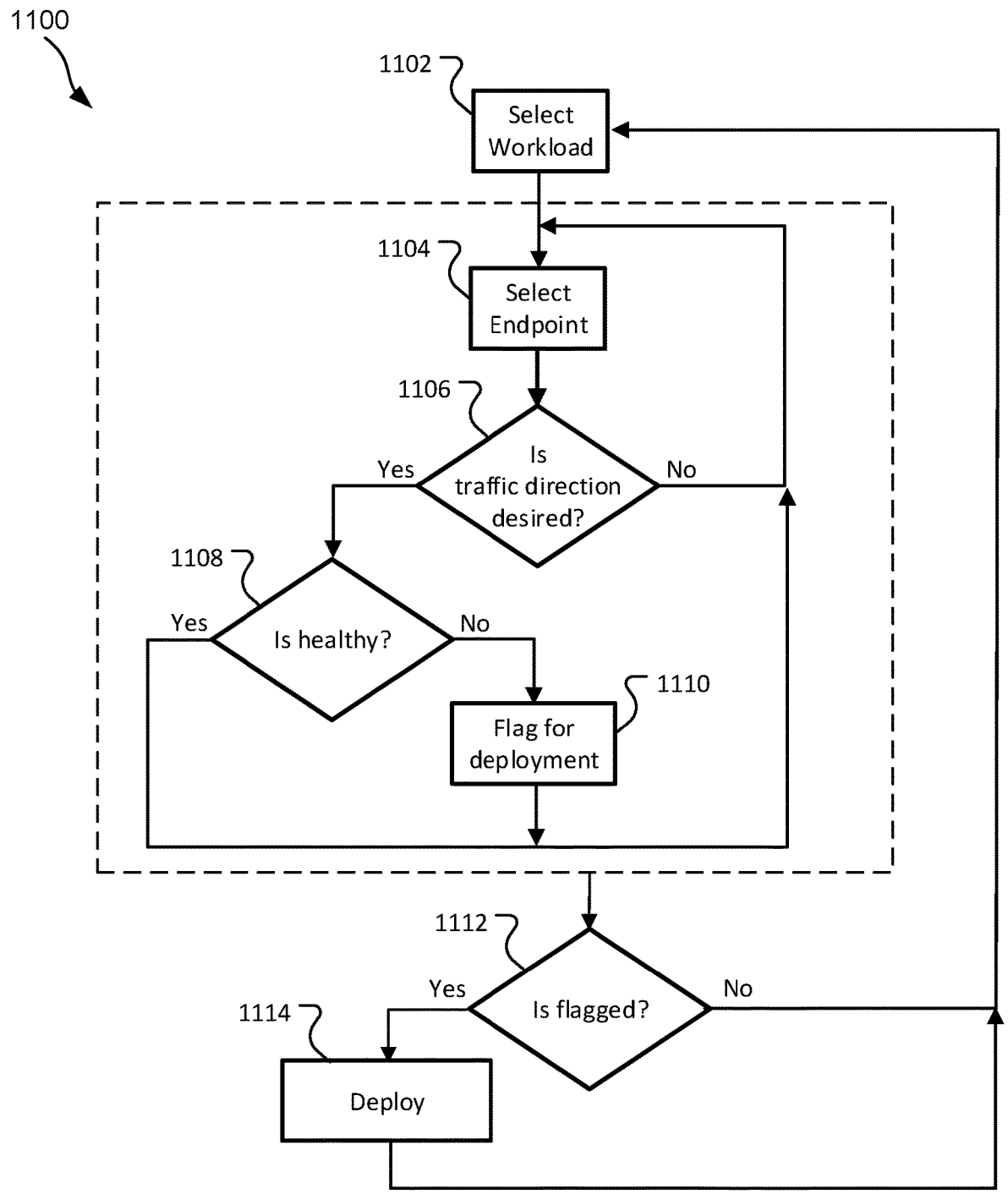
FIG. 11 illustrates a flowchart of a method for workload control according to an embodiment of the disclosure.

FIG. 11 illustrates a flowchart 1100 of a method for a workload controller of the AEE in accordance with one or more implementations. In some embodiments, the workload controller (e.g., shown as WC 1002 in FIG. 10) may be utilized to deploy workloads to endpoints according to the information in the workload-endpoint state store. As shown, at 1102, the workload controller may select a workload. After selecting the workload, at 1104, the workload controller may select an endpoint. In some embodiments, 1102 and 1104 may be combined, and the workload controller may select a workload-endpoint pair. In some cases, the workload controller iterates through a plurality of endpoints with the selected workload (i.e., steps 1104 through 1110).

In some embodiments, iteration may be performed on all or a selected subset of state store records (e.g., optimal endpoints for the workload, acceptable endpoints for the workload, etc.). In some cases, the subset contains optimal or acceptable endpoints for a workload. Iteration may continue until all endpoints have been considered; this termination condition is not shown. An endpoint iterator is formed by steps 1104, 1106, 1108, and 1110.

At 1106, the "traffic_direction_desired" data field is tested to determine if its value is 1 (i.e., Yes) or 0 (i.e., No) for the workload-endpoint pair. If the value is 0, the workload controller proceeds to select another endpoint for the selected workload at 1104 and the iteration proceeds. If decision at 1106 is 1 or yes, processing continues at step 1108. At step 1108, if the value of the "is_healthy" data field is 0, the workload is flagged for deployment at 1110. In some cases, the process then continues to another iteration (i.e., back to step 1104 where another endpoint is selected). In some other cases, for instance, if the "is_healthy" data field is 1, the process continues to another iteration at step 1104.

In some cases, after iteration has been performed on all or the selected subset of optimal or acceptable points, the unit of work may be tested to determine if it is flagged for deployment (decision 1112). If flagged for deployment, the workload controller triggers a deployment policy at step 1114. In some embodiments, the deployment policy is configurable, for instance, to a predetermined time interval (e.g., 3 minutes, 5 minutes, 10 minutes, etc.). Said another way, the deployment policy may be used to control the timing of deployments. In such cases, the workload controller may not deploy the workload on the endpoint where the workload was not operating properly (i.e., "is_healthy" data field was 0) for at least the duration of time set in the deployment policy. Alternatively, the workload control process may deploy the workload, if not healthy, on any endpoint at a cadence (i.e., rate or pattern), where the cadence is based in part on the deployment policy. In some cases, current deployments may be at a workload level, and may not be specific to endpoints. In other cases, current deployment may be at both a workload and an endpoint level.

Figure 12:
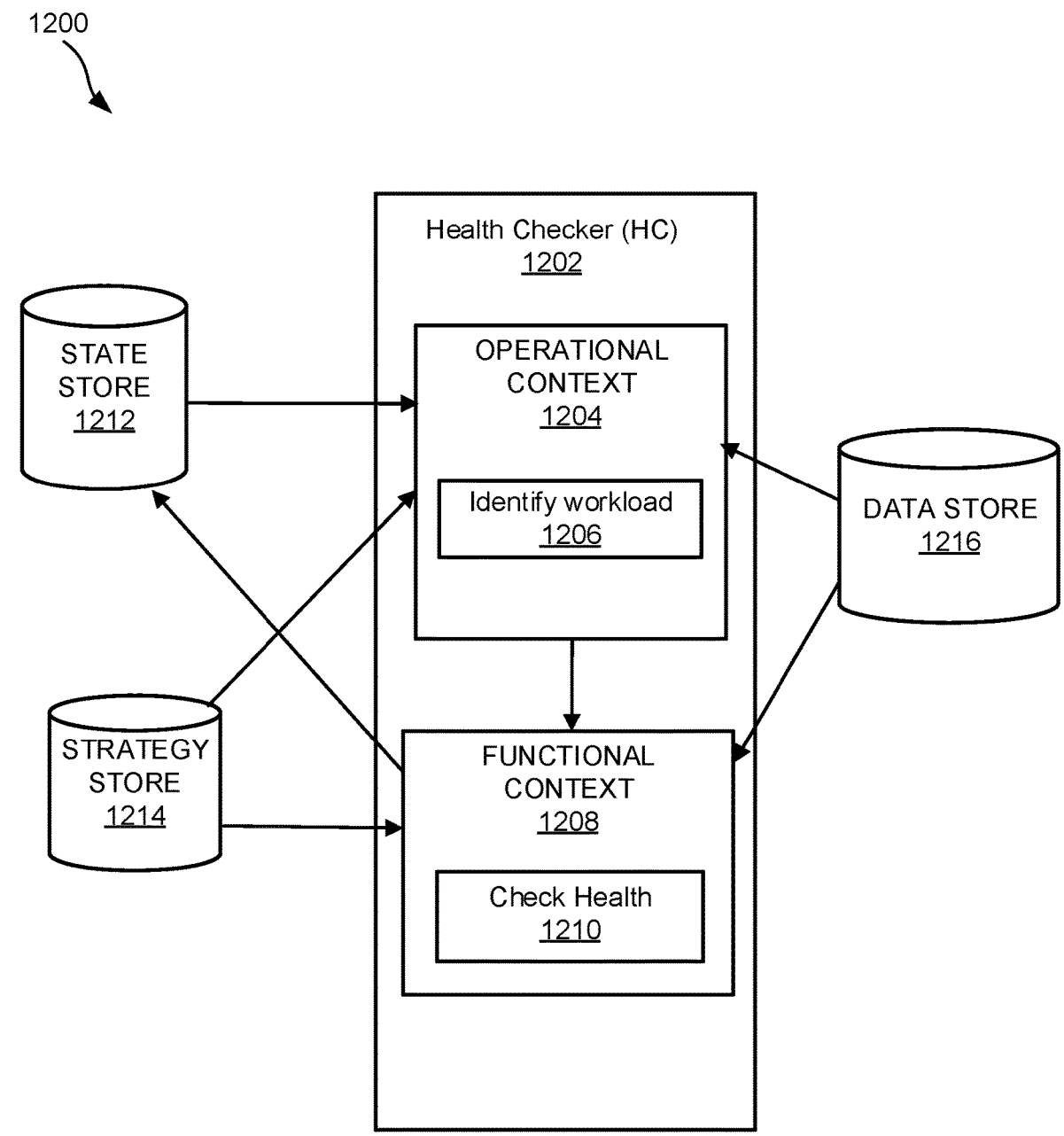
FIG. 12 illustrates a system diagram of a health checker according to an embodiment of the disclosure.

FIG. 12 schematically depicts a system diagram 1200 of a health checker logical component, according to an embodiment of the disclosure. In some cases, health checker (HC) component 1202 may be configured to exchange data with one or more of a state store 1212, a strategy store 1214, and a data store 1216. For sake of brevity, only one data store 1216 is shown in FIG. 12, although multiple data store(s) 1216 may be deployed in different embodiments. In some cases, the HC component 1202 may be configured to read its operational strategy from strategy store 1214, where the operational strategy defines how the HC 1202 identifies or encounters workloads for which it performs health checks. In some embodiments, HC 1202, in operational context 1204, may access data on workloads, endpoints, and any other applicable data for executing its operational strategies. In some examples, HC 1202 may be configured to check the success (or failure) of workload deployments. Additionally or alternatively, HC 1202 accepts operational strategies that modify how it identifies and executes workloads (e.g., across all workloads on all endpoints, a portion of workloads on all endpoints, all workloads on a portion of endpoints, etc.), including workload identification 1206. For example, in some embodiments, HC 1202 instantiates independent workers on endpoints to execute health checks for local workloads.

In some cases, HC 1202, in functional context 1208, may be configured to access workload data, endpoint data, and any other applicable data (e.g., tests and acceptance criteria related data) for executing its functional strategies. For instance, HC 1202 uses functional strategies to define the tests and acceptance criteria for a given workload-endpoint pair. At the functional level, HC 1202 utilizes one or more strategies for each workload. In some circumstances, the health check strategy for a workload is composed of multiple health check functions, such as check health function 1210. These health check functions may include defaults and custom checks, which may be defined by customers and AEE operations, respectively. Other examples of strategies include default strategies for all workloads (e.g., basic HTTP functionality) and custom tests defined by workload owners, workload characteristics and requirements, endpoint-specific requirements, and/or other considerations.

In one embodiment, an instance of HC 1202 runs (i.e., executes) a collection of multiple workers, as defined by operational strategies, in each computer cluster on which workloads are deployed. On this cluster, the local instance of HC 1202 identifies locally-deployed workloads and their current states in state store 1212 and local cluster data. The local HC workers process the workloads in parallel, from a queue. The first processing step is to determine, based on workload state, whether health checks are required. If they are, appropriate functional strategies may be accessed through strategy store 1214. Further, any additional data specified by the strategies may be accessed through data store 1216, upon which the functional strategies are executed. After the execution of the functional health check strategies for a given workload, the instance of HC 1202 may update state store 1212 with a value for the "is_healthy" state variable. As noted above, in some cases, updating the state store 1212 may comprise triggering one or more state transitions in the state store 1212 based on receiving one or more inputs from the HC 1202. In some embodiments, HC 1202 monitors information pertaining to workloads running on endpoints. For example, health checker 1202 monitors whether workloads are running properly on endpoints and ensures that this information is current and available to one or more other components of the AEE, such as the workload controller. In some cases, the health check process updates the value of the "is_healthy" data field based in part on its monitoring. In some cases, if the workload is deployed and operating properly on a given endpoint, the value of the "is_healthy" data field is set to 1. In other cases, if the workload is deployed and not operating properly on a given endpoint, the value of the "is_healthy" data field is set to 0. In some embodiments, the health checker uses one or more health check strategies (e.g., functional strategies specific to health checker behavior) that each defines a health check. Some health check strategies might define tests of upstream or downstream network connections of the workload or an endpoint and yet others could define tests of processing operations within the workload. A multitude of functional health check strategies allows for a comprehensive and customized suite of health checks to be run for each deployed workload, essentially "configuring" the suite of checks to best fit the workloads and endpoints.

In some embodiments, HC 1202 may be distributed across one or more clusters, where the one or more clusters consist of one or more endpoints. In some embodiments, there are multiple instances of health check component 1202, and each instance continually checks all workloads on every endpoint in the cluster.

Figure 13:
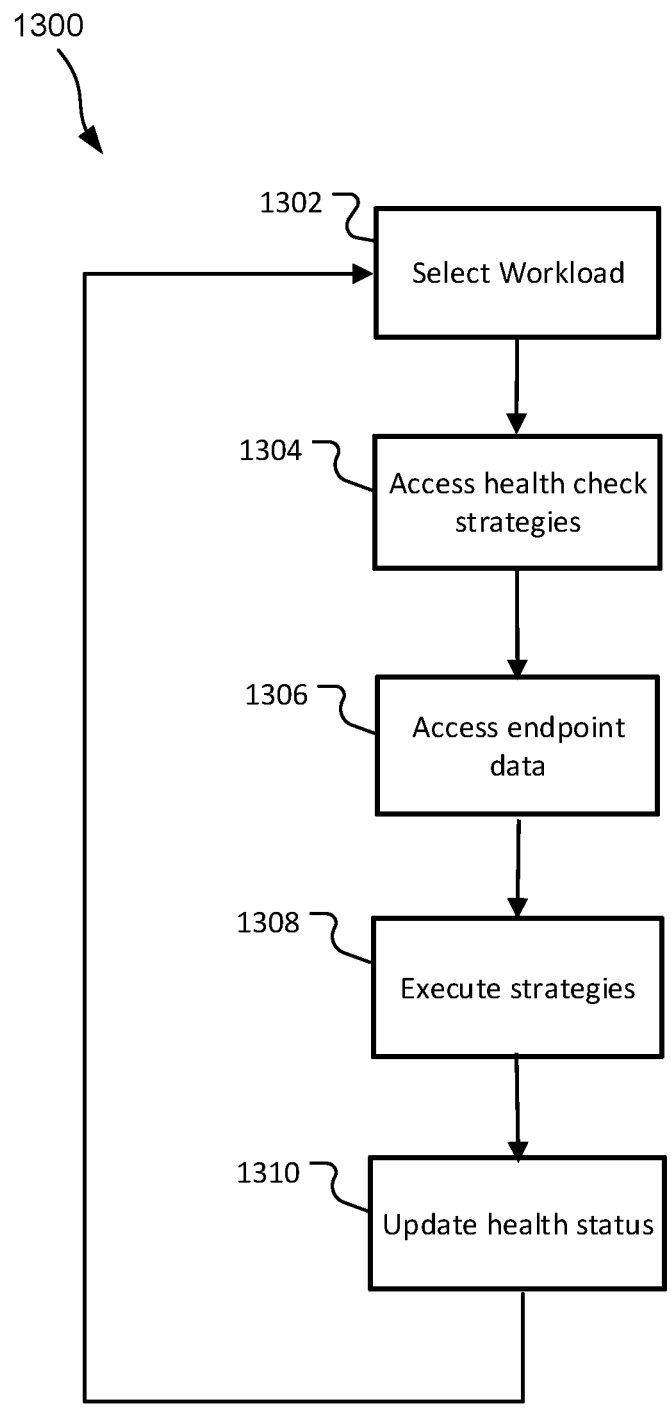
FIG. 13 illustrates a flowchart of a method for health checking according to an embodiment of the disclosure.

FIG. 13 illustrates a flowchart 1300 of a method for health checking according to an embodiment of the present disclosure. The operations of flowchart 1300 may be performed by an HC component, such as HC component 1202 previously described in relation to FIG. 12.

In some cases, health check process depicted in flowchart 1300 begins with selection of a workload at 1302, where the selection may be based on the health checker executing one or more operational strategies (e.g., operational strategies specific to health checker behavior). At 1304, one or more health check strategies (e.g., functional strategies) for the workload are accessed. At 1306, endpoint data is accessed. Endpoint data may be similar or substantially similar to the endpoint data accessed by other logical components, such as the location optimizer.

At 1308, the health checker may execute the one or more health check strategies, which may include running one or more health check functions. After executing the health checks defined in the strategy, at 1310, the health checker may update the "is_healthy" data field in the workload-endpoint store before proceeding to the next workload on the same or a different endpoint in the cluster. In this manner, the health checker iterates through all extant workloads on every endpoint per cluster.

Aspects of the present disclosure may support the deployment of workloads, managed in workload containers, on the edge computing platform. In some cases, containerization of workloads alleviates reliability issues arising from moving software between different computing environments. In some cases, workload containers may comprise a complete runtime environment, consisting of an application and all its dependencies, libraries and other binaries, along with the configuration files required to run it, bundled into one package. In some aspects, containerization enhances consistency, portability, and flexibility, via abstraction, which may allow application platforms to be easily moved between physical platforms or in the cloud. In some cases, containerization may also support increased scalability.

Figure 14:
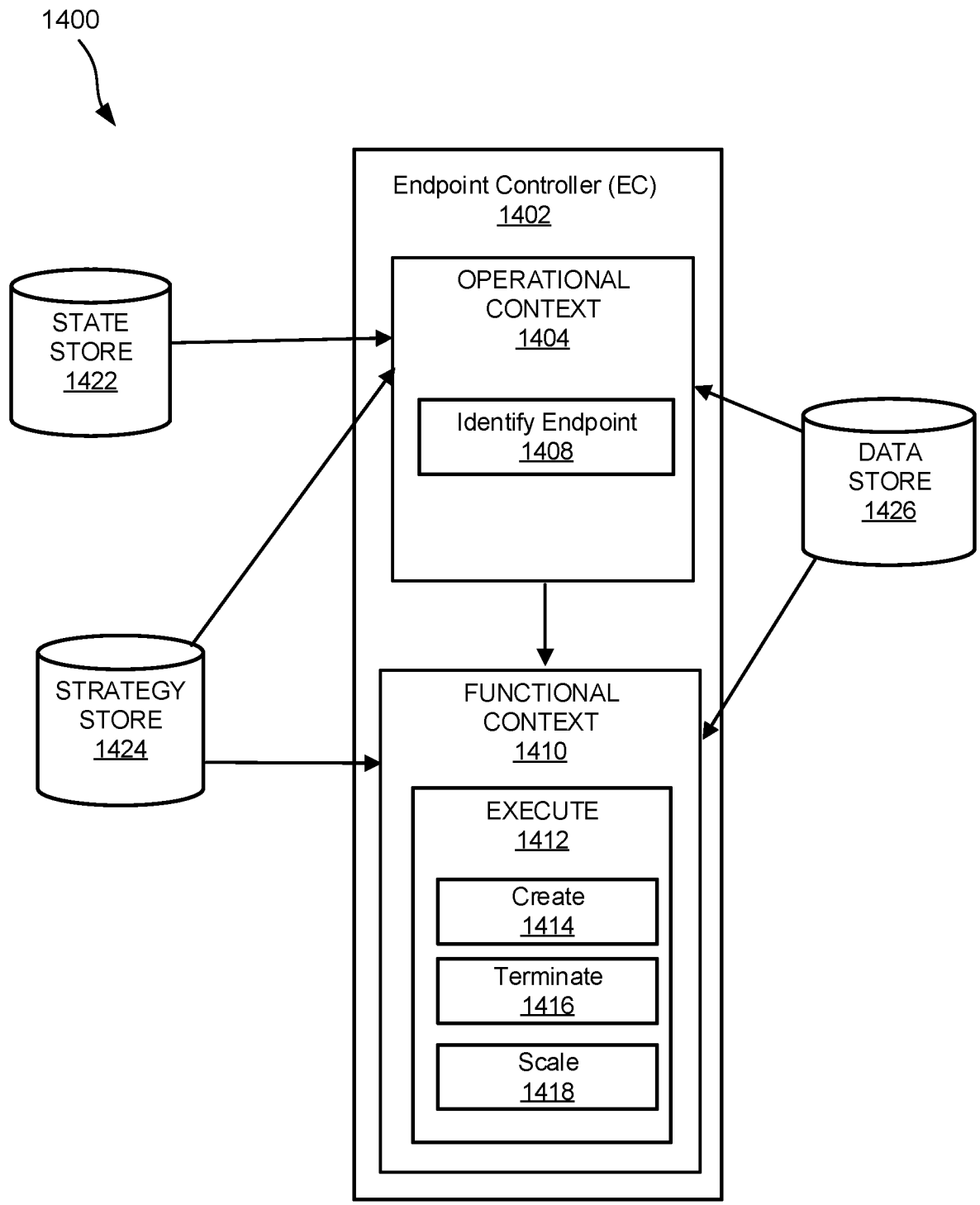
FIG. 14 illustrates a system diagram of an endpoint controller according to an embodiment of the disclosure.

FIG. 14 schematically depicts a system diagram 1400 of an endpoint controller logical component according to an embodiment of the present disclosure. Endpoint controller (EC) 1402 functions to ensure that endpoints are available and ready to accept deployments as needed by AEE. In some embodiments, the EC 1402 may be configured to create, manage, and/or terminate endpoints as needed, where an endpoint is a cluster of computer nodes in a data center. In FIG. 14, EC 1402 functions in operational context 1404 for executing its operational strategies received from strategy store 1424, based on which endpoint identification 1408 occurs. In some embodiments, EC 1402 also functions in functional context 1410 (e.g., for executing its functional strategies received from strategy store 1424), where execution context 1412 supports one or more of endpoint creation 1414, endpoint termination 1416, and/or endpoint scaling 1418.

In some cases, EC 1402 is configured to receive one or more operational strategies from strategy store 1424. The EC 1402 uses the one or more operational strategies to determine the manner in which it defines, finds, encounters, or selects endpoints to act upon. For example, an operational strategy of EC 1402 may provide a method for accessing or creating a data store, such as data store 1426. In some cases, the data store 1426 may enumerate all possible data centers with an inventory of existing and potential endpoints within each data center, indexed according to the data center and endpoint capacities and other characteristics.

In some embodiments, EC 1402 identifies suitable actions to take relative to potential and existing endpoints through functional strategies. Actions available to EC 1402 include, but are not limited to, bringing endpoints into service ("creating"), taking unneeded endpoints out of service ("terminating"), and scaling endpoints (e.g., adding nodes to a cluster or changing the sizes of nodes in a cluster). The definition and evaluation of "potential," "needed," "unneeded," etc., and the methods employed to accomplish the associated behaviors are defined by functional strategies. As a very simple exemplary case, any endpoint that is not selected for workloads may be a candidate for termination. For example, in one functional strategy that may be in effect, EC 1402 may terminate an endpoint if the endpoint is unselected for a certain period of time or otherwise falls below some critical level of use or some other relevant criterion. In some cases, the functional strategies accessed by EC 1402 may be dynamically configurable, which may allow different methods to be selected for each endpoint, different types of endpoints (e.g., different server node configurations), data centers, or providers. For example, creating and terminating endpoints in a data center may require a specific API call as defined by the hosting provider that operates the data center. Other providers and/or data centers may have different APIs or other methods for accomplishing this task. In some embodiments, these methods can be defined as functional strategies.

In some cases, EC 1402 may be configured to monitor endpoints and needs of the edge computing platform. In some embodiments, EC 1402 may be configured to create and destroy endpoints as needed. For example, endpoints are server nodes in a cluster and computing resources available on an endpoint may be appropriately scaled to meet processing demands for a workload (i.e., endpoint scaling 1418). In some other cases, EC 1402 comprises control systems for configuring workload deployments (i.e., resources needed on the endpoint) to appropriately size the workload on endpoints. Additionally or alternatively, the EC 1402 supports workload scaling including automatic vertical scaling (i.e., requesting more endpoint resources for a given workload) and/or horizontal scaling (i.e., adding more instances of a workload). Thus, in some aspects, the EC 1402 may be utilized to manage endpoint and workload implementations, which may allow the AEE to manifest the workload-endpoint states identified by the other components of the AEE.

In some embodiments, instances of EC 1402 may be passively coordinated with other logical components of AEE, for instance, through data produced by the EC 1402, through state store 1422, or a combination thereof. In some cases, the EC component 1402 may be configured to update one or more of endpoint availability, capacity, cost, performance, reliability, and any other applicable information, in data store 1426. Data in data store 1426 may be available, for instance, for the execution of operational and/or functional strategies, by other logical components of the AEE. In some embodiments, EC 1402 does not alter state store 1422, but monitors information therein.

EC 1402 may be configured to identify endpoints based on its operational strategies. One exemplary set of operational strategies evaluate all possible endpoints relative to all workloads to determine existing endpoints that need EC action and non-existing, but desirable, endpoints that need creation. Accordingly, EC 1402 accesses and updates a comprehensive data store, such as data store 1426 of possible endpoints. In some cases, EC 1402 updates to data store 1426 may be based in part on evaluating functional strategies across all possible endpoints and optimizing the set of possible endpoints according to the aggregate demands of one or more workloads. A possible endpoint may refer to one that exists and is currently in service, or one that does not currently exist but could be brought into service if needed. An example of a potential but non-existent endpoint is a compute cluster in a data center where EC 1402 currently has no endpoints in service but does have functional strategies that support the creation of the endpoint, as through an API call to an appropriate interface within the data center. The operational strategies above result in a set of endpoints that each do or do not require action. For those requiring action, EC 1402 may be configured to access appropriate functional strategies and execute them. The execution of the strategies manifest as, for example, scaling a cluster "in" (reducing node count) or bringing a new cluster into service, or other actions as warranted and determined by the strategies. Such EC actions propagate changes in ancillary data stores 1426 that are also accessible to other logical components of an AEE. For example, the EC 1402 regularly evaluates all possible endpoints relative to the aggregate demands of all workloads. This evaluation, governed by functional strategies, results in EC 1402 determining which possible endpoints should be included in the location optimizations of the individual workloads. This evaluation can result in the set of existing (in-service) endpoints changing over time. The LO component may access information on all existing endpoints in the process of executing functional strategies for identifying a set of optimal endpoints for a workload. In this manner, EC 1402 influences the outcomes obtained by the LO component through adjustments to the set of existing endpoints.

Figure 15:
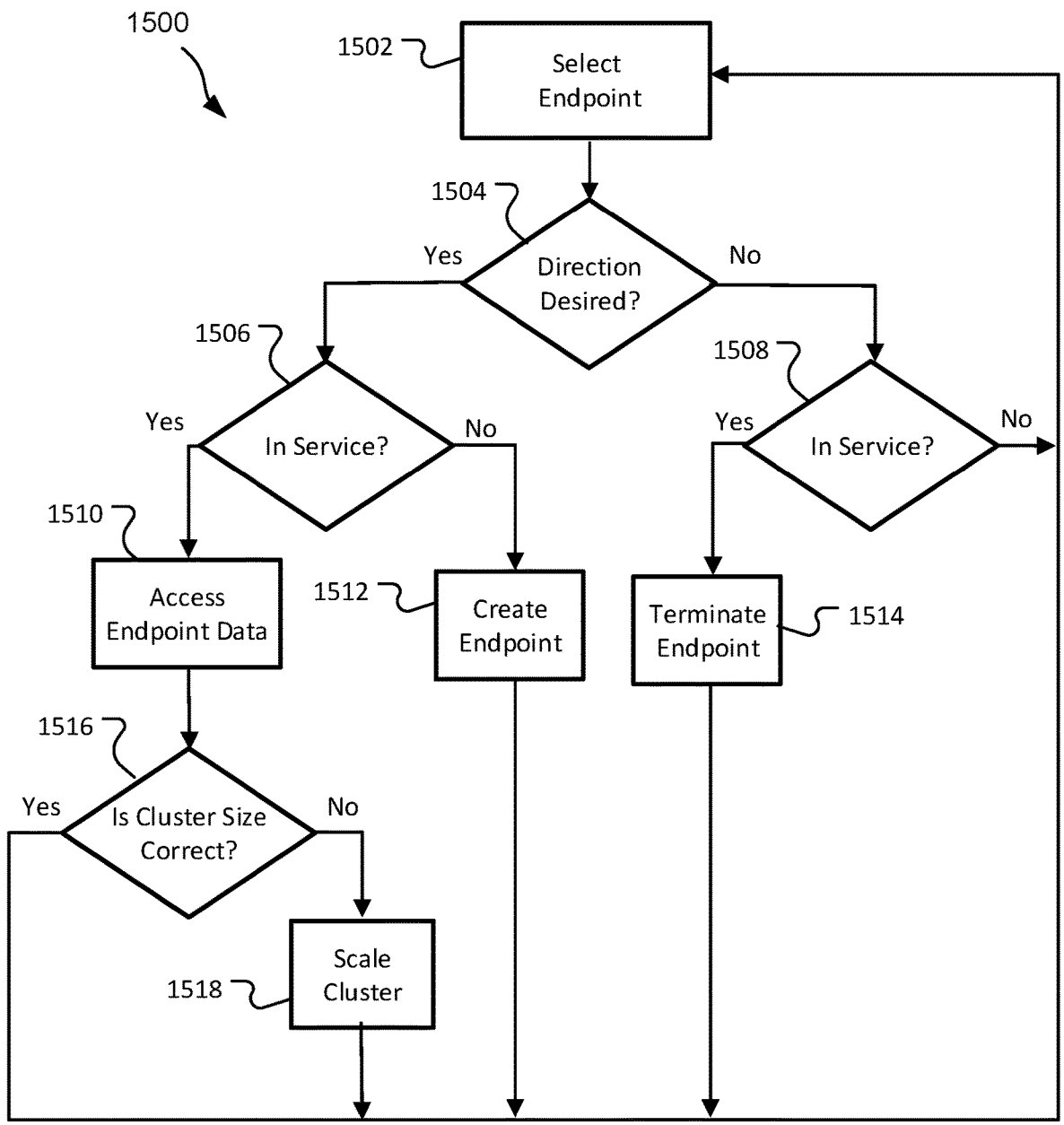
FIG. 15 illustrates a flowchart of a method for endpoint control according to an embodiment of the disclosure.

FIG. 15 illustrates a flowchart 1500 of a method for endpoint control according to an embodiment of the present disclosure. In some cases, the methods of flowchart 1500 may be performed by an endpoint controller of the AEE, such as EC 1402 described in relation to FIG. 14. As illustrated, the flowchart 1500 for the endpoint controller begins by selecting an endpoint at 1502. In some cases, flowchart 1500 forms an iterator based at 1502 that exhaustively considers a set of endpoints one at a time. In some embodiments, flowchart 1500 ends when all endpoints have been processed through iteration, and this termination condition is not shown for simplicity of illustration. After an endpoint is selected, processing continues by testing if direction is desired or selected (decision block 1504). If the decision at 1504 is affirmative, processing continues by determining if the selected endpoint is in service (decision block 1506). If the decision provides an affirmative result, processing continues by accessing data corresponding to the endpoint at 1510. At decision block 1516, the endpoint controller determines if cluster size is correct. If yes, the endpoint controller loops back to 1502 to perform another iteration. In other words, the endpoint controller proceeds to select another endpoint at 1502. In some other cases, for instance, if the endpoint controller determines at decision block 1516 that the cluster size is not correct, the endpoint controller may perform cluster scaling at 1518. After cluster scaling, the endpoint controller may loop back to 1502 and begin another iteration (i.e., by selecting another endpoint at 1502).

Returning to decision block 1506, if the endpoint controller determines that the selected endpoint is not in service, it may create an endpoint at 1512, following which it may begin another iteration by selecting another endpoint at 1502.

Returning to decision block 1504, if the endpoint controller determines that no traffic direction is desired (or selected) for any workload on the current endpoint, processing continues at decision 1508 where it determines if the endpoint is in service. If no, the processing loops to another iteration with selection of another endpoint at 1502. However, if the decision at 1508 is affirmative, the endpoint controller terminates the selected endpoint at 1514, and begins another iteration at 1502.

It should be understood that the order of steps or order for performing certain actions in flowchart 1500 is immaterial so long as the present teachings remain operable. Moreover, two or more steps or actions may be conducted simultaneously.

Figure 16:
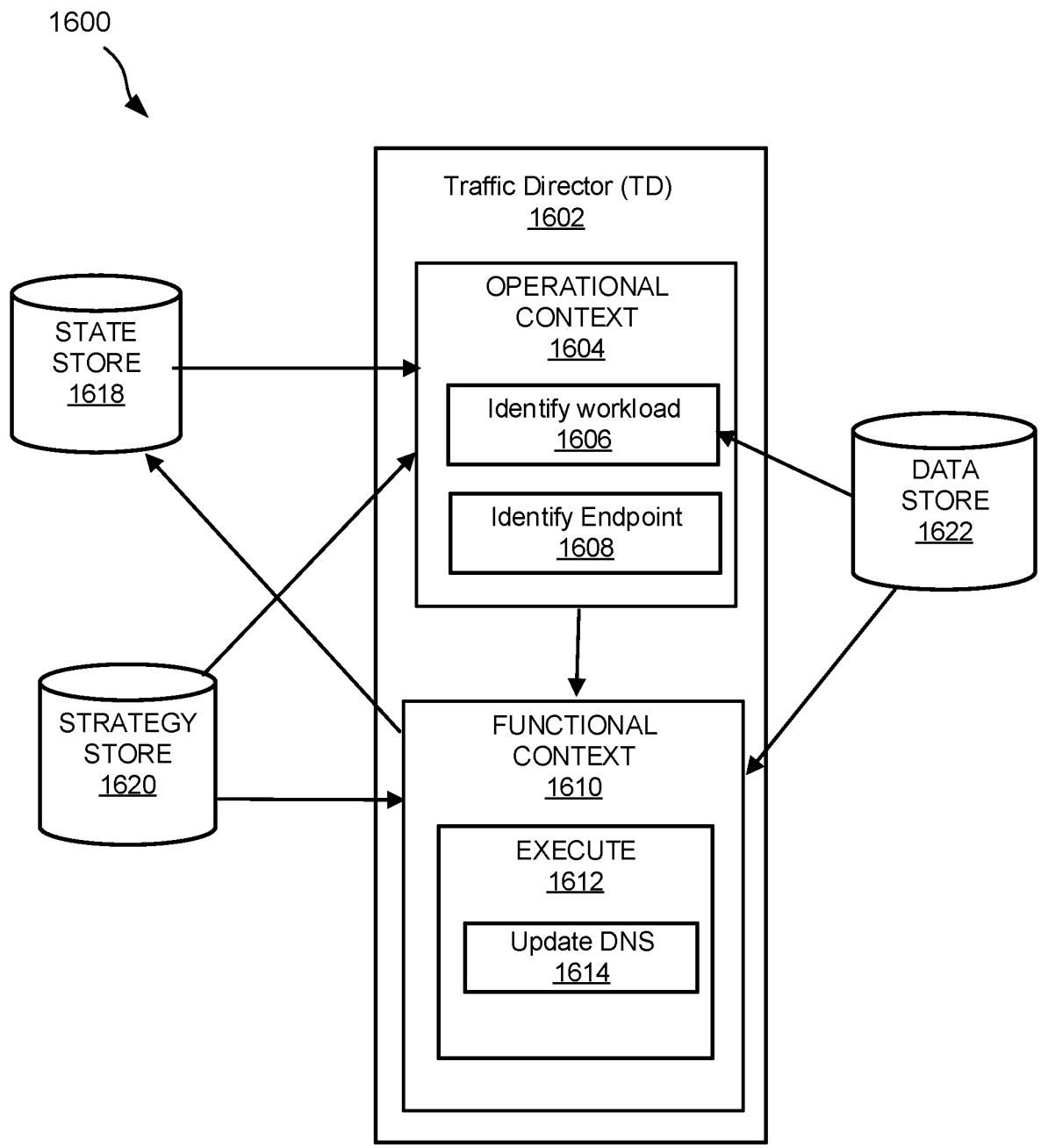
FIG. 16 illustrates a system diagram of a traffic director according to an embodiment of the disclosure.

FIG. 16 schematically depicts a system diagram 1600 of a traffic director (TD) logical component of an AEE in accordance with one or more implementations. In some cases, TD 1602 may be configured to exchange data with state store 1618, strategy store 1620, and/or data store 1622. The TD 1602, in operational context 1604, may be configured to identify workload 1606 and identity endpoint 1608 (or a workload-endpoint pair) by iterating through the state store 1618. For instance, the TD 1602 iterates through state store 1618, checking for workload-endpoint pairs with an associated state indicating that direction of network traffic is desired or required (e.g., value of state variable "is_traffic_desired" is 1). When such a workload-endpoint pair is detected, TD 1602, in functional context 1610, accesses strategy store 1620 to load functional strategies and execute them (i.e., execute 1612). In some embodiments, execution 1612 of functional TD strategies includes accessing data store 1622 for geographic or network performance data.

In some aspects, TD 1602 is a logical component of an AEE configured to make data and/or network updates, which may enable user agent requests to encounter (e.g., be directed to) the workload at the endpoints where they are deployed, as well as prevent such requests from accessing endpoints (i.e., undirecting) where the workload is not deployed. Functional strategies of TD 1602 may comprise methods for employing internet traffic routing technologies and services for exposing deployed workloads to user agents. TD functional strategies may implement any suitable technology for matching user agents to deployments. Additionally or alternatively, TD functional strategies may comprise methods for verifying the success or failure of traffic direction.

In some embodiments, TD 1602 may be configured to update DNS records 1614 so that end-users (e.g., customers, users of the web application, etc.) are directed to a workload providing appropriate services on at least one endpoint where the workload is healthy (i.e., deployed and operating properly). In some cases, the TD 1602 may operate on one or more workload-endpoint pairs (e.g., one or more records in the state store 1618) as described herein. In other embodiments, TD 1602 may be configured to use other means for appropriately directing traffic, for example, by sending border gateway protocol (BGP) messages. Those familiar with the art will appreciate that there are several techniques and protocols used at present for routing network traffic, and that other techniques may be used in the future. While aspects of the present disclosure relate to routing of network traffic, the methods for accomplishing said routing are not intended to be limiting.

In some cases, the terminus of the logical definition of TD 1602 is either input 4 (e.g., set value of state variable "is_traffic_directed" to 0) or 5 (e.g., set value of state variable "is_traffic_directed" to 1) of the FSM, previously described in relation to FIG. 2A. In such cases, the TD 1602 may update state store 1618 accordingly. In one embodiment of state store 1618, these inputs correspond to values of the state variable "is_traffic_directed."

Figure 17:
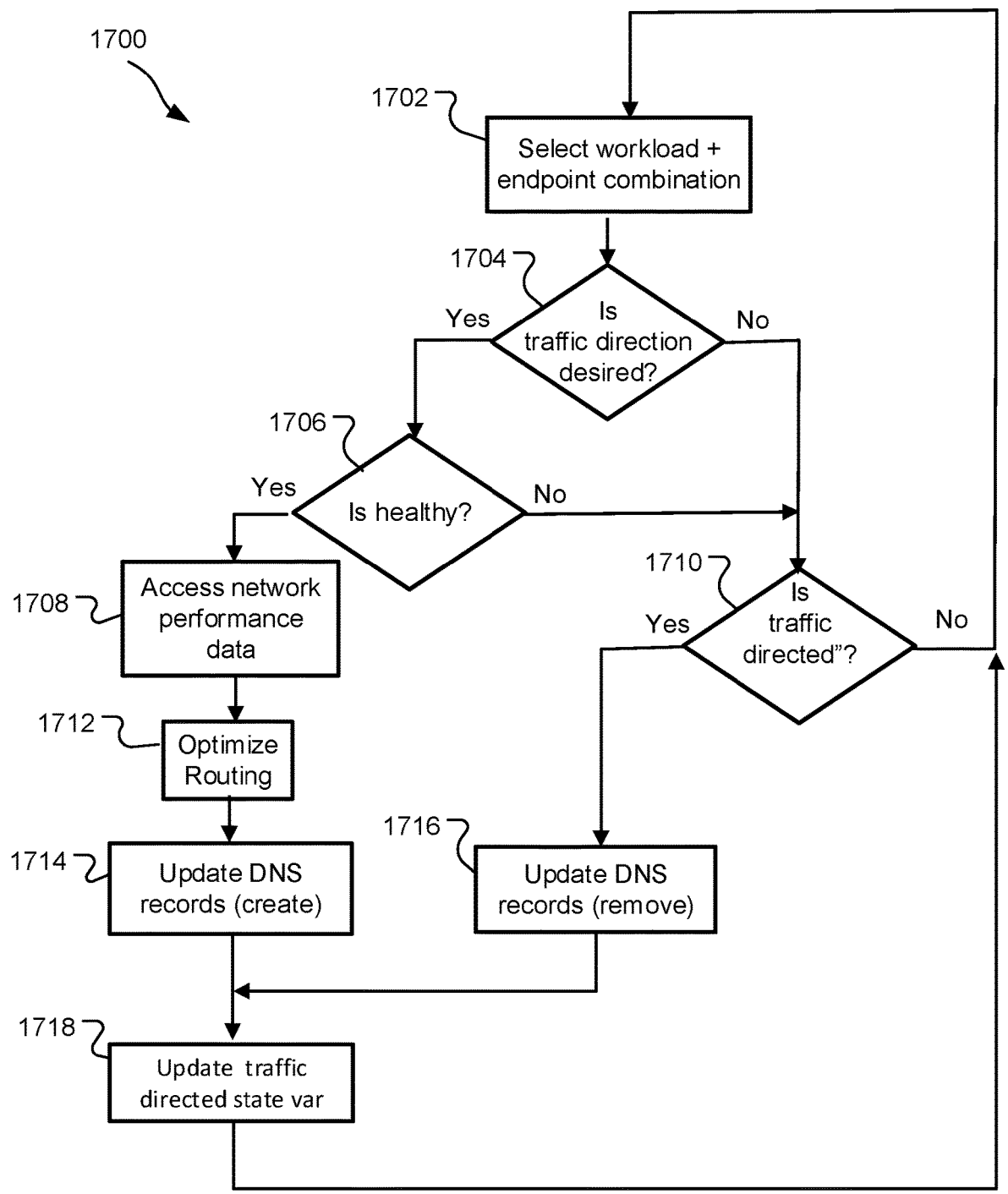
FIG. 17 illustrates a flowchart of a method for directing network traffic according to an embodiment of the disclosure.

FIG. 17 illustrates a flowchart 1700 of a method for network traffic direction according to an embodiment of the disclosure. In some cases, the methods described in flowchart 1700 may be performed by a traffic director of the AEE. Starting at 1702, the traffic director or another component of the AEE may select a workload-endpoint combination from a set. At decision block 1704, the traffic director may determine if traffic direction is desired for the selected workload-endpoint combination. For instance, the traffic director may examine the value of a state variable labelled "traffic_direction_desired" in a state store, such as state store 1618 in FIG. 16. If traffic direction is desired (i.e., decision block 1704 is yes), processing continues at decision block 1706.

At decision block 1706, the traffic director may determine if the selected workload-endpoint combination is healthy, for instance, by examining the value of a state variable labelled "is_healthy" in a state store, such as state store 1618 in FIG. 16. If the decision at 1706 is affirmative, processing continues at 1708, where the traffic director accesses network performance data. Some non-limiting examples of network performance data may include network data rate, latency, and/or reliability. At 1712, the traffic director may optionally optimize routing. Further, at 1714, the traffic director may update or create DNS records, for instance, to direct or route incoming network traffic to an endpoint-workload. At 1718, the method comprises updating a state variable indicating traffic direction. The traffic director may continue iterating by returning to 1702 where it proceeds to select the next workload-endpoint combination.

Returning to decision blocks 1706 and 1704, if the result of either is negative, the method proceeds to decision block 1710. At decision block 1710, the traffic director or another component of the AEE may determine if traffic is being directed for the selected workload-endpoint. If yes, processing continues at 1716, where the traffic director removes one or more DNS records governing routing for the endpoint-workload. After updating the DNS records at 1716, the method comprises updating a state variable indicating traffic direction at 1718, and then returning to 1702 where another iteration begins by selecting the next workload-endpoint combination.

Alternatively, if the traffic director determines at decision block 1710 that traffic is not being directed for the selected work unit (i.e., workload-endpoint combination), processing returns to 1702 where another iteration begins by selecting the next workload-endpoint combination.

Figure 18:
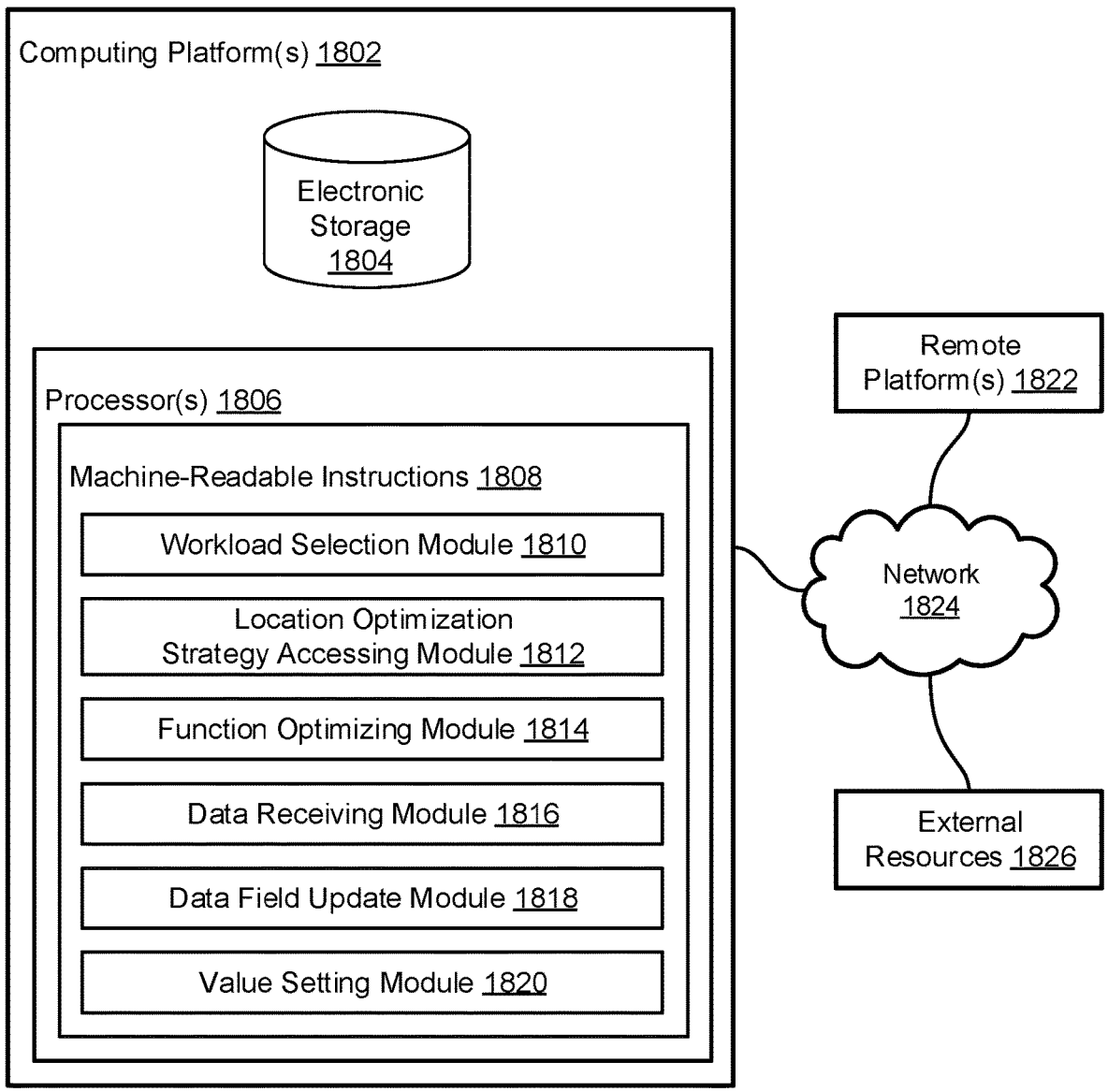
FIG. 18 illustrates a system configured for administering a distributed edge computing system utilizing an AEE, in accordance with one or more implementations.

FIG. 18 depicts machine readable program instruction modules for configuring a computing platform according to an embodiment of the disclosure. More specifically, but without limitation, FIG. 18 illustrates a system 1800 for administering a distributed edge computing system utilizing an AEE, in accordance with one or more implementations. In some implementations, system 1800 may include one or more computing platforms 1802 (also referred to as servers 1802). In some embodiments, system 1800 includes one or more instances of server 1802. In some cases, an instance of server 1802 may be configured to communicate with one or more client computing platforms 1822 (also referred to as remote platforms 1822) according to a client/server architecture and/or other architectures. Client computing platform 1822 is configured to communicate with other client computing platforms via server(s) 1802 and/or according to a peer-to-peer architecture and/or other architectures. In some cases, users may access system 1800 via client computing platform(s) 1822.

Server(s) 1802 is configured by machine-readable instructions 1808. Machine-readable instructions 1808 include one or more instruction modules. The instruction modules include computer program modules. The instruction modules may include one or more of workload selection module 1810, location optimization strategy accessing module 1812, function optimizing module 1814, data receiving module 1816, data field update module 1818, value setting module 1820, and/or other instruction modules. The illustrated modules are not meant to be exhaustive nor prescriptive of the number or nature of such modules existing in any real or potential embodiment of an AEE.

Workload selection module 1810 is configured to identify, from the data store, one or more workloads and a plurality of endpoints based in part on the operational strategies. In some cases, workload selection module 1810 is also configured to select a first workload from the one or more workloads. In some embodiments, the one or more workloads may be associated with one or more workload-endpoint pair records. The one or more workload-endpoint pair records may include at least one row, and one or more columns. By way of non-limiting example, the row may correspond to the first of the one or more workloads, and at least one of the one or more columns may correspond to a first endpoint of one or more endpoints. For example, in some embodiments, each row may correspond to a workload-endpoint pair or combination, and the columns may correspond to one or more data fields, written by one or more components of the AEE, further described in reference to the figures above.

In some embodiments, location optimization strategy accessing module 1812 is configured to access, from a strategy store, one or more operational and functional strategies, wherein the one or more operational and functional strategies are based at least in part on one or more of default strategies, operational preferences, customer preference data, and related data describing workloads and endpoints. In some embodiments, the one or more functional strategies are based at least in part on the operational preferences and customer preference data, wherein the customer preference data comprises one or more of latency objectives, budget constraints, location constraints, and goals.

Location optimization strategy accessing module 1812 is, in certain embodiments, configured to access, for a selected workload, one or more location optimization strategies from a plurality of location optimization strategies. The one or more location optimization strategies may be based, at least in part, on default strategies and customer preference data. The customer preference data may include one or more constraints.

Function optimizing module 1814 is configured to execute, for the first workload, at least one functional strategy of the one or more functional strategies. In some cases, the one or more functional strategies pertain to one or more of deploying and undeploying workloads, garbage collection, scaling, or a combination thereof. In some cases, function optimizing module 1814 is configured to identify, from the set of endpoints, an optimal set of endpoints for deploying the first workload based in part on the executing the at least one functional strategy.

Additionally or alternatively, function optimizing module 1814 is configured to optimize an objective function across a portion of the one or more endpoints. Optimizing the objective function may further include applying one or more selection functions to the one or more acceptable endpoints for optimization across the one or more acceptable endpoints. The endpoint isolation may include identifying a set of acceptable data centers from one or more data centers. At least one data center of the set of acceptable data centers may host at least one acceptable endpoint. The endpoint isolation may include optimizing the one or more selection functions across the acceptable data centers based at least in part on one or more of the objective function and the customer preferences data.

In one embodiment, endpoint isolation may include identifying an optimal set of data centers based at least in part on optimizing the one or more selection functions. The endpoint selection may include applying one or more endpoint selection functions to the optimal set of data centers. The endpoint selection may include identifying an optimal set of endpoints for the selected workload. The optimal datacenter may host an optimal endpoint of the optimal set of endpoints. At least one workload-endpoint record may be linked to one or more data fields. The AEE may further include a health checker (e.g., HC 1202 in FIG. 12) for validating information on the selected workload deployed on the optimal set of endpoints.

In some embodiments, the endpoint controller (e.g., EC 1402 in FIG. 14) may be configured to manage endpoints. Additionally or alternatively, the AEE may further include a traffic director (e.g., TD 1602 in FIG. 16) for directing end-users to the selected workload running on a portion of the optimal set of endpoints based at least in part on input from the health checker. For instance, the TD may direct or route network traffic to a workload based on the workload running healthy on at least one endpoint, as previously described in relation to FIGS. 16 and 17.

In one embodiment, data receiving module 1816 is configured to create a data store, wherein the data store comprises data pertaining to one or more workloads, endpoints, and endpoint-hosting facilities or data centers. Additionally or alternatively, the data receiving module 1816 is configured to receive one or more data feeds at the location optimizer. In some cases, the data feeds may be received from a data store (e.g., data store 714 in FIG. 7, data store 1026 in FIG. 10, data store 1216 in FIG. 12, etc.). By way of non-limiting example, the one or more data feeds may include a current status of the one or more endpoints, an online data feed of a metric pipeline of one or more of workload and endpoint performance, throughput, traffic, resource consumption, status, or any other metrics for the AEE, and a forecasted hosting cost per workload across the one or more endpoints.

In one embodiment, data field update module 1818 may be configured to update a state store, the state store comprising one or more states of workload-endpoint pairs, the workload-endpoint pairs associated with the one or more workloads and the plurality of endpoints. Additionally or alternatively, the data field update module 1818 may be configured to update at least one data field linked to a workload-endpoint pair record corresponding to the selected workload based in part on the optimal set of endpoints for the selected workload. The updating may include setting a first value for the at least one data field for the optimal set of endpoints for the selected workload.

In some embodiments, the AEE may include a workload-endpoint state store (e.g., state store 1022 in FIG. 10, state store 1422 in FIG. 14, etc.), where the workload-endpoint state store includes a relational database of the workload-endpoint pair records. It should be noted that other ways of implementing the workload-endpoint state store, besides a relational database, are contemplated in different embodiments. For instance, FIG. 5B illustrates one example of an alternate way of implementing the state store. In some cases, the customer preference data may include one or more customer preference inputs. By way of non-limiting example, the one or more customer preference inputs may include one or more of: latency objectives, budget constraints, and/or location constraints. In some embodiments, the constraints may also include performance constraints, information security constraints, or constraints based on the available technology at a hosting provider. Furthermore, customer preference inputs may also include one or more objectives, such as performance maximization, cost minimization, policy matching or matching a specific policy, to name a few non-limiting examples. The AEE may further include a workload controller (e.g., WC 1002 in FIG. 10) for deploying the selected workload to the optimal set of endpoints based in part on the workload-endpoint pair records corresponding to the selected workload.

In some embodiments, value setting module 1820 may be configured to update a state store, the state store comprising one or more states of workload-endpoint pairs, the workload-endpoint pairs associated with the one or more workloads and the plurality of endpoints. In some cases, the value setting module 1820 may work in conjunction with the data field update module 1818 to update the state store.

In some cases, the value setting module 1820 may be configured to set a second different value for the at least one data field for one or more endpoints not in the optimal set. As described above in relation to at least FIG. 9, optimizing an objective function across the portion of the one or more endpoints may include applying an endpoint filter function to the one or more endpoints based in part on the accessed data (e.g., endpoint filtration 916 in FIG. 9). Additionally or alternatively, optimizing an objective function across the portion of the one or more endpoints may include determining one or more acceptable endpoints for the selected workload wherein the one or more acceptable endpoints include the portion of the one or more endpoints (e.g., set of endpoints 918 in FIG. 9). The one or more selection functions may include endpoint isolation and endpoint selection (e.g., endpoint isolation 920 and endpoint selection 924 in FIG. 9). By way of non-limiting example, the AEE may further include an endpoint controller (e.g., EC 1402 in FIG. 14) for creating, sizing, and/or destroying the one or more endpoints.

In some implementations, the AEE may include a location optimizer wherein the location optimizer may be configured to access one of workload data and endpoint data. One non-limiting example of a location optimizer includes LO 702 previously described in relation to FIG. 7.

In some implementations, server(s) 1802, client computing platform(s) 1822, and/or external resources 1826 are operatively linked via one or more electronic communication links. For example, such electronic communication links may be established, at least in part, via a network 1824 such as the internet and/or other networks. It will be appreciated that this is not intended to be limiting, and that the scope of this disclosure includes implementations in which server(s) 1802, client computing platform(s) 1822, and/or external resources 1826 may be operatively linked via some other communication media.

A given computing platform, such as server(s) 1802 or client computing platform(s) 1822, may include one or more processors (e.g., shown as processor(s) 1806) configured to execute computer program modules. The computer program modules may be configured to enable an expert or user associated with the computing platform 1802 and/or 1822 to interface with system 1800 and/or external resources 1826, and/or provide other functionality attributed herein to the computing platform(s). By way of non-limiting example, the computing platforms 1802 and/or 1822 may include one or more of a desktop computer, a laptop computer, a handheld computer, a tablet computing platform, a NetBook, a Smartphone, a gaming console, and/or other computing platforms.

External resources 1826 may include sources of information outside of system 1800, external entities participating with system 1800, and/or other resources. In some implementations, some or all of the functionality attributed herein to external resources 1826 may be provided by resources included in system 1800.

Server(s) or computing platform(s) 1802 may include electronic storage 1804, one or more processors 1806, and/or other components. Server(s) 1802 may include communication lines, or ports to enable the exchange of information with a network and/or other computing platforms. Illustration of server(s) 1802 in FIG. 18 is not intended to be limiting. Server(s) 1802 may include a plurality of hardware, software, and/or firmware components operating together to provide the functionality attributed herein to server(s) 1802. For example, server(s) 1802 may be implemented by a cloud of computing platforms operating together as server(s) 1802.

Electronic storage 1804 may comprise non-transitory storage media that electronically stores information. The electronic storage media of electronic storage 1804 may include one or both of system storage that is provided integrally (i.e., substantially non-removable) with server(s) 1802 and/or removable storage that is removably connectable to server(s) 1802 via, for example, a port (e.g., a USB port, a firewire port, etc.) or a drive (e.g., a disk drive, etc.). Electronic storage 1804 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 1804 may include one or more virtual storage resources (e.g., cloud storage, a virtual private network, and/or other virtual storage resources). Electronic storage 1804 may store software algorithms, information determined by processor(s) 1806, information received from server(s) 1802, information received from client computing platform(s) 1822, and/or other information that enables server(s) 1802 to function as described herein.

Processor(s) 1806 may be configured to provide information processing capabilities in server(s) 1802. As such, processor(s) 1806 may include one or more of a digital processor, an analog processor, a digital circuit designed to process information, an analog circuit designed to process information, a state machine (e.g., FSM described in relation to FIGS. 1A-C, 2A-B, etc.), and/or other mechanisms for electronically processing information. Although processor(s) 1806 is shown in FIG. 18 as a single entity, this is for illustrative purposes only. In some implementations, processor(s) 1806 may include a plurality of processing units. These processing units may be physically located within the same device, or processor(s) 1806 may represent processing functionality of a plurality of devices operating in coordination. Processor(s) 1806 may be configured to execute modules 1810, 1812, 1814, 1816, 1818, and/or 1820, and/or other modules. Processor(s) 1806 may be configured to execute modules 1810, 1812, 1814, 1816, 1818, and/or 1820, and/or other modules by software; hardware; firmware; some combination of software, hardware, and/or firmware; and/or other mechanisms for configuring processing capabilities on processor(s) 1806. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 1810, 1812, 1814, 1816, 1818, and/or 1820 are illustrated in FIG. 18 as being implemented within a single processing unit, in implementations in which processor(s) 1806 includes multiple processing units, one or more of modules 1810, 1812, 1814, 1816, 1818, and/or 1820 may be implemented remotely from the other modules. The description of the functionality provided by the different modules 1810, 1812, 1814, 1816, 1818, and/or 1820 described below is for illustrative purposes, and is not intended to be limiting, as any of modules 1810, 1812, 1814, 1816, 1818, and/or 1820 may provide more or less functionality than is described. For example, one or more of modules 1810, 1812, 1814, 1816, 1818, and/or 1820 may be eliminated, and some or all of its functionality may be provided by other ones of modules 1810, 1812, 1814, 1816, 1818, and/or 1820. As another example, processor(s) 1806 may be configured to execute one or more additional modules that may perform some or all of the functionality attributed below to one of modules 1810, 1812, 1814, 1816, 1818, and/or 1820.

Figure 19:
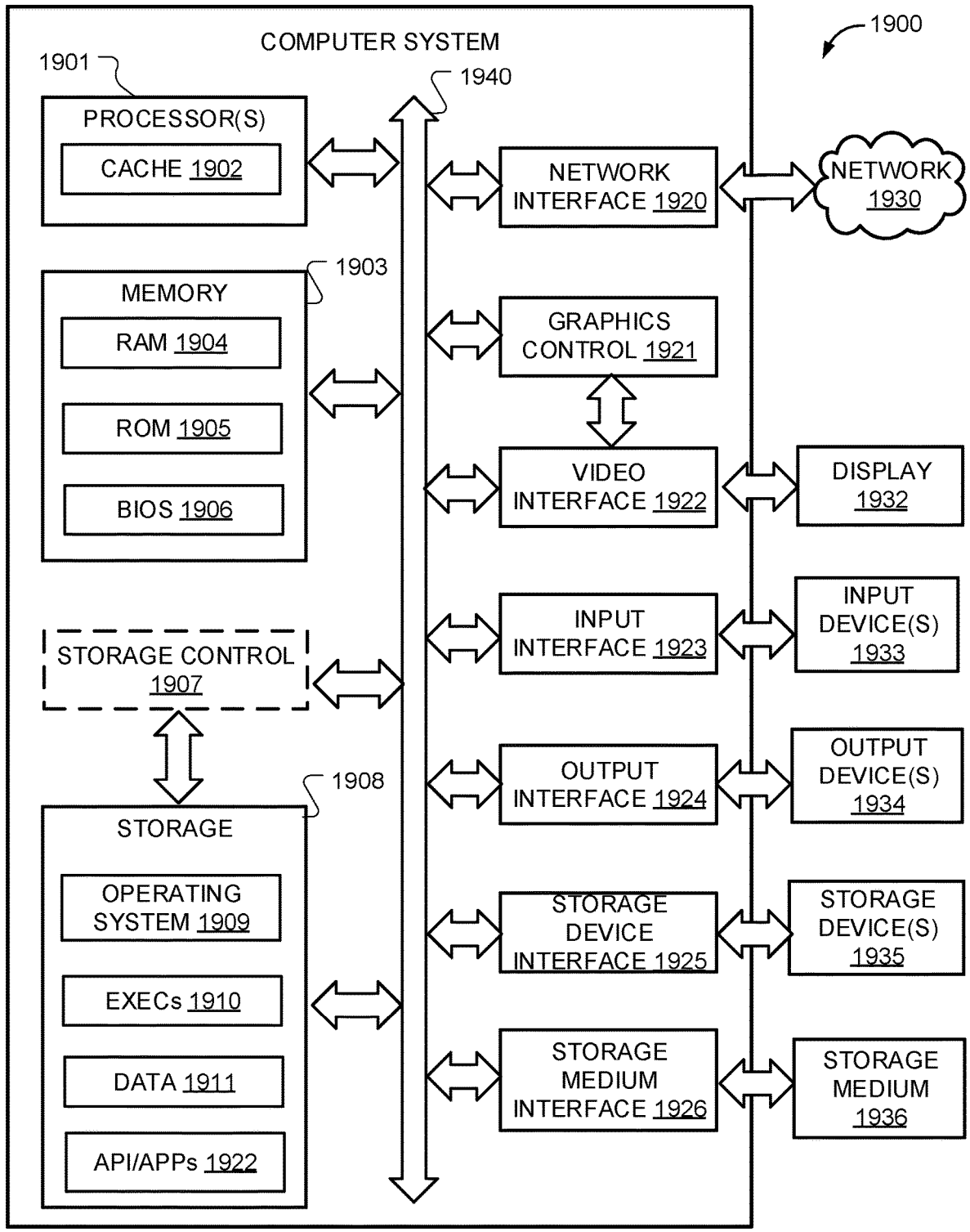
FIG. 19 is a block diagram illustrating a computer system in accordance with one or more implementations.

Referring to FIG. 19, it is a block diagram depicting an exemplary machine that includes a computer system 1900 within which a set of instructions can execute for causing a device to perform or execute any one or more of the aspects and/or methodologies of the present disclosure. The components in FIG. 19 are examples only and do not limit the scope of use or functionality of any hardware, software, embedded logic component, or a combination of two or more such components implementing particular embodiments.

Computer system 1900 may include a processor 1901, a memory 1903, and a storage 1908 that communicate with each other, and with other components, via a bus 1940. The bus 1940 may also link a display 1932, one or more input devices 1933 (which may, for example, include a keypad, a keyboard, a mouse, a stylus, etc.), one or more output devices 1934, one or more storage devices 1935, and various tangible storage media 1936. All of these elements may interface directly or via one or more interfaces or adaptors to the bus 1940. For instance, the various tangible storage media 1936 can interface with the bus 1940 via storage medium interface 1926. Computer system 1900 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 1901 (or central processing unit(s) (CPU(s))) optionally contains a cache memory unit 1902 for temporary local storage of instructions, data, or computer addresses. Processor(s) 1901 are configured to assist in execution of computer readable instructions. Computer system 1900 may provide functionality for the components depicted in FIGS. 3, 6, 7, 10, 12, 14, 16, 18, and/or 21 as a result of the processor(s) 1901 executing non-transitory, processor-executable instructions embodied in one or more tangible computer-readable storage media, such as memory 1903, storage 1908, storage devices 1935, and/or storage medium 1936. The computer-readable media may store software that implements particular embodiments, and processor(s) 1901 may execute the software. Memory 1903 may read the software from one or more other computer-readable media (such as mass storage device(s) 1935, 1936) or from one or more other sources through a suitable interface, such as network interface 1920. The software may cause processor(s) 1901 to carry out one or more processes or one or more steps of one or more processes described or illustrated herein. Carrying out such processes or steps may include defining data structures stored in memory 1903 and modifying the data structures as directed by the software.

The memory 1903 may include various components (e.g., machine readable media) including, but not limited to, a random-access memory component (e.g., RAM 1904) (e.g., a static RAM "SRAM", a dynamic RAM "DRAM, etc.), a read-only component (e.g., ROM 1905), and any combinations thereof. ROM 1905 may act to communicate data and instructions unidirectionally to processor(s) 1901, and RAM 1904 may act to communicate data and instructions bidirectionally with processor(s) 1901. ROM 1905 and RAM 1904 may include any suitable tangible computer-readable media described below. In one example, a basic input/output system 1906 (BIOS), including basic routines that help to transfer information between elements within computer system 1900, such as during start-up, may be stored in the memory 1903.

Fixed storage 1908 is connected bidirectionally to processor(s) 1901, optionally through storage control unit 1907. Fixed storage 1908 provides additional data storage capacity and may also include any suitable tangible computer-readable media described herein. Storage 1908 may be used to store operating system 1909, EXECS 1910 (executables), data 1911, API applications 1912 (application programs), and the like. Often, although not always, storage 1908 is a secondary storage medium (such as a hard disk) that is slower than primary storage (e.g., memory 1903). Storage 1908 can also include an optical disk drive, a solid-state memory device (e.g., flash-based systems), or a combination of any of the above. Information in storage 1908 may, in appropriate cases, be incorporated as virtual memory in memory 1903.

In one example, storage device(s) 1935 may be removably interfaced with computer system 1900 (e.g., via an external port connector (not shown)) via a storage device interface 1925. Particularly, storage device(s) 1935 and an associated machine-readable medium may provide nonvolatile and/or volatile storage of machine-readable instructions, data structures, program modules, and/or other data for the computer system 1900. In one example, software may reside, completely or partially, within a machine-readable medium on storage device(s) 1935. In another example, software may reside, completely or partially, within processor(s) 1901.

Bus 1940 connects a wide variety of subsystems. Herein, reference to a bus may encompass one or more digital signal lines serving a common function, where appropriate. Bus 1940 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 1900 may also include an input device 1933. In one example, a user of computer system 1900 may enter commands and/or other information into computer system 1900 via input device(s) 1933. Examples of an input device(s) 1933 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 1933 may be interfaced to bus 1940 via any of a variety of input interfaces 1923 (e.g., input interface 1923) including, but not limited to, serial, parallel, game port, USB, FIREWIRE, THUNDERBOLT, or any combination of the above.

In particular embodiments, when computer system 1900 is connected to network 1930, computer system 1900 may communicate with other devices, specifically mobile devices and enterprise systems, connected to network 1930. Communications to and from computer system 1900 may be sent through network interface 1920. For example, network interface 1920 may receive incoming communications (such as requests or responses from other devices) in the form of one or more packets (such as Internet Protocol (IP) packets) from network 1930, and computer system 1900 may store the incoming communications in memory 1903 for processing. Computer system 1900 may similarly store outgoing communications (such as requests or responses to other devices) in the form of one or more packets in memory 1903 and communicated to network 1930 from network interface 1920. Processor(s) 1901 may access these communication packets stored in memory 1903 for processing.

Examples of the network interface 1920 include, but are not limited to, a network interface card, a modem, and any combination thereof. Examples of a network 1930 or network segment 1930 include, but are not limited to, a wide area network (WAN) (e.g., the internet, an enterprise network), a local area network (LAN) (e.g., a network associated with an office, a building, a campus or other relatively small geographic space), a telephone network, a direct connection between two computing devices, and any combinations thereof. A network, such as network 1930, may employ a wired and/or a wireless mode of communication. In general, any network topology may be used.

Information and data can be displayed through a display 1932. Examples of a display 1932 include, but are not limited to, a liquid crystal display (LCD), an organic liquid crystal display (OLED), a cathode ray tube (CRT), a plasma display, and any combinations thereof. The display 1932 can interface to the processor(s) 1901, memory 1903, and fixed storage 1908, as well as other devices, such as input device(s) 1933, via the bus 1940. The display 1932 is linked to the bus 1940 via a video interface 1922, and transport of data between the display 1932 and the bus 1940 can be controlled via the graphics control 1921.

In addition to a display 1932, computer system 1900 may include one or more other peripheral output devices 1934 including, but not limited to, an audio speaker, a printer, and any combinations thereof. Such peripheral output devices may be connected to the bus 1940 via an output interface 1924. Examples of an output interface 1924 include, but are not limited to, a serial port, a parallel connection, a USB port, a FIREWIRE port, a THUNDERBOLT port, and any combinations thereof.

In addition, or as an alternative, computer system 1900 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

FIGS. 20A, 20B, 20C, and 20D illustrate methods 2000-*a*, 2000-*b*, 2000-*c*, and 2000-*d*, respectively, for administering a distributed edge computing system utilizing an AEE, in accordance with one or more implementations. The operations of methods 2000-*a*-*d* presented below are intended to be illustrative. In some implementations, methods 2000-*a*-*d* may be accomplished with one or more additional operations not described, and/or without one or more of the operations discussed. Additionally, the order in which the operations of methods 2000-*a*, 2000-*b*, 2000-*c*, and 2000-*d* are illustrated in FIGS. 20A, 20B, 20C, and 20D and described below is not intended to be limiting.

In some implementations, methods 2000 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 2000 in response to instructions stored electronically on an electronic storage medium. The one or more processing devices may include one or more devices configured through hardware, firmware, and/or software to be specifically designed for execution of one or more of the operations of methods 2000.

Figure 20A:
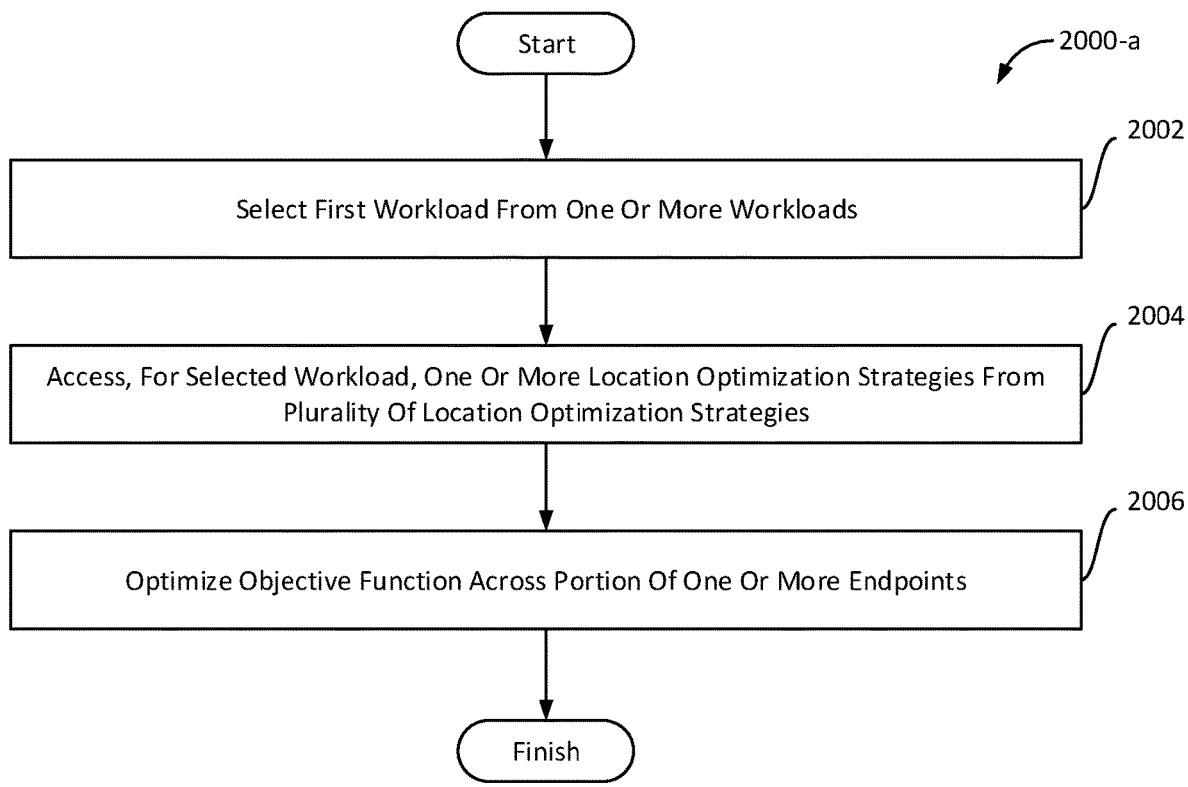
FIG. 20A illustrates a method for administering a distributed edge computing system utilizing an AEE, in accordance with one or more implementations.

FIG. 20A illustrates method 2000-*a*, in accordance with one or more implementations.

An operation 2002 may include selecting a first workload from one or more workloads, wherein the one or more workloads may be associated with one or more workload-endpoint pair records. The one or more workload-endpoint pair record may include a row and one or more columns. The row may correspond to the first of the one or more workloads, and at least one of the one or more columns may correspond to a first endpoint of one or more endpoints. In some other cases, each row may correspond to a workload-endpoint pair or combination, and the columns may correspond to one or more data fields, such as "traffic_direction_desired", "is_traffic_directed", "is_healthy", further described in relation to the figures above. Operation 2002 may be performed by one or more hardware processors configured by machine-readable instructions including a module that is the same as or similar to workload selection module 1810, in accordance with one or more implementations.

An operation 2004 may include accessing, for the selected workload, one or more location optimization strategies from a plurality of location optimization strategies. The one or more location optimization strategies may be based at least in part on default strategies and customer preference data. The customer preference data may include one or more constraints. Operation 2004 may be performed by one or more hardware processors configured by machine-readable instructions including a module that is the same as or similar to location optimization strategy accessing module 1812, in accordance with one or more implementations.

An operation 2006 may include optimizing an objective function across a portion of the one or more endpoints. Operation 2006 may be performed by one or more hardware processors configured by machine-readable instructions including a module that is the same as or similar to function optimizing module 1814, in accordance with one or more implementations.

Figure 20B:
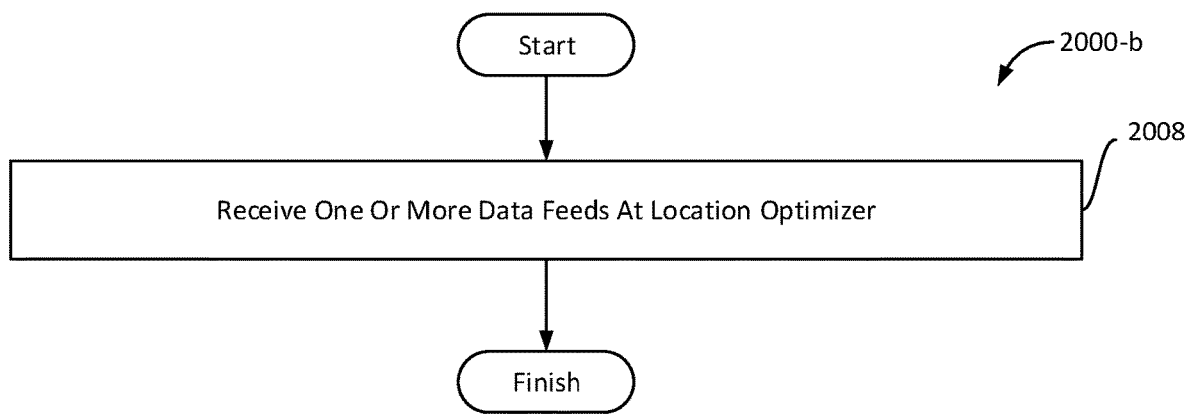
FIG. 20B illustrates a method for administering a distributed edge computing system utilizing an AEE, in accordance with one or more implementations.

FIG. 20B illustrates method 2000-*b*, in accordance with one or more implementations.

An operation 2008 may include receiving one or more data feeds at the location optimizer. The one or more data feeds may include one or more of a current status of the one or more endpoints, an online data feed of a metric pipeline of one or more of workload and endpoint performance, throughput, traffic, resource consumption, status, or any other metrics for the AEE, and a forecasted hosting cost per workload across the one or more endpoints. Operation 2008 may be performed by one or more hardware processors configured by machine-readable instructions including a module that is the same as or similar to data receiving module 1816, in accordance with one or more implementations.

Figure 20C:
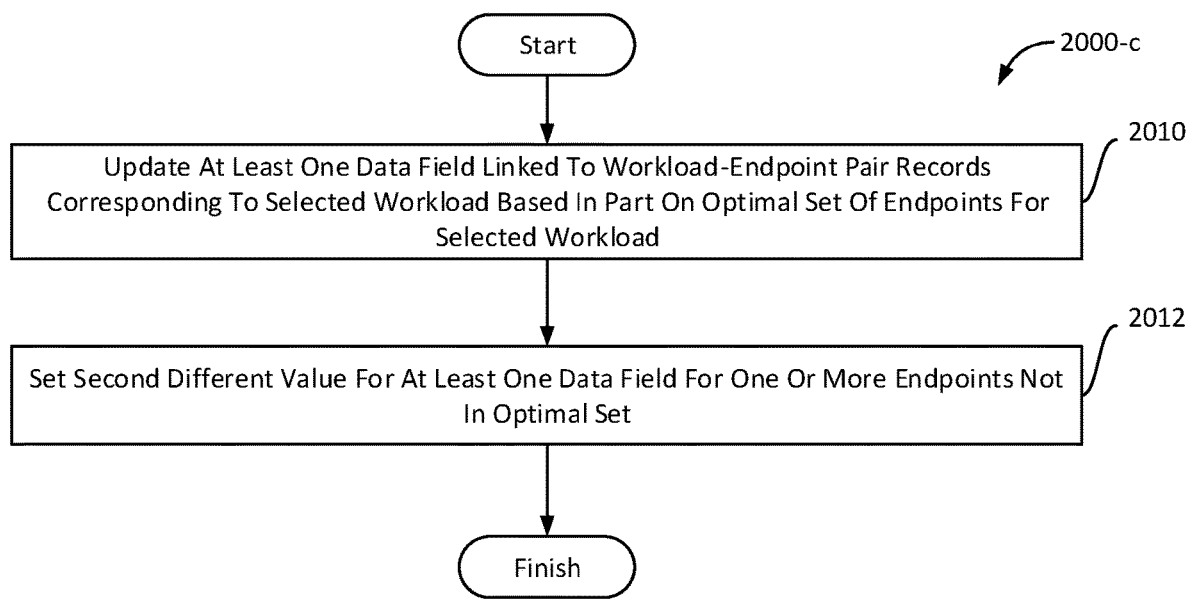
FIG. 20C illustrates a method for administering a distributed edge computing system utilizing an AEE, in accordance with one or more implementations.

FIG. 20C illustrates method 2000-c, in accordance with one or more implementations.

An operation 2010 may include updating at least one data field linked to workload-endpoint pair records corresponding to the selected workload based in part on the optimal set of endpoints for the selected workload. The updating may include setting a first value for the at least one data field for the optimal set of endpoints for the selected workload. Operation 2010 may be performed by one or more hardware processors configured by machine-readable instructions including a module that is the same as or similar to data field update module 1818, in accordance with one or more implementations.

An operation 2012 may include setting a second different value for the at least one data field for one or more endpoints not in the optimal set. Operation 2012 may be performed by one or more hardware processors configured by machine-readable instructions including a module that is the same as or similar to value setting module 1820, in accordance with one or more implementations.

Figure 20D:
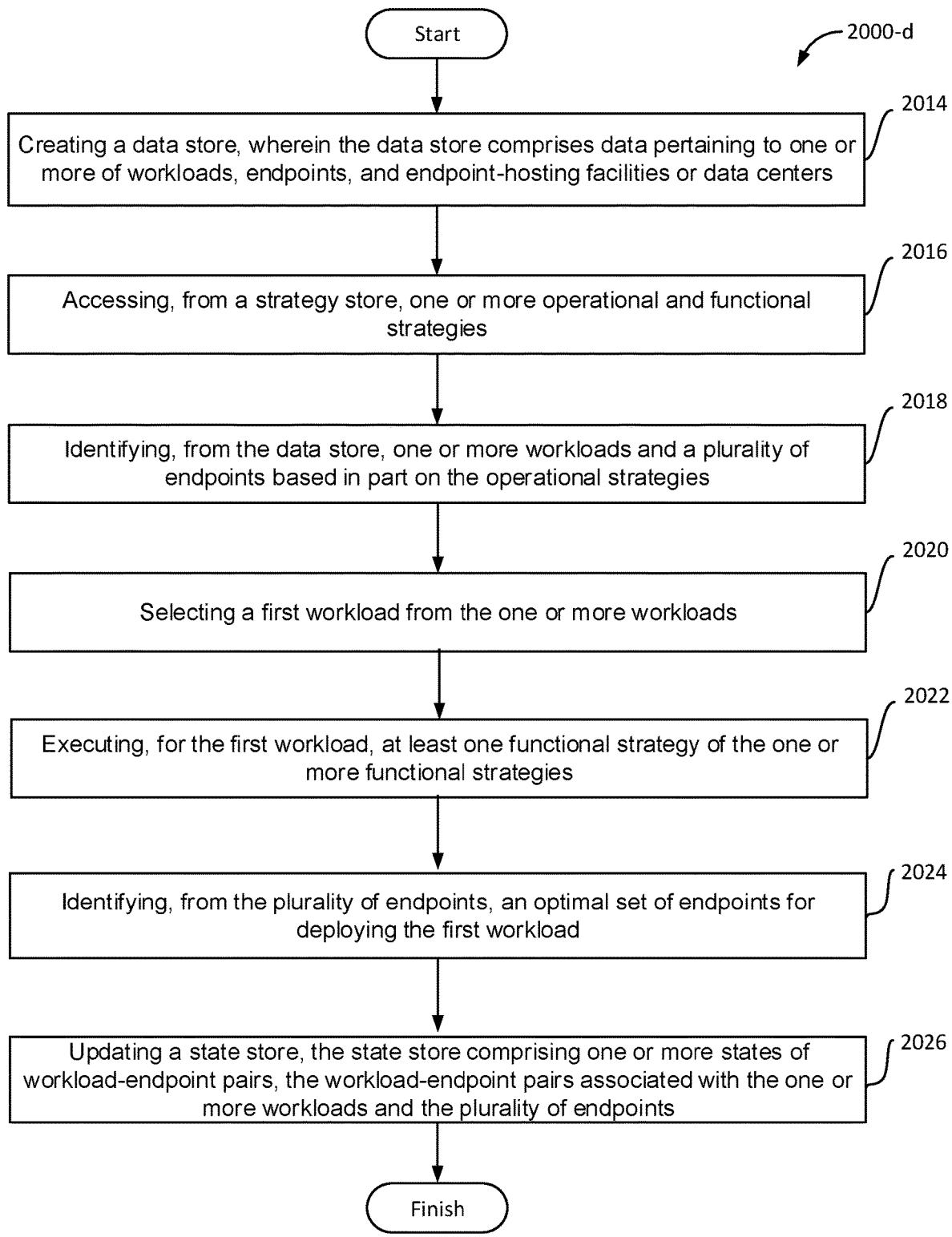
FIG. 20D illustrates a method for administering a distributed edge computing system utilizing an AEE, in accordance with one or more implementations.

FIG. 20D illustrates a method 2000-d, in accordance with one or more implementations.

An operation 2014 may include creating one or more data stores, wherein the one or more data stores comprise data pertaining to one or more of workloads, endpoints, and endpoint-hosting facilities or data centers. In some cases, the one or more date stores may be similar or substantially similar to any of the date stores described herein, such as data stores 714, 1026, 1216, 1426, and/or 1622 described in relation to FIGS. 7, 10, 12, 14, and/or 16, respectively. Operation 2014 may be performed by one or more hardware processors configured by machine-readable instructions including a module that is the same as or similar to data receiving module 1816, in accordance with one or more implementations.

An operation 2016 may include accessing, from a strategy store, one or more operational and functional strategies, wherein the one or more operational and functional strategies are based at least in part on one or more of default strategies, operational preferences, customer preference data, and related data describing workloads and endpoints. In some cases, the related data describing the workloads and endpoints may be utilized, for instance, while optimizing a solution for a set of datacenters or endpoints. In some cases, a component of the adaptive edge engine, such as a Location Optimizer, may call for additional data to effectively execute its strategies, where the additional data may include cost and/or performance data, to name two non-limiting examples. In such cases, the related data describing the workloads and endpoints may comprise the additional cost and/or performance data. Other types of data besides cost and/or performance may be utilized, in some embodiments. For instance, a customer may request that their workloads be deployed on endpoints or datacenters with zero carbon footprint, or datacenters running on renewable energy sources. In such cases, the Location Optimization Strategy (i.e., functional strategy for the Location Optimizer) used for identifying an optimal set of endpoints for that customer may be based on the constraint (i.e., workloads should be deployed on datacenters with zero carbon footprint), along with any other goals or objectives received from the customer. For instance, the customer preference data may also include a goal for maximizing performance and/or minimizing cost, subject to the constraint. In such cases, the Location Optimizer may access data from one or more sources (e.g., from the data store, a third party data store, etc.) to identify data centers that have zero carbon footprint, and then identify an optimal set of endpoints from within those data centers. In another example, customer preference data may indicate cost minimization subject to performance. In this case, the Location Optimizer may access base level cost and base level performance data for various data centers or endpoints for executing its functional strategy for the customer's workload. In other words, the related data describing workloads and endpoints used may be dependent on the strategy selected, problem or solution being solved, customer wants or preferences, to name a few non-limiting examples. Operation 2016 may be performed by one or more hardware processors configured by machine-readable instructions including a module that is the same as or similar to location optimization strategy accessing module 1812, in accordance with one or more implementations.

Operation 2018 may include identifying, from the one or more data stores, one or more workloads and a plurality of endpoints based in part on the operational strategies. Operation 2018 may be performed by one or more hardware processors configured by machine-readable instructions including a module that is the same as or similar to workload selection module 1810, in accordance with one or more implementations.

Further, operation 2020 may include selecting a first workload from the one or more workloads. Operation 2020 may be performed by one or more hardware processors configured by machine-readable instructions including a module that is the same as or similar to workload selection module 1810, in accordance with one or more implementations.

Operation 2022 may include executing, for the first workload, at least one functional strategy of the one or more functional strategies, wherein the one or more functional strategies pertain to one or more workload control actions, wherein the workload control actions comprise one or more of deploying and undeploying workloads, garbage collection, and scaling. As noted above, the functional strategy utilized for obtaining a location optimization solution for a workload may be based on numerous factors, including preferences, goals, objectives, constraints, etc. Operation 2022 may be performed by one or more hardware processors configured by machine-readable instructions including a module that is the same as or similar to function optimizing module 1814, in accordance with one or more implementations.

Operation 2024 may include identifying, from the plurality of endpoints, an optimal set of endpoints for deploying the first workload based in part on the executing the at least one functional strategy. In some cases, the optimal set of endpoints solution obtained may support fault-tolerance. For instance, the optimal set of endpoints may comprise at least two endpoints hosted on at least two different data centers or endpoint-hosting facilities, where each data center hosts at least one endpoint of the optimal set of endpoints. In this way, even if one data center fails, there is a duplicate copy of the workload that could be deployed on another endpoint hosted in a functioning data center. Operation 2024 may be performed by one or more hardware processors configured by machine-readable instructions including a module that is the same as or similar to function optimizing module 1814, in accordance with one or more implementations.

Operation 2026 may include updating a state store, the state store comprising one or more states of workload-endpoint pairs, the workload-endpoint pairs associated with the one or more workloads and the plurality of endpoints. In some cases, each of the one or more states of the workload-endpoint pairs may be associated with one or more of a tuple of Finite State Machine (FSM) variables or state values, a state index, a state alias, and one or more data fields, previously described in relation to FIGS. 1A-C and 2A-B. In one non-limiting example, the Location Optimizer may be configured to update at least one state of a workload-endpoint pair associated with the first workload and an endpoint of the optimal set of endpoints. For instance, the Location Optimizer may update at least one state variable (e.g., State Variable 1 in table 500 in FIG. 5A) in a vector of state variables defining an initial state (e.g., a vector comprising State Variables 1, 2, 3 in in FIG. 5A defines a state for a WL-EP pair, such as a-x). Operation 2026 may be performed by one or more hardware processors configured by machine-readable instructions including a module that is the same as or similar to data field update module 1818, in accordance with one or more implementations. Additionally or alternatively, operation 2026 may be performed by one or more hardware processors configured by machine-readable instructions including a module that is the same as or similar to value setting module 1820, in accordance with one or more implementations.

Figure 21:
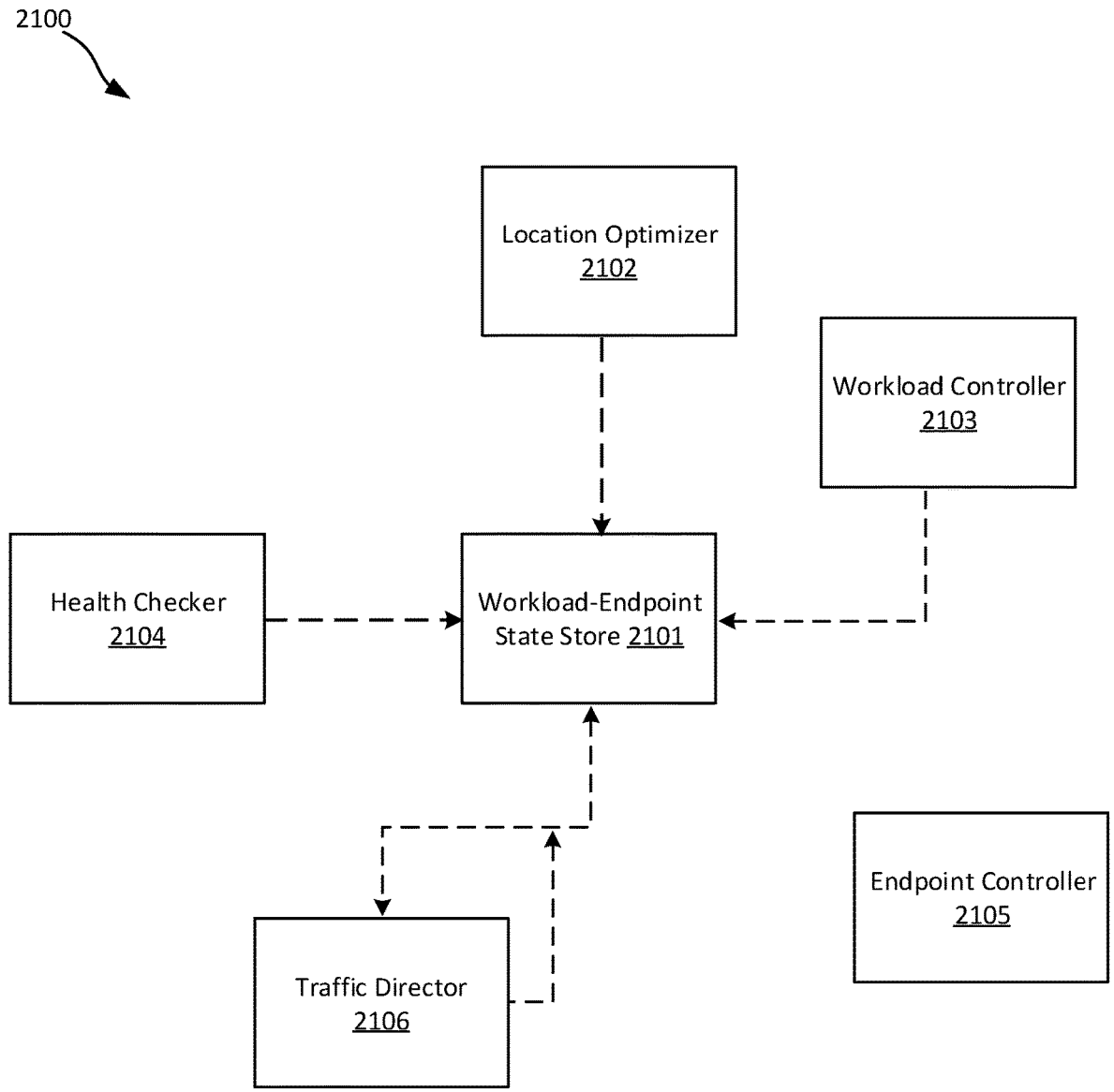
FIG. 21 illustrates a block diagram of an AEE, according to an alternate embodiment of the disclosure.

FIG. 21 illustrates a block diagram of an AEE 2100, in accordance with one or more implementations. In some cases, the AEE 2100 may comprise one or more components, including at least a workload-endpoint state store 2101 (or simply, state store 2101), a location optimizer 2102, a workload controller 2103, a health checker 2104, an endpoint controller 2105, and a traffic director 2106. In some cases, the AEE 2100 may be similar or substantially similar to the AE 302 previously described in relation to FIG. 3. Further, the one or more components of the AEE 2100 may implement one or more aspects of the logical components described above in relation to at least FIGS. 6, 7, 10, 12, 14, and/or 16. In some embodiments, each of the one or more components may comprise one or more hardware processors configured by machine-readable instructions. Furthermore, their operations may be implemented in one or more processing devices (e.g., a digital processor, an analog processor, a digital circuit designed to process information, an analog circuit designed to process information, a state machine or an FSM, and/or other mechanisms for electronically processing information). The one or more processing devices may include one or more devices executing some or all of the operations performed by the components in response to instructions stored electronically on an electronic storage medium. The one or more processing devices may include one or more devices configured through hardware, firmware, and/or software to be specifically designed for execution of one or more of the operations performed by the components.

As previously described, in some cases, the workload-endpoint state store 2101 may be the central feature of the AEE. The workload-endpoint state store 2101 may also be referred to as state store 2101. State store 2101 may be an example of a database table in a relational database system using an ORACLE Database Server, a SQL Server, a MySQL Server, etc., previously described in relation to FIG. 5A. Each row in the state store 2101 may correspond to a workload (e.g., a workload, or a workload-endpoint pair/combination). Further, the table may comprise one or more columns or data fields, such as, but not limited to, "traffic_direction_desired," "is_traffic_directed," or "is_healthy." In some examples, the data fields may take Boolean values, with 1 as affirmative and 0 as negative.

The components of the AEE may be independent of each other, and may be configured to work without any direct, mutual dependency. In other words, no component requires any other component to function, and each component may be designed, built, and configured to operate independently to deliver collaborative outcomes for customer (or user) workloads. As illustrated, the location optimizer 2102, workload controller 2103, health checker 2104, and traffic director 2106 may be configured to interact with the state store 2101. Further, the endpoint controller 2105 may be configured to operate on endpoints and workloads independent of the state store 2101.

In some cases, the basic unit of work for the AEE 2100 may be a workload and an endpoint (not shown) for running the workload. In some cases, a workload may comprise a tightly-coupled stack of software applications (or modules). Further, an endpoint may be a point of application layer ingress into the module stack, with specific protocols and protocol options available to the connecting customer or client. For simplicity, the stack may be a HTTP ingress (e.g., an API object that manages external access to the services or apps in a cluster, typically HTTP), a Web Application Firewall, and/or HTTP egress modules. In some aspects, an endpoint may be a server node in a cluster.

In some cases, the location optimizer 2102 may be configured to write to the "traffic_direction_desired" data field. Further, the workload controller 2103 may read "traffic_direction_desired" and "is_healthy" data fields, wherein the health checker 2104 may write to the "is_healthy" data field.

ALTERNATE EMBODIMENTS

Below are presented some alternative embodiments of the disclosure. In some embodiments, aspects of the present disclosure generally relate to a system configured for administering a distributed edge computing system utilizing an AEE, the system comprising: one or more hardware processors configured by machine-readable instructions to: access operational and functional strategies within different domains of state and action required for distributed edge computing; wherein the operational strategies define behaviors of the system in identifying units of work such as one or more workloads and one or more endpoints, either separately or in combination. In some embodiments, the functional strategies define behaviors of the system in executing instructions on the units of work according to a domain of action. In some cases, the one or more operational strategies and one or more functional strategies may be executed in combination. In some cases, the operational and functional strategies are based at least in part on default strategies, operational preferences, and/or related data describing and defining workloads, endpoints, the greater networked environment within which they operate, and other aspects of the distributed edge computing system.

In some embodiments, a method for managing the system is presented, where the method comprises executing one or more steps across workloads and/or endpoints. The steps may be executed by the AEE or any subcomponent of the AEE, such as, a traffic director, a workload controller, an endpoint controller, a health checker, etc. In other cases, the steps may be executed by any of the modules previously described in relation to FIG. 18. Some non-limiting examples of steps that may be executed for managing the system may include: creating and maintaining a state store; optimizing locations for deployment of workloads; controlling and managing the deployment, operation, and maintenance of workloads; controlling and managing the deployment, operation, and maintenance of endpoints; checking the health of workload and endpoints and system functions and operations; and/or executing methods that support the enabling or disabling of network traffic access to workloads on endpoints.

In some embodiments, the one or more hardware processors are further configured by machine-readable instructions to: access and execute operational and functional strategies defined for workload controller behavior; identify and access individual workloads; define design and development contracts for workloads; deploy, undeploy, scale, and/or monitor one or more workloads; and perform or cause to be performed other definition, operation, and management activities on workloads. In some embodiments, the component of the AEE configured to perform the above steps may be referred to as a workload controller.

In some cases, an endpoint controller and/or one or more hardware processors configured by machine-readable instructions may be configured to access operational and functional strategies defined for endpoint controller activities; identify and access individual endpoints for application of functional methods or functional strategies; maintain, query, update, and manage data stores of data on endpoints and endpoint-hosting facilities; monitor, scale, bring into service, and/or remove from service one or more endpoints or endpoint-hosting facilities. In some embodiments, the endpoint controller may also be configured to perform one or more other endpoint-specific functions on one or more endpoints, such as, but not limited to, performing activities on one or more stand-alone servers, one or more nodes in a computer cluster, one or more clusters in a data center or any other endpoint-hosting facility, and one or more data centers or endpoint-hosting facilities.

In some embodiments, a location optimizer and/or one or more hardware processors configured by machine-readable instructions may be configured to access operational and functional strategies that enable the selection of an optimal set of endpoints or endpoint-hosting facilities; identity and access one or more workloads and endpoints, for instance, for performing location optimization (e.g., identifying an optimal set of endpoints or a location for deploying a workload).

In some embodiments, the AEE comprises a health checker, where the health checker is configured to: access operational and functional strategies for performing health checks on one or more workloads. Additionally or alternatively, the health checker may be configured to identify and/or access workloads and endpoints for applying one or more health checking methods.

In some embodiments, the AEE comprise a traffic director, where the traffic director is configured to access operational and functional strategies that enable or disable network access to one or more workloads, for instance, by editing DNS records according to the execution of its functional or operational strategies. In some cases, the traffic director may be configured to identify and access workloads and endpoints for applying the one or more network traffic direction related methods, for instance, from a state store or a data store, to name two non-limiting examples.

In some embodiments, the AEE further comprises a state store, such as any of the state stores described in relation to the figures above. The state store may comprise one or more databases of records at the proper resolution for the units of work (e.g., workloads) of the AEE and/or its component systems. In some cases, the records may comprise values for variables, such as state variables, that collectively define the states of the units of work of the system, where the units of work may comprise one workload paired with one or more endpoints.

In some embodiments, the one or more hardware processors may be further configured by machine readable instructions to: access, by the location optimizer, one or more data stores, wherein the one or more data stores comprise one or more of a current status of workloads, endpoints, metrics stores comprising forecasts, estimates, and recorded values of any relevant data including but not limited to cost, performance, and operational metrics.

As noted above, in some cases, the location optimizer may be configured to execute one or more functional strategies (e.g., functional location optimization strategies) across one or more endpoints. Some non-limiting examples of functional location optimization strategies may include: excluding one or more endpoints based on security criteria; excluding one or more endpoints based on the computational resources (e.g., processors, memory) available in the server nodes; selecting endpoints to minimize costs subject to the constraint that a minimum of two endpoints must be selected; selecting endpoints that maximize expected performance for end users according to some measured criteria. Multiple strategies can be executed in conjunction with one another so that the results might be (in terms of the examples above): selecting secure (not excluded by security criteria) endpoints that maximize expected performance while minimizing costs subject to the constraint that at least two endpoints must be selected. In some cases, the set or subset of endpoints can be translated to a corresponding set of one or more data centers (endpoint-hosting facilities). In some embodiments, the location optimizer may be configured to apply one or more selection functions for finding a supremum (e.g., by formal or heuristic means) of a goal or objective function subject to constraints. In some cases, the optimal selection of endpoint-hosting facilities, such as data centers, may support fault-tolerance.

In some embodiments, the behavior of the AEE may be modeled with a finite state machine (FSM), as described above in relation to at least FIGS. 1A-C and 2A-B. In some cases, the modeling may comprise modeling the unit of work (e.g., workload, workload-endpoint combination, one or more workloads paired with one or more endpoints, etc.) of the AEE. In some cases, state transition may be induced by one or more inputs obtained from any of the methods described throughout this application. One non-limiting example of state transition comprises updating state variables in a state store based on an input received from a logical component of the AEE, such as a traffic director, a workload controller, an endpoint controller, etc. In some cases, the modeling may comprise creating a transition matrix that includes transitions, which may or may not be reflexive, for at least a portion of inputs and states. In some embodiments, the modeling of the behavior of the AEE may be verified through application of m-complete test suites, previously described in relation to at least FIG. 2B. In some cases, the m-complete test suites may be generated by open-source algorithms.

Another aspect of the present disclosure relates to a system configured for administering a distributed edge computing system utilizing an AEE. The system may include one or more hardware processors configured by machine-readable instructions. The processor(s) may be configured to select a first workload from one or more workloads. The one or more workloads may be associated with one or more workload-endpoint pair records. The one or more workload-endpoint pair records may include a row and one or more columns. The row may correspond to the first of the one or more workloads, and at least one of the one or more columns may correspond to a first endpoint of one or more endpoints. In some other cases, each row may correspond to a workload-endpoint pair or combination, and the columns may correspond to the one or more data fields, such as "traffic_direction_desired", "is_traffic_directed", "is_healthy". The processor(s) may be configured to access, for the selected workload, one or more location optimization strategies from a plurality of location optimization strategies. The one or more location optimization strategies may be based at least in part on operational requirements and customer preference data. The customer preference data may include one or more goals, objectives, and constraints. The processor(s) may be configured to optimize an objective function across all or a portion of the one or more endpoints.

Another aspect of the present disclosure relates to a method for administering a distributed edge computing system utilizing an AEE. The method may include selecting a first workload from one or more workloads. The one or more workloads may be associated with one or more workload-endpoint pair records. The one or more workload-endpoint pair record may include a row and one or more columns. The row may correspond to the first of the one or more workloads, and at least one of the one or more columns corresponding to a first endpoint of one or more endpoints. In some other cases, each row may correspond to a workload-endpoint pair or combination, and the columns may correspond to the one or more data fields, such as "traffic_direction_desired", "is_traffic_directed", "is_healthy". The method may include accessing, for the selected workload, one or more location optimization strategies from a plurality of location optimization strategies. The one or more location optimization strategies may be based at least in part on operational requirements and customer preference data. The customer preference data may include one or more goals, objectives, and constraints. The method may include optimizing an objective function across all or a portion of the one or more endpoints.

Yet another aspect of the present disclosure relates to a computing platform configured for administering a distributed edge computing system utilizing an AEE. The computing platform may include a non-transient computer-readable storage medium having executable instructions embodied thereon. The computing platform may include one or more hardware processors configured to execute the instructions. The processor(s) may execute the instructions to select a first workload from one or more workloads. The one or more workloads may be associated with one or more workload-endpoint pair records. The one or more workload-endpoint pair record may include a row and one or more columns. The row may correspond to the first of the one or more workloads, and at least one of the one or more columns corresponding to a first endpoint of one or more endpoints. In some other cases, each row may correspond to a workload-endpoint pair or combination, and the columns may correspond to the one or more data fields, such as "traffic_direction_desired", "is_traffic_directed", "is_healthy". The processor(s) may execute the instructions to access, for the selected workload, one or more location optimization strategies from a plurality of location optimization strategies. The one or more location optimization strategies may be based at least in part on operational requirements and customer preference data. The customer preference data may include one or more goals, objectives, and constraints. The processor(s) may execute the instructions to optimize an objective function across all or a portion of the one or more endpoints.

Still another aspect of the present disclosure relates to a system configured for administering a distributed edge computing system utilizing an AEE. The system may include means for selecting a first workload from one or more workloads. The one or more workloads may be associated with one or more workload-endpoint pair records. The one or more workload-endpoint pair record may include a row and one or more columns. The row may correspond to the first of the one or more workloads, and at least one of the one or more columns corresponding to a first endpoint of one or more endpoints. In some other cases, each row may correspond to a workload-endpoint pair or combination, and the columns may correspond to the one or more data fields, such as "traffic_direction_desired", "is_traffic_directed", "is_healthy". The system may include means for accessing, for the selected workload, one or more location optimization strategies from a plurality of location optimization strategies. The one or more location optimization strategies may be based at least in part on operational requirements and customer preference data. The customer preference data may include one or more goals, objectives, and constraints. The system may include means for optimizing an objective function across all or a portion of the one or more endpoints.

Even another aspect of the present disclosure relates to a non-transient computer-readable storage medium having instructions embodied thereon, the instructions being executable by one or more processors to perform a method for administering a distributed edge computing system utilizing an AEE. The method may include selecting a first workload from one or more workloads. The one or more workloads may be associated with one or more workload-endpoint pair records. The one or more workload-endpoint pair records may include a row and one or more columns. The row may correspond to the first of the one or more workloads, and at least one of the one or more columns corresponding to a first endpoint of one or more endpoints. The method may include accessing, for the selected workload, one or more location optimization strategies from a plurality of location optimization strategies. The one or more location optimization strategies may be based at least in part on operational requirements and customer preference data. The customer preference data may include one or more constraints. The method may include optimizing an objective function across all or a portion of the one or more endpoints.

The present invention and its aspect of flexible selector strategies is not dependent on any particular selector technique or implementation, and in fact it is a feature that techniques not presently known or yet discovered may in the future be employed as a filter, selector, or other strategy, all in accordance with the invention described herein.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method for administering a distributed edge computing system, comprising:
accessing one or more data stores, the one or more data stores comprising data pertaining to a workload, an endpoint, and one or more of a data center and a network condition;
accessing, from a strategy store, one or more operational strategies and one or more functional strategies, wherein the one or more operational strategies and the one or more functional strategies are associated with one or more of location optimization, workload control, endpoint control, health checks, and directing traffic;
identifying, from the one or more data stores, one or more workloads and a plurality of endpoints, based in part on the one or more operational strategies, wherein each of the one or more operational strategies,
is associated with a logical component of an adaptive edge engine (AEE), and
defines whether a corresponding logical component is run as (1) a single instance sequentially processing the one or more workloads, or (2) multiple instances processing a plurality of workloads in parallel;
selecting a first workload from the one or more workloads;
executing, for the first workload, at least one functional strategy of the one or more functional strategies;
identifying, from the plurality of endpoints, a first set of endpoints for deploying the first workload, based in part on executing the at least one functional strategy; and
updating a state store, the state store comprising one or more states of workload-endpoint pairs.

2. The method of claim 1, further comprising accessing data from one or more of the one or more data stores, the strategy store, and the state store.

3. The method of claim 1, wherein the one or more operational strategies and the one or more functional strategies are based at least in part on one or more of default strategies, operational preferences, and customer preference data, the customer preference data comprising one or more of a latency preference, a budget preference, a location preference, and an endpoint capability.

4. The method of claim 3, wherein prior to executing the at least one functional strategy, the method further comprises:
receiving, from the strategy store, one or more instructions for accessing data for evaluating at least a portion of the one or more operational preferences, customer preference data, or a combination thereof; and
accessing, from the one or more data stores, the data for evaluating the at least the portion of the one or more operational preferences, customer preference data, or a combination thereof.

5. The method of claim 4, wherein identifying the first set of endpoints further comprises:
applying one or more endpoint filter functions to the plurality of endpoints based in part on the accessed data; and
the method further comprising:
determining a second set of endpoints for the first workload.

6. The method of claim 5, further comprising:
applying one or more selection functions to the first set of endpoints, wherein the one or more selection functions perform endpoint selection;
wherein the endpoint selection comprises:
applying one or more endpoint selection functions to each endpoint of the first set of endpoints; and
identifying the second set of endpoints based at least in part on applying the one or more endpoint selection functions.

7. The method of claim 1, wherein a first vector of state variables for each of the one or more states of the workload-endpoint pairs comprises one or more of a tuple of Finite State Machine (FSM) variables or state values, a state index, a state alias, and one or more data fields.

8. The method of claim 7, wherein updating the state store comprises at least:
identifying an initial state for a first workload-endpoint pair, the first workload-endpoint pair associated with the first workload and a first endpoint of the first set of endpoints, wherein the initial state for the first workload-endpoint pair comprises the first vector of state variables;
receiving, from at least one logical component of the adaptive edge engine, at least one input state value for the first workload-endpoint pair;
identifying a new state for the first workload-endpoint pair based at least in part on the initial state and the at least one input state value, wherein identifying the new state for the first workload-endpoint pair comprises determining a second vector of state variables; and
writing the new state to the state store.

9. The method of claim 1, wherein the one or more data stores further comprise one or more of: a current status of workloads, an endpoint, and a metric store, wherein the metric store comprises a forecast, an estimate, and a recorded value of one or more of cost, performance, strategic metrics, and operational metrics.

10. A system configured for administering a distributed edge computing system, the system comprising:
one or more hardware processors configured by machine-readable instructions to:
access one or more data stores, wherein the one or more data stores comprise data pertaining to a workload, an endpoint, and one or more of a data center and a network condition;
access, from a strategy store, one or more operational strategies and one or more functional strategies, wherein the one or more operational strategies and the one or more functional strategies are associated with one or more of location optimization, workload control, endpoint control, health checks, and directing traffic;
identify, from the one or more data stores, one or more workloads and a plurality of endpoints, based in part on the one or more operational strategies, wherein each of the one or more operational strategies,
is associated with a logical component of an adaptive edge engine (AEE), and
defines whether a corresponding logical component is run as (1) a single instance sequentially processing the one or more workloads, or (2) multiple instances processing a plurality of workloads in parallel;
select a first workload from the one or more workloads;
execute, for the first workload, at least one functional strategy of the one or more functional strategies;

identify, from the plurality of endpoints, a first set of endpoints for deploying the first workload, based in part on executing the at least one functional strategy; and update a state store, the state store comprising one or more states of workload-endpoint pairs.

11. The system of claim 10, wherein the one or more functional strategies are based at least in part on one or more of operational preferences and customer preference data, wherein the customer preference data comprises one or more of a latency preference, a budget preference, a location preference, and an endpoint capability, and wherein prior to executing the at least one functional strategy, the one or more hardware processors are further configured by machine-readable instructions to:

receive, from the strategy store, one or more instructions for accessing data for evaluating at least a portion of the one or more operational preferences, customer preference data, or a combination thereof; and access, from the one or more data stores, data for evaluating the one or more operational preferences, customer preference data, or a combination thereof.

12. The system of claim 11, wherein identifying the first set of endpoints further comprises:

applying one or more endpoint filter functions to the plurality of endpoints based in part on the accessed data; and wherein the one or more hardware processors are further configured by machine-readable instructions to:

determine a second set of endpoints for the first workload.

13. The system of claim 12, wherein the one or more hardware processors are further configured by machine-readable instructions to:

apply one or more selection functions to the first set of endpoints, wherein the one or more selection functions comprise endpoint isolation and endpoint selection, and wherein the endpoint selection comprises applying no endpoint selection functions or one or more endpoint selection functions to each endpoint of the first set of endpoints; and identify the second set of endpoints based at least in part on applying no endpoint selection functions or the one or more endpoint selection functions to each endpoint of the first set of endpoints.

14. The system of claim 10, wherein a first vector of state variables for each of the one or more states of the workload-endpoint pairs is associated with one or more of a tuple of Finite State Machine (FSM) variables or state values, a state index, a state alias, and one or more data fields, and wherein updating the state store comprises at least:

identifying an initial state for a first workload-endpoint pair, the first workload-endpoint pair associated with the first workload and a first endpoint of the first set of endpoints, wherein the initial state for the first workload-endpoint pair comprises the first vector of state variables;

receiving, from at least one logical component of the adaptive edge engine, at least one input state value for the first workload-endpoint pair;

identifying a new state for the first workload-endpoint pair based at least in part on the initial state and the at least one input state value, wherein identifying the new state for the first workload-endpoint pair comprises determining a second vector of state variables; and writing the new state to the state store.

15. The system of claim 10, wherein the one or more hardware processors are further configured by machine-readable instructions to receive one or more data feeds from the one or more data stores, wherein the one or more data feeds comprise one or more of an endpoint data feed and a workload data feed.

16. The system of claim 10, further comprising a location optimizer configured to update a state variable corresponding to predefined inputs;

wherein the location optimizer defines a set of endpoints selected for deployment of the one or more workloads and further defines a set of data and algorithms configured for selecting deployment locations.

17. The system of claim 10, further comprising a health checker configured to exchange data with one or more of the state store, the strategy store, and the one or more data stores;

wherein the health checker is configured to read at least one operational strategy from the strategy store, where the at least one operational strategy is specific to the health checker and defines how the health checker identifies or encounters workloads for which it performs health checks.

18. A non-transient computer-readable storage medium having instructions embodied thereon, the instructions being executable by one or more processors to perform a method for administering a distributed edge computing system utilizing an adaptive edge engine, the method comprising:

accessing one or more data stores, the one or more data stores comprising data pertaining to a workload, an endpoint, and one or more of a data center and network conditions;

accessing, from a strategy store, one or more operational strategies and one or more functional strategies, wherein the one or more operational strategies and the one or more functional strategies are associated with one or more of location optimization, workload control, endpoint control, health checks, and directing traffic;

identifying, from the one or more data stores, one or more workloads and a plurality of endpoints, based in part on the one or more operational strategies, wherein each of the one or more operational strategies, is associated with a logical component of the adaptive edge engine, and defines whether a corresponding logical component is run as (1) a single instance sequentially processing the one or more workloads, or (2) multiple instances processing a plurality of workloads in parallel;

selecting a first workload from the one or more workloads;

executing, for the first workload, at least one functional strategy of the one or more functional strategies;

identifying, from the plurality of endpoints, a first set of endpoints for deploying the first workload, based in part on executing the at least one functional strategy; and updating a state store, the state store comprising one or more states of workload-endpoint pairs.

19. The non-transient computer-readable storage medium of claim 18, wherein:

the first set of endpoints comprises two or more endpoints, and wherein each of the two or more endpoints is hosted within a different data center, each workload-endpoint pair is associated with a state, each state comprising at least a first vector of state variables, the workload-endpoint pairs are associated with the one or more workloads and the plurality of endpoints, and wherein updating the state store comprises:
receiving from one or more logical components of the adaptive edge engine a respective input state value; and
determining a second vector of state variables for at least one of the one or more states of workload-endpoint pairs based on the receiving.

\* \* \* \* \*